(12) United States Patent  
Gotou

(10) Patent No.: US 9,296,204 B2  
(45) Date of Patent: *Mar. 29, 2016

(54) INKJET RECORDING METHOD AND INKJET RECORDING DEVICE

(71) Applicant: RICOH COMPANY, LTD., Tokyo (JP)

(72) Inventor: Hiroshi Gotou, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 189 days.

This patent is subject to a terminal disclaimer.

(21) Appl. No.: 14/158,969

(22) Filed: Jan. 20, 2014

(65) Prior Publication Data

US 2014/0204156 A1    Jul. 24, 2014

(30) Foreign Application Priority Data

Jan. 23, 2013   (JP) ................................. 2013-009814

(51) Int. Cl.
*B41J 2/01*   (2006.01)
*B41M 5/50*   (2006.01)
(Continued)

(52) U.S. Cl.
CPC . *B41J 2/01* (2013.01); *B41M 5/502* (2013.01); *C09D 11/322* (2013.01); *C09D 11/38* (2013.01); *C09D 11/40* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......... 347/101, 100, 95, 96, 103, 102, 21, 20; 106/31.6, 31.13
See application file for complete search history.

(56) References Cited

U.S. PATENT DOCUMENTS 7,033,013 B2 *  4/2006  Koyano ................ B41M 5/0017  
                                                          347/100  
7,919,544 B2    4/2011  Matsuyama et al.  
(Continued)

FOREIGN PATENT DOCUMENTS

JP         2860123     12/1998  
JP      2004-330568    11/2004  
(Continued)

OTHER PUBLICATIONS

U.S. Appl. No. 13/973,042, filed Aug. 22, 2013.

*Primary Examiner* — Manish S Shah  
(74) *Attorney, Agent, or Firm* — Cooper & Dunham LLP

(57) ABSTRACT

An inkjet recording method, including applying stimulus to recording ink to allow the ink to jet to record image on recording medium, wherein the recording medium includes support and surface layer on at least one surface thereof, and has transferred amount of pure water on surface thereof at side of the surface layer of 1 to 10 mL/m² with contact duration of 100 ms as measured by dynamic scanning absorptometer, wherein the recording medium is surface-modified with corona discharge treatment or plasma treatment, the ink contains water-dispersible colorant, organic solvent, surfactant, water-dispersible resin, and water, the organic solvent contains polyhydric alcohol(s) having equilibrium moisture content ≥30 mass % at 23° C./80% RH, certain amide compound, and at least one of certain compounds, and total of solid content of the water dispersible colorant (A) and solid content of the water dispersible resin (B) is 8 to 35 mass %, and mass ratio (A/B) is 2 to 8.

10 Claims, 4 Drawing Sheets

(51) Int. Cl.
  *C09D 11/322* (2014.01)
  *C09D 11/38* (2014.01)
  *C09D 11/40* (2014.01)

(56) References Cited

U.S. PATENT DOCUMENTS

| | | | |
|---|---|---|---|
| 8,109,622 | B2 | 2/2012 | Goto et al. |
| 8,242,201 | B2 | 8/2012 | Goto et al. |
| 8,382,271 | B2 | 2/2013 | Goto et al. |
| 8,435,339 | B2 | 5/2013 | Koyano et al. |
| 9,010,918 | B2* | 4/2015 | Gotou ............... B41J 11/0015 347/100 |
| 2003/0144365 | A1* | 7/2003 | Schwartz ............ B01D 19/04 516/132 |
| 2007/0197685 | A1 | 8/2007 | Aruga et al. |
| 2008/0233363 | A1 | 9/2008 | Goto |
| 2008/0248260 | A1* | 10/2008 | Kojima ............... C09D 11/30 347/100 |
| 2009/0290007 | A1 | 11/2009 | Saitoh et al. |
| 2009/0291213 | A1 | 11/2009 | Ohshima et al. |
| 2010/0196601 | A1 | 8/2010 | Goto et al. |
| 2010/0295891 | A1 | 11/2010 | Goto et al. |
| 2011/0057981 | A1 | 3/2011 | Aruga et al. |
| 2011/0318543 | A1* | 12/2011 | Goto ............... C09D 11/324 428/195.1 |
| 2012/0098883 | A1 | 4/2012 | Matsuyama et al. |
| 2012/0207983 | A1 | 8/2012 | Matsuyama et al. |
| 2012/0293582 | A1 | 11/2012 | Goto et al. |
| 2012/0320137 | A1 | 12/2012 | Fujii et al. |
| 2013/0002776 | A1 | 1/2013 | Nagashima et al. |
| 2013/0065028 | A1 | 3/2013 | Fujii et al. |
| 2013/0070017 | A1 | 3/2013 | Fujii et al. |
| 2013/0071637 | A1 | 3/2013 | Matsuyama et al. |
| 2013/0113860 | A1 | 5/2013 | Gotou et al. |
| 2013/0155145 | A1 | 6/2013 | Gotou et al. |
| 2013/0176369 | A1 | 7/2013 | Gotou et al. |
| 2013/0194344 | A1 | 8/2013 | Yokohama et al. |
| 2013/0194345 | A1 | 8/2013 | Tamai et al. |
| 2013/0321525 | A1 | 12/2013 | Fujii et al. |
| 2013/0323474 | A1 | 12/2013 | Gotou et al. |
| 2014/0002539 | A1 | 1/2014 | Goto et al. |

FOREIGN PATENT DOCUMENTS

| | | |
|---|---|---|
| JP | 2007-144975 | 6/2007 |
| JP | 2007-191556 | 8/2007 |
| JP | 2008-163238 | 7/2008 |
| JP | 2009-279796 | 12/2009 |
| JP | 2011-167968 | 9/2011 |
| JP | 2012-107210 | 6/2012 |
| JP | 2013-123852 | 6/2013 |

* cited by examiner

INKJET RECORDING METHOD AND INKJET RECORDING DEVICE

BACKGROUND OF THE INVENTION

1. Field of the Invention

The present invention relates to an inkjet recording method and an inkjet recording device.

2. Description of the Related Art

Inkjet recording methods have been broadly used recently, because the inkjet recording methods are advantageous in that color images can be easily recorded, and running costs are low. However, the inkjet recording methods have a problem that defective images (including blurred character images) are easily formed depending on combinations of a recording ink and a recording medium, which greatly deteriorates image quality. For example, when coated papers which are used for commercial printing or publication printing and which contain a filler such as calcium carbonate and kaolin in their coat layers (hereinafter may be referred to as "commercial printing papers") are used as recording media, there may be caused problems that images are seriously blurred, and image density is seriously low. The reasons for the problems are considered as follows. Specifically, the commercial printing papers cannot absorb a large amount of ink in a short time unlike inkjet recording papers, so that the ink is not rapidly absorbed, leading to a blurred image. In addition, even when the ink penetrates into the coat layer, a filler having a high hiding property (such as kaolin) in the coat layer hides a color of the penetrated ink. Therefore, the commercial printing papers have been considered to be entirely unsuitable for inkjet printing.

As for recording inks, pigment inks in which fine pigment particles are dispersed in water have attracted attention. Since pigments used for the pigment inks are similar in composition to colorants of inks used for icy commercial printing, it is expected that the pigment inks can form images having texture similar to that of images formed on the commercial printing papers. However, even when the pigment inks are used for recording on the commercial printing papers, there are caused problems that the ink is not rapidly absorbed to thereby cause a blurred image; that the pigments are not fixed to the coated papers after drying; and that glossy images cannot be formed.

Accordingly, there has been proposed an inkjet recording method using a combination of a pigment ink having a high penetrability and a recording medium having a low ink absorbability (see Japanese Patent Application Laid-Open (JP-A) No. 2007-144975).

In addition, there has been proposed an inkjet printer in which a heat roller is provided as a drying assisting unit in order to improve a drying property and fixability of a printed surface immediately after printing (see Japanese Patent (JP-B) No. 2860123).

Further, there has been proposed an inkjet printer which forms a protective layer by applying a UV varnish which is solidified through application of UV light in order to protect a paper surface which is decreased in scratch resistance due to pigments remaining thereon (see JP-A No. 2004-330568).

SUMMARY OF THE INVENTION

The present invention aims to provide an inkjet recording method which can achieve high image density, and excellent glossiness and drying property, and which can prevent occurrence of beading and color breading, even when an image is formed on commercial printing paper.

A means for solving the aforementioned problems is as follows:

An inkjet recording method, including:

applying a stimulus to a recording ink to allow the recording ink to jet to thereby record an image on a recording medium, wherein the recording medium includes a support and a surface layer formed on at least one surface of the support, and has a transferred amount of pure water on a surface thereof at a side of the surface layer of 1 mL/m$^2$ to 10 mL/m$^2$ with contact duration of 100 ms as measured by a dynamic scanning absorptometer, wherein the recording medium is surface-modified with a corona discharge treatment or a plasma treatment, wherein the recording ink contains a water-dispersible colorant, an organic solvent, a surfactant, a water-dispersible resin, and water, wherein the organic solvent contains one or more polyhydric alcohols having an equilibrium moisture content of 30% by mass or higher at a temperature of 23° C. and relative humidity of 80%, an amide compound represented by the following General Formula (I), and at least one of compounds represented by the following General Formulae (II) to is (IV), and wherein a total of a solid content of the water dispersible colorant and a solid content of the water dispersible resin is 8% by mass to 35% by mass, and a mass ratio (A/B) of the solid content of the water dispersible resin (A) to the solid content of the water dispersible colorant (B) is 2 to 8:

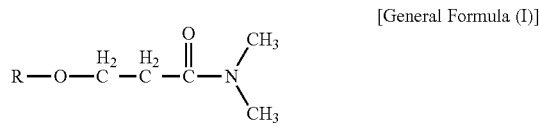

[General Formula (I)]

where, R denotes a C4-C6 alkyl group;

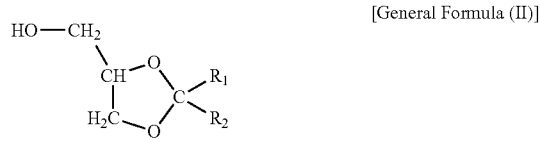

[General Formula (II)]

where $R_1$ denotes a hydrogen atom or a C1-C2 alkyl group, and $R_2$ denotes a C1-C4 alkyl group,

[General Formula (III)]

where $R_3$ denotes a hydrogen atom, a C1-C8 alkyl group, a cyclic alkyl group, or an aromatic ring,

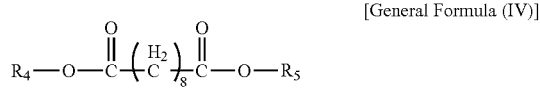

[General Formula (IV)]

where $R_4$ and $R_5$ each denote a C1-C8 alkyl group.

The present invention can solve the above existing problems, and can provide an inkjet recording method which can achieve high image density, and excellent glossiness and drying property, and which can prevent occurrence of beading and color breading, even when an image is formed on commercial printing paper.

Figure 1:
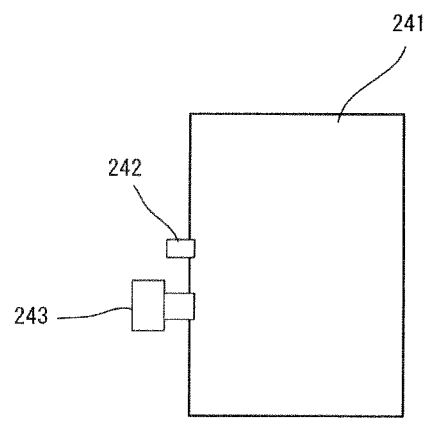
FIG. 1 is a schematic diagram illustrating one example of an ink cartridge.

DETAILED DESCRIPTION OF THE INVENTION (Inkjet Recording Method and Inkjet Recording Device)

An inkjet recording method of the present invention includes at least an ink jetting step; and, if necessary, may further include appropriately selected other steps.

An inkjet recording device of the present invention includes at least an ink jetting unit; and, if necessary, may further include appropriately selected other units.

The inkjet recording method of the present invention can be suitably performed by means of the inkjet recording device of the present invention, and the ink jetting step can be suitably performed by means of the ink jetting unit. Moreover, the other steps can be suitably performed by means of the other units.

<Ink Jetting Step and Ink Jetting Unit>

The ink jetting step is a step of applying a stimulus to a recording ink to allow the recording ink to jet, to thereby record an image on a recording medium; and performed by means of the ink jetting unit.

The ink jetting unit is not particularly limited and may be appropriately selected depending on the intended purpose. Examples thereof include various inkjet nozzles used for ejecting inks.

The stimulus can be generated, for example, by a stimulus generating unit. The stimulus is not particularly limited and may be appropriately selected depending on the intended purpose. Examples thereof include heat (temperature), pressure, vibrations, and light. These may be used alone or in combination. Among them, heat and pressure are preferable.

The stimulus generating unit may be a heating device, a pressurizing device, a piezoelectric element, a vibration generator, an ultrasonic wave oscillator, and a light. Specific examples of the stimulus generating unit include a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

An embodiment of the jetting of the recording ink is not particularly limited, and varies depending on the stimulus. In the case where the stimulus is "heat", for example, there is a method in which a thermal energy corresponding to a recording signal is applied to the recording ink in a recording head, for example, by a thermal head, to thereby generate bubbles in the recording ink by the action of the thermal energy, and then, by the action of pressure of the bubbles, droplets of the recording ink are allowed to be ejected from a nozzle hole of the recording head. In the case where the stimulus is "pressure", moreover, there is a method in which voltage is applied to a piezoelectric element adhered to a pressure chamber in an ink flow channel within a recording head, to thereby bend the piezoelectric element, and reduce a volume of the pressure chamber, so that droplets of the recording ink are allowed to be ejected from a nozzle hole of the recording head.

<<Recording Medium>>

The recording medium is not particularly limited and may be appropriately selected depending on the intended purpose, as long as it includes a support and a surface layer formed on at least one surface of the support. However, suitable are a coated paper, a gloss paper, a coat paper, an art paper, and a general-purpose printing paper (may be referred to as "super-art paper") from the viewpoint of attaining image quality to be demanded. Among them, a recording medium having a liquid absorptivity within a certain range is preferable because it can achieve excellent image quality (e.g. image density, color saturation, no beading, and no color breading), as well as excellent drying property and fixability. Specifically, the preferable recording medium has a transferred amount of pure water on a surface thereof at a side of the surface layer of 1 mL/m$^2$ to 10 mL/m$^2$ with contact duration of 100 iris as measured by a dynamic scanning absorptometer. The transferred amount of pure water is preferably 2 mL/m$^2$ to 8 mL/m$^2$. When the transferred amount is less than 1 mL/m$^2$, an ink is not rapidly absorbed to thereby cause a blurred image, and the resulting image is not easily fixed after drying. When the transferred amount is more than 10 mL/m$^2$, the recording medium is a plain paper without a coated layer, and glossy images cannot be formed, which may be problematic as commercial printing image.

The dynamic scanning absorptometer (DSA; Kukan Shigenori, Journal of Japan Technical Association of the Pulp and Paper Industry, Vol. 48, May 1994, pp 88-92) is a device that can accurately measure a liquid absorption amount during a very short period of time. The dynamic scanning absorptometer automatically performs a measurement as follows. (i) The dynamic scanning absorptometer directly reads an absorption speed based on shift of a meniscus in a capillary. (ii) A disc-shaped sample is prepared, and an absorption head is scanned over the sample in a spiral manner. The scanning speed is automatically changed according to a predetermined pattern. Herein, one sample is used for measurements of a required number of spots. A head for supplying liquid to a paper sample is connected to the capillary via a TEFLON (registered trademark) tube. A position of the meniscus in the capillary is automatically read by an optical sensor. More specifically, the dynamic scanning absorptometer (Model KM500win, product of Kumagai Riki Kogyo Co., Ltd.) was used to measure the transferred amount of purified water. The transferred amount with contact duration of 100 ms can be obtained based on the measurements of the transferred amounts with contact durations around the contact duration by interpolation.

Note that, the transferred amount of purified water is a value measured on the recording medium which has never been surface-modified with a corona discharge treatment or a plasma treatment.

—Support—

The support is not particularly limited and may be appropriately selected depending on the intended purpose. Examples thereof include paper mainly formed of wood fibers, and a sheet material mainly formed of wood fibers and synthetic fibers.

The paper is not particularly limited and may be appropriately selected from those known in the art depending on the intended purpose. Examples thereof include wood pulp, and recycled pulp. Examples of the wood pulp include hardwood bleached kraft pulp (LBKP), softwood bleached kraft pulp (NBKP), NBSP, LBSP, GP, and TMP.

A thickness of the support is not particularly limited and may be appropriately selected depending on the intended purpose, but is preferably 50 µm to 300 µm. A basis weight of the support is not is particularly limited and may be appropriately selected depending on the intended purpose, but is preferably 45 g/m² to 290 g/m².

—Surface Layer—

The surface layer contains a pigment and a binder (a binding agent); and, if necessary, may further contain a surfactant and other components.

As for the pigment, an inorganic pigment, or a combination of an inorganic pigment and an organic pigment can be used.

Examples of the inorganic pigment include kaolin, talc, and heavy calcium carbonate. Among them, kaolin is particularly preferable because it exhibits excellent glossiness and achieves texture similar to offset printing paper.

Examples of the kaolin include delaminated kaolin, calcined kaolin, and engineered kaolin which is, for example, surface-modified. In view of exhibiting excellent glossiness, it is preferable that kaolin having a particle size distribution in which 80% by mass or more of particles have a particle diameter of 2 µm or smaller is contained in an amount of 50% by mass or more relative to the whole amount of kaolin.

An amount of the kaolin added to the surface layer is not particularly limited and may be appropriately selected depending on the intended purpose, but is preferably 50 parts by mass or larger relative to 100 parts by mass of the binder. When the amount thereof is smaller is than 50 parts by mass, sufficient glossiness may not be obtained. The upper limit for the amount of the kaolin is not particularly limited and may be appropriately selected depending on the intended purpose, but it is preferably 90 parts by mass or smaller from the viewpoint of suitability for coating considering flowability and thickening property of kaolin particularly under high shearing force.

Examples of the organic pigment include water-soluble dispersions of styrene-acrylic copolymer particles, of styrene-butadiene copolymer particles, of polystyrene particles, and of polyethylene particles. These may be used alone or in combination.

An amount of the organic pigment is not particularly limited and may be appropriately selected depending on the intended purpose, but is preferably 2 parts by mass to 20 parts by mass relative to 100 parts by mass of all the pigments contained in the surface layer. The organic pigment exhibits excellent glossiness and has lower specific gravity than an inorganic pigment. Therefore, a surface layer which is bulky, has high glossiness, and has high surface coverage can be obtained. When the amount of the organic pigment is smaller than 2 parts by mass, the above effects are not obtained. When the amount thereof is larger than 20 parts by mass, a coating solution is deteriorated in flowability, leading to low coating operation efficiency. It is also economically disadvantageous in terms of cost.

The organic pigments are classified into a solid pigment, a hollow pigment, and a donut-shaped pigment, in terms of their shapes. In view of a balance among glossiness, surface coverage, and flowability of a coating solution, the average particle diameter ($D_{50}$) thereof is preferably 0.2 µm to 3.0 µm. More preferably, the hollow pigment having a void ratio of 40% or higher is used.

As the binder, an aqueous resin is preferably used.

As the aqueous resin, a water-soluble resin, a water-dispersible resin, or any combination thereof is preferably used. The water-soluble resin is not particularly limited and may be appropriately selected depending on the intended purpose. Examples of the water-soluble resin include modified polyvinyl alcohols such as anion-modified polyvinyl alcohol, cation-modified polyvinyl alcohol, and acetal-modified polyvinyl alcohol; polyurethane; and synthetic resins such as polyester, and a copolymer of polyester and polyurethane. These may be used alone or in combination.

Among them, polyvinyl alcohol, cation-modified polyvinyl alcohol, acetal-modified polyvinyl alcohol, polyester, polyurethane, and a copolymer of polyester and polyurethane are particularly preferable from the viewpoint of ink absorptivity.

The water-dispersible resin is not particularly limited and may be appropriately selected depending on the intended purpose. Examples thereof include polyvinyl acetate, ethylene/vinyl acetate copolymer, and polystyrene. Other examples include those containing cross-linking agents such as methylol melamine, methylol urea, methylol hydroxypropylene urea, and isocyanate; and self-crosslinkable copolymers containing units such as N-methylolacrylamide.

An amount of the aqueous resin is not particularly limited and may be appropriately selected depending on the intended purpose, but is preferably 2 parts by mass to 100 parts by mass, more preferably 3 parts by mass to 50 parts by mass, relative to 100 parts by mass of the pigment. The amount of the aqueous resin added is determined so that a liquid absorptivity of the resulting recording medium falls within a desirable range.

When a water-dispersible colorant is used as the colorant, a cationic organic compound is not necessarily added to the surface layer. The cationic organic compound added to the surface layer is not particularly limited and may be appropriately selected depending on the intended purpose. Examples thereof include monomers, oligomers, polymers of primary to tertiary amine or quaternary ammonium salt which react with a sulfonic carboxyl, or amino group in a direct dye or acidic dye in an aqueous ink to form an insoluble salt. Among them, the oligomers or polymers are preferable.

Examples of the cationic organic compound include dimethylamine-epichlorhydrin polycondensates, dimethylamine-ammonia-epichlorhydrin condensates, poly(trimethylaminoethyl methacrylate-methyl sulfate), and polyarylamine hydrochloride. These may be used alone or in combination.

Among them, combinations of low molecular weight cationic organic compounds such as dimethylamine-epichlorhydrin polycondensates and polyarylamine hydrochloride, with other relatively high molecular weight cationic organic compounds such as poly(diallyldimethylammonium chloride) are preferable. Combined use improves image density and further reduces feathering compared to individual use.

A cation equivalent of the cationic organic compounds as measured by a colloid titration method (using polyvinyl potassium sulfate, toluidine blue) is not particularly limited and may be appropriately selected depending on the intended purpose, but is preferably 3 meq/g to 8 meq/g. The cation equivalent in this range yields the below-described deposition amount on dry basis.

For measuring the cation equivalent by the colloid titration method, the cationic organic compound is diluted with distilled water so as to give a solid content of 0.1% by mass, and pH adjustment is not conducted.

A deposition amount of the cationic organic compound is not particularly limited and may be appropriately selected depending on the intended purpose, but is preferably 0.3 g/m² to 2.0 g/m² on dry basis. When the deposition amount of the cationic organic compound is smaller than 0.3 g/m² on dry basis, satisfactory effects of improving image densities and reducing feathering may not be obtained.

The surfactant optionally contained in the surface layer is not particularly limited and may be appropriately selected depending on the intended purpose, and any of an anionic surfactant, a cationic surfactant, an amphoteric surfactant, or nonionic surfactant can be used as the surfactant. Among them, the nonionic surfactant is particularly preferable. By adding the surfactant, water resistance of the resulting image is improved, and the resulting image has higher image density with improved breading.

Examples of the nonionic surfactant include higher alcohol ethylene oxide adducts, alykylphenol ethylene oxide adducts, and fatty acid ethylene oxide adducts. These may be used alone or in combination.

The polyhydric alcohol is not particularly limited and may be appropriately selected depending on the intended purpose. Examples thereof include glycerol, trimethylolpropane, and pentaerythritol. As for the ethylene oxide adducts, ethylene oxide partly substituted with alkylene oxide such as propylene oxide or butylene oxide can also be effective as long as they keep water solubility. The substitution rate is preferably 50% or lower. An HLB (hydrophilic-lipophilic balance) of the nonionic surfactants is not particularly limited and may be appropriately selected depending on the intended purpose, but is preferably 4 to 15, more preferably 7 to 13.

An amount of the surfactant is not particularly limited and may be appropriately selected depending on the intended purpose, but is preferably 10 parts by mass or less, more preferably 0.1 parts by mass to 1.0 part by mass relative to 100 parts by mass of the cationic organic compound.

Other components may be further added to the surface layer, if necessary, provided that they do not adversely affect the object and effect of the present invention. Examples of the other components include additives such as alumina powder, a pH regulator, a preservative, and antioxidant.

A method for forming the surface layer is not particularly limited and may be appropriately selected depending on the intended purpose. For example, the surface layer can be formed by a method in which a surface layer solution is impregnated into or applied onto the support. The method for impregnating or applying the surface layer solution is not particularly limited and may be appropriately selected depending on the intended purpose. For example, it can be applied by various coaters such as a conventional size press, gate roll size press, film transfer size press, blade coater, rod coater, air knife coater, and curtain coater. From a viewpoint of cost, a conventional size press, gate roll size press, or film transfer press, which is equipped in papermaking machine, can be used for impregnation or application, which is followed by on-machine finishing.

The application amount of the surface layer solution is not particularly limited and may be appropriately selected depending on the intended purpose, but it is preferably 0.5 g/m² to 20 g/m², more preferably 1 g/m² to 15 g/m² on solid basis.

After the impregnation or application of the surface layer solution, the solution may be dried, if necessary. In this case, a temperature for drying is not particularly limited and may be appropriately selected depending on the intended purpose, but it is preferably 100° C. to 250° C.

The recording medium may further contain a back layer on a back surface of the support. The recording medium may also contain other layers between the support and the surface layer or between the support and the back layer, and may have a protective layer on the surface layer, if necessary. Each of these layers may be a single layer, or a multi layer.

The recording medium is not particularly limited and may be commercially available products. Examples of the commercially available products include RICOH BUSINESS COAT GLOSS100 (product of Ricoh Company, Ltd.), OK TOP COAT+, OK KINFUJI+, and SA KINFUJI+ (all products are of Oji Paper Co., Ltd.), SUPER MI DAL, AURORA COAT, SPACE DX (all products are of Nippon Paper Industries Co Ltd.), ALPHA-MATTE, and MU COAT (all products are of HOKUETSU KISHU PAPER CO., LTD.), RAICHO ART, and RAICHO SUPER ART (all products are of Chuetsu Pulp & Paper Co., Ltd.), and PEARL COAT N (product of Mitsubishi Paper Mills Ltd.).

The recording medium is surface-modified with a corona discharge treatment or a plasma treatment. The corona discharge treatment or plasma treatment modifies a polymer material contained in the surface layer of the recording medium. An image formed using a surface-modified recording medium has an excellent drying property, and beading and color breading therein can be prevented from being occurred.

The corona discharge treatment can be performed using a commercially available corona discharge device such as a corona surface modification evaluation device TEC-4AX (product of KASUGA ELECTRIC WORKS LTD).

Treatment dose used for the corona discharge treatment is not particularly limited and may be commercially available products, but is preferably 20 W·min/m² to 1,000 W·min/m², more preferably 50 W·min/m² to 500 W·min/m².

The plasma treatment can be performed using a commercially available plasma treatment device such as a plasma shower irradiation device PS-601SW (product of Asakusa Machinery Co., LTD.).

Treatment dose used for the plasma treatment is not particularly limited and may be commercially available products, but is preferably 20 W·min/m² to 1,000 W·min/m², more preferably 50 W·min/m² to 500 W·min/m².

When treatment dose of the corona discharge treatment or the plasma treatment is too small, the following effects are impaired: (1) surface cleansing effect (improvement of wettability resulting from stain removal), (2) surface roughening effect (improvement of binding property resulting from concave and convex formation on a surface on a molecular scale, (3) activation effect (improvement of wettability resulting from hydrophilization of a surface polymer), and (4) fine pores-forming effect (improvement of penetrability resulting from fine pores), so that drying property may be deteriorated and occurrence of color breading may not be prevented.

When treatment dose of the corona discharge treatment or the plasma treatment is too large, commercial printing papers are seriously damaged and deteriorated, and a surface thereof is significantly roughened, so that circler dots may be difficult to be produced.

<<Recording Ink>>

The recording ink contains at least an organic solvent, a water-dispersible colorant, a water-dispersible resin, a surfactant, and water; preferably contains a penetrating agent; and, if necessary, further contains other components.

<<<Organic Solvent>>>

The inkjet ink contains, as the organic solvent, one or more polyhydric alcohols having an equilibrium moisture content of 30% by mass or higher at a temperature of 23° C. and humidity of 80% RH; at least an amide compound represented by the following General Formula (0; and at least one of compounds represented by the following General Formulae (II) to (IV). Use a mixture of these compounds as the organic solvent can achieve high image density, and excellent glossiness and drying property, and can prevent occurrence of beading and color breading, even when an image is formed on commercial printing paper.

[General Formula (I)]

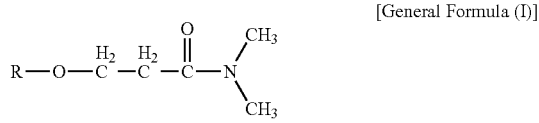

In the General Formula (I), R denotes a C4-C6 alkyl group.

Examples of the C4-C6 alkyl group include a butyl group, an isobutyl group, a tertiary butyl group, a pentyl group, an isopentyl group, a hexyl group, and an isohexyl group.

[General Formula (II)]

In the General Formula (II), $R_1$ denotes a hydrogen atom or a C1-C2 alkyl group, and $R_2$ is a C1-C4 alkyl group.

Examples of the C1-C2 alkyl group include a methyl group, and an ethyl group.

Examples of the C1-C4 alkyl group include a methyl group, an ethyl group, a propyl group, an isopropyl group, a butyl group, an isobutyl group, and a tertiary butyl group.

[General Formula (III)]

In the General Formula (III), $R_3$ denotes a hydrogen atom, a C1-C8 alkyl group, a cyclic alkyl group, or an aromatic ring.

Examples of the C1-C8 alkyl group represented by $R_3$ include a methyl group, an ethyl group, a propyl group, an isopropyl group, a butyl group, an isobutyl group, a tertiary butyl group, a pentyl group, an isopentyl group, a hexyl group, an isohexyl group, a heptyl group, an isoheptyl group, an octyl group, and an isooctyl group.

Examples of the cyclic alkyl group represented by $R_3$ include a cyclopropyl group, a cyclobutyl group, a cyclopentyl group, a cyclohexyl group, a cycloheptyl group, and a cyclooctyl group.

Examples of the aromatic ring represented by $R_3$ include a phenyl group, a tolyl group, and a xylyl group.

[General Formula (IV)]

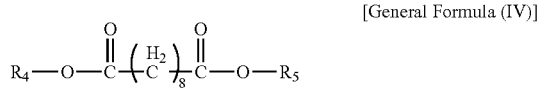

In the General Formula (IV), $R_4$ and $R_5$ both denote a C1-C8 alkyl group.

Examples of the C1-C8 alkyl group include a methyl group, an ethyl group, a propyl group, an isopropyl group, a butyl group, an isobutyl group, a tertiary butyl group, a pentyl group, an isopentyl group, a hexyl group, an isohexyl group, a heptyl group, an isoheptyl group, an octyl group, and an isooctyl group.

Specific examples of amide compounds represented by the General Formula (I) are listed below, but not limited thereto.

[Structural Formula (I-1)]

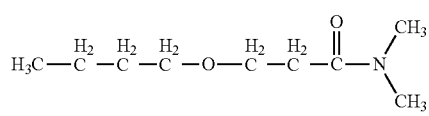

[Structural Formula (I-2)]

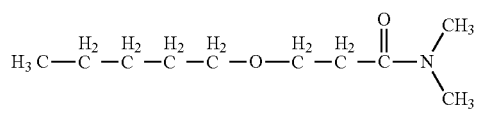

[Structural Formula (I-3)]

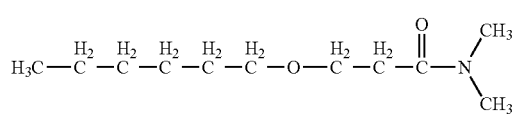

Specific examples of amide compounds represented by the General Formula (II) are listed below, but not limited thereto.

[Structural Formula (II-1)]

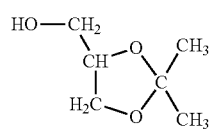

[Structural Formula (II-2)]

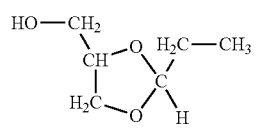

[Structural Formula (II-3)]

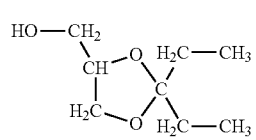

[Structural Formula (II-4)]

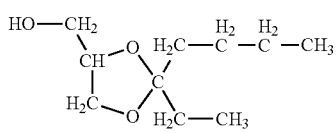

Specific examples of amide compounds represented by the General Formula (III) are listed below, but not limited thereto.

[Structural Formula (III-1)]

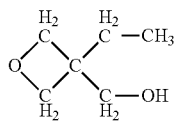

[Structural Formula (III-2)]

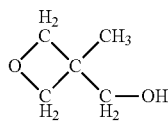

[Structural Formula (III-3)]

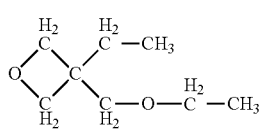

[Structural Formula (III-4)]

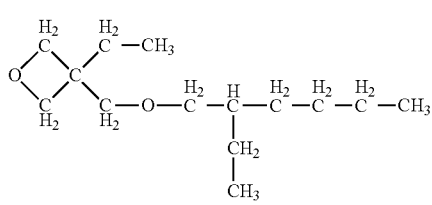

[Structural Formula (III-5)]

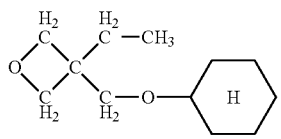

[Structural Formula (III-6)]

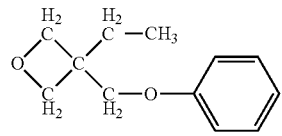

Specific examples of amide compounds represented by the General Formula (IV) are listed below, but not limited thereto.

[Structural Formula (IV-1)]

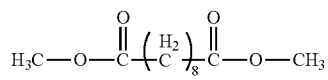

[Structural Formula (IV-2)]

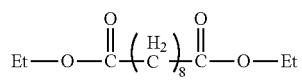

In the Structural Formula (IV-2). Et denotes an ethyl group.

[Structural Formula (IV-3)]

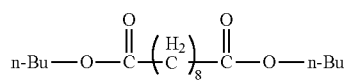

In the Structural Formula (IV-3), n-Bu denotes an n-butyl group.

[Structrural Formula (IV-4)]

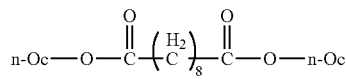

In the Structural Formula (IV-4), n-Oc denotes an n-octyl group.

[Structural Formula (IV-5)]

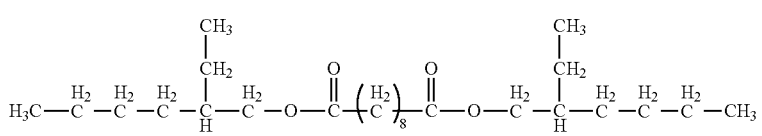

An amount of an amide compound represented by the General Formula (I) contained in the recording ink is not particularly limited and may be appropriately selected depending on the intended purpose, but is preferably 1% by mass to 50% by mass, more preferably 2% by mass to 40% by mass.

When the amount is less than 1% by mass, the amide compound does not exhibit an effect of reducing viscosity of the resulting ink, potentially leading to low ejection stability of the ink. When the amount is more than 50% by mass, drying property on a recording medium is deteriorated and an image blur is caused, potentially leading to deterioration of image quality.

An amount of a mixture of an amide compound represented by the General Formula (I) and at least one of compounds represented by the General Formulae (II) to (IV) contained in the recording ink is not particularly limited and may be appropriately selected depending on the intended purpose, but is preferably 1% by mass to 50% by mass, more preferably 2% by mass to 40% by mass. When the amount is less than 1% by mass, image quality is not improved, and penetrability into commercial printing paper is deteriorated, potentially leading to beading and color breading. When the amount is more than 50% by mass, an ink is increased in viscosity and ejection property thereof may be deteriorated.

An amide compound represented by the following Structural Formula (1) is preferably contained as the organic solvent. The amide compound represented by the Structural Formula (1) is preferable because it can lower viscosity of a recording ink containing a mixture of an amide compound represented by the General Formula (I) and at least one of compounds represented by the General Formulae (II) to (IV).

[Structural Formula (1)]

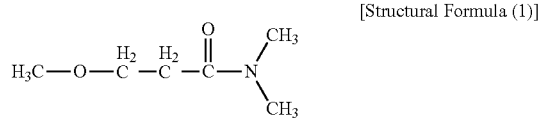

The amide compound represented by the Structural Formula (I) has a high boiling point of 216° C., a high equilibrium moisture content at the temperature of 23° C. and relative humidity of 80% of 39.2% by mass, and a very low fluid viscosity at 25° C. of 1.48 mPa·s. The amide compound represented by the General Formula (I) and at least one of the compounds represented by the General Formulae (II) to (IV) can lower viscosity of the resulting recording ink because they are very easily dissolved in water. Thus, they are very preferable as an organic solvent used for a recording ink. The recording ink containing the amide compound represented by the General Formula (I) has a high equilibrium moisture content, and low viscosity, and thus it has desirable storage stability and ejection stability.

The organic solvent should contain one or more polyhydric alcohols having 30% by mass or more of equilibrium moisture content at the temperature of 23° C. and relative humidity of 80%.

The polyhydric alcohol is not particularly limited and may be appropriately selected depending on the intended purpose. Examples thereof include 1,2,3-butanetriol (38% by mass), 1,2,4-butanetriol (41% by mass), glycerin (49% by mass), diglycerin (38% by mass), triethylene glycol (39% by mass), tetraethylene glycol (37% by mass), diethylene glycol (43% by mass), and 1,3-Butanediol (35% by mass). Herein, a numerical value in parentheses denotes equilibrium moisture content at the temperature of 23° C. and relative humidity of 80%. These may be used alone or in combination. Among them, particularly preferable are glycerin and 1,3-butanediol.

The equilibrium moisture content of the polyhydric alcohol can be measured by storing a pet dish containing 1 g of the polyhydric alcohol in a desiccator of which internal temperature and humidity are maintained at 23° C.±1° C. and 80% RH±3% RH, respectively, using a potassium chloride/sodium chloride saturated aqueous solution. The equilibrium moisture content of the polyhydric alcohol can be calculated according to the following Numerical Formula 1.

(Mass of water absorbed into polyhydric alcohol)/
(Mass of polyhydric alcohol+Mass of water
absorbed into polyhydric alcohol)×100   [Numerical Formula 1]

An amount of the polyhydric alcohol contained in the recording ink is not particularly limited and may be appropriately selected depending on the intended purpose, but is preferably 2% by mass to 50% by mass, more preferably 5% by mass to 40% by mass. When the amount is less than 2% by mass, ejection stability of the resulting ink may be deteriorated. When the amount is more than 50% by mass, beading may occur in the case where an image onto which a large amount of ink is deposited is formed on commercial printing paper.

Notably, the recording ink may further contain other organic solvents having 30% by mass or more of the equilibrium moisture content at the temperature of 23° C. and relative humidity of 80%.

Examples of the other organic solvents include polyhydric alcohols having less than 30% by mass of the equilibrium moisture content at the temperature of 23° C. and relative humidity of 80% (e.g., dipropylene glycol, 1,5-pentanediol, propylene glycol, 2-methyl-2,4-pentanediol, ethylene glycol, tripropylene glycol, hexylene glycol, polyethylene glycol, polypropylene glycol, 1,6-hexanediol, 1,2,6-hexanetriol, trimethylol ethane, and trimethylol propane; polyhydric alcohol alkyl ethers (e.g., ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, and propylene glycol monoethyl ether; polyhydric alcohol aryl ethers (e.g., ethylene glycol monophenyl ether, and ethylene glycol monobenzyl ether); nitrogen-containing heterocyclic compounds (e.g., 2-pyrrolidone, N-methyl-2-pyrrolidone, 1,3-dimethyl-2-imidazolidinone, ε-caprolactam, and γ-butyrolactone); amides (e.g., formamide, N-methylformamide, N,N-dimethylformamide, and N,N-diethylformamide); amines (e.g., monoethanolamine, diethanolamine, triethanolamine, N,N-dimethylmonoethanolamine, N-methyldiethanolamine, N-methylethanolamine, N-phenylethanolamine, and 3-aminopropyldiethyl amine); sulfur-containing compounds (e.g., dimethyl sulfoxide, sulfolane, and thiodiglycol); propylene carbonate; and ethylene carbonate. These may be used alone or in combination.

Examples of other wetting agents include sugars and sugar derivatives.

The sugars are not particularly limited and may be appropriately selected depending on the intended purpose. Examples thereof include monosaccharides (e.g., glucose, mannose, fructose, ribose, xylose, arabinose, and galactose), disaccharides (e.g., maltose, cellobiose, lactose, sucrose, and trehalose), oligosaccharides (e.g., maltotriose), and polysaccharides (e.g., α-cyclodextrin and cellulose).

Examples of the sugar derivatives include reducing sugars of sugar alcohols (e.g., maltitol and sorbitol); oxidized sugars (e.g., aldonic acids and uronic acids), amino acids, and thio acids.

The organic solvent preferably contains an alkylalkanediol.

As for the alkylalkanediol, those of which main chain is a C3-C6 alkanediol and of which side chain is a C1-C2 alkyl can be easily penetrated into a recording medium because they are water-soluble in terms of a balance between hydrophilic groups and hydrophobic groups, and are rich in hydrophobic groups. Among them, particularly preferable are 2-methyl-1,3-propanediol (bp: 214° C.), 3-methyl-1,5-pentanediol (bp: 250° C.), and 2-ethyl-1,3-hexanediol (bp: 243.2° C.).

An amount of the alkylalkanediol contained in the recording ink is not particularly limited and may be appropriately selected depending on the intended purpose, but is preferably 2% by mass to 40% by mass, more so preferably 5% by mass to 30% by mass. When the amount is less than 2% by mass, the resulting ink has no penetrability into a recording medium, and no image quality-improving effect. Additionally, penetrability into commercial printing papers is deteriorated, potentially leading to beading and color breading. When the amount is more than 40% by mass, an ink is increased in viscosity and ejection property thereof may be deteriorated.

A total amount of the organic solvent contained in the recording ink is not particularly limited and may be appropriately selected depending on the intended purpose, but is preferably 20% by mass to 80% by mass, more preferably 25% by mass to 70% by mass. When the total amount is less than 20% by mass, ejection stability of the resulting ink may be deteriorated. When the total amount is more than 80% by mass, the resulting recording ink has very high viscosity, so that ejection property thereof is lowered and drying property on a recording medium may be deteriorated.

<<<Water-Dispersible Resin>>>

The water-dispersible resin is useful for recording an image having high water resistance and high image density (high color developability) because it has excellent film formability (image formability) and having high water repellency, high water resistance, and high weather resistance. Examples of the water-dispersible resin include a condensed synthetic resin, an addition synthetic resin and a natural polymer compound.

Examples of the condensed synthetic resin include a polyester resin, a polyurethane resin, a polyepoxy resin, a polyamide resin, a polyether resin, a poly(meth)acrylic resin, an acryl-silicone resin, and a fluororesin.

Examples of the addition synthetic resin include a polyolefin resin, a polystyrene resin, a polyvinyl alcohol resin, a polyvinyl ester resin, a polyacrylic acid resin, and an unsaturated carboxylic acid resin.

Examples of the natural polymer compound include celluloses, rosins, and natural rubbers.

These water-dispersible resins may be used alone or in combination.

Among them, a urethane resin, an acryl-silicone resin, and a fluororesin are particularly preferable.

An amount of the water-dispersible resin contained in the recording ink is not particularly limited and may be appropriately selected depending on the intended purpose, but is preferably 2% by mass to 30% by mass, more preferably 5% by mass to 25% by mass on a solid basis.

<<<Water-Dispersible Colorant>>>

The water-dispersible colorant is preferably a pigment. Preferable embodiments where the colorant is a pigment include the is following first to third embodiments.

(1) In the first embodiment, the colorant contains a pigment (may also referred to as a "self-dispersible pigment" hereinafter), which has at least one hydrophilic group on a surface thereof, and exhibits water-dispersibility in the absence of a dispersant.

(2) In the second embodiment, the colorant is a pigment dispersion liquid containing a pigment, a pigment dispersant, and a polymer dispersion stabilizing agent; and the polymer dispersion stabilizing agent is at least one selected from α-olefin/maleic anhydride copolymer, styrene/(meth)acrylic copolymer, water-soluble polyurethane resin, and water-soluble polyester resin.

(3) In the third embodiment, the colorant contains pigment-containing polymer particles in which each of polymer particles contains a pigment.

As the pigment, an organic pigment, or an inorganic pigment can be used. Note that, a dye may be contained in combination with the pigment for the purpose of adjusting color tone, as long as the dye does not deteriorate weather resistance of the resulting ink.

Examples of the inorganic pigment include titanium oxide, iron oxide, calcium carbonate, barium sulfate, aluminum hydroxide, barium yellow, cadmium red, chrome yellow, and carbon black. Among them, carbon black is particularly preferable. Examples of the arbon black include those produced by known methods such as a contact method, furnace method and thermal method.

Examples of the organic pigment include an azo pigment, polycyclic pigment, dye chelate, nitro pigment, nitroso pigment, and aniline black. Among them, the azo pigment, and polycyclic pigment are more preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment.

Examples of the dye chelate include a basic dye chelate, and an acidic dye chelate.

A color of the colorant is not particularly limited and may be appropriately selected depending on the intended purpose. Examples thereof include a colorant for black, and a colorant for colors. These may be used alone or in combination.

Examples of the colorant for black include carbon blacks (C. I. Pigment Black 7) such as furnace black, lamp black, acetylene black, and channel black; metals such as copper, iron (C. I. Pigment Black 11), and titanium oxide; and organic pigments such as aniline black (C. I. Pigment Black 1).

Examples of the commercially available products of the carbon black include carbon black available from Cabot Corporation under trade names of REGAL (registered trademark), BLACK PEARLS (registered trademark), ELFTEX (registered trademark), MONARCH (registered trademark), MOGUL (registered trademark), and VULCAN (registered trademark).

Examples of the colorant for colors include: C. I. Pigment Yellow 1, 3, 12, 13, 14, 17, 24, 34, 35, 37, 42 (yellow iron oxides), 53, 55, 74, 81, 83, 95, 97, 98, 100, 101, 104, 108, 109, 110, 117, 120, 128, 138, 150, 151, 153, 155, 183, and 213; C. I. Pigment Orange 5, 13, 16, 17, 36, 43, and 51; C. I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C. I. Pigment Violet 1 (Rhodamine Lake), 3, 5:1, 16, 19, 23, 38; C. I. Pigment Blue 1, 2, 15 (Phthalocyanine blue), 15:1, 15:2, 15:3 (Phthalocyanine blue), 15:4 (Phthalocyanine blue), 16, 17:1, 56, 60, and 63; and C. I. Pigment Green 1, 4, 7, 8, 10, 17, 18, and 36. Other suitable pigments are described in The Color Index, 3rd edit. (The Society of Dyers and Colourists, 1982).

—Water-Dispersible Colorant of First Embodiment—

The water-dispersible pigment of the first embodiment is a pigment which has been surface-modified so that at least one hydrophilic group is, directly or via another atom group, bound to a surface of the pigment. The surface is modified by, for example, the following methods: a method in which a specific functional group (functional group such as a sulfone group and a carboxyl group) is chemically bound to a surface of a pigment, or a method in which a surface of a pigment is subjected to wet oxidization treatment using a hypohalous acid and/or a salt thereof. Among them, particularly preferable is the embodiment where a carboxyl group is bound to a surface of a pigment, which is dispersed in water. The water-dispersible pigment of the first embodiment which is surface-modified in the manner mentioned above and to which surface a carboxyl group is bound can achieve dispersion stability and higher printing quality, and further improve water resistance of a recording medium after printing.

An ink containing the self-dispersible pigment of the first embodiment is excellent in redispersibility after being dried, and thus excellent printing can be performed easily with a simple cleaning operation without causing clogging, even when printing operation is stopped for a long period of time, and moisture in the ink in the proximity to an inkjet head nozzle is evaporated.

The volume average particle diameter ($D_{50}$) of the self-dispersible pigment in the ink is preferably 0.01 μm to 0.16 μm.

Examples of an anionic functional group in the self-dispersible pigment include —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$ (where M denotes a hydrogen atom, an alkali metal, quaternary ammonium or organic ammonium, preferably quaternary ammonium). These may be used alone or in combination.

Among them, —COOM, —SO$_3$M, —PO$_3$HM, and —PO$_3$M$_2$ are preferable, and —COOM and —SO$_3$M are particularly preferable.

Examples of the alkali metal represented by "M" in the functional group include lithium, sodium and potassium. Examples of the organic ammonium include monomethyl ammonium to trimethyl ammonium, monoethyl ammonium to triethyl ammonium, and monomethanol ammonium to trimethanol ammonium. As for a method of obtaining an anionically charged color pigment, examples of methods for introducing —COONa to a surface of a color pigment include a method for oxidizing a color pigment with sodium hypochlorite, a method for sulfonating a color pigment, and a method in which a color pigment is reacted with diazonium salt.

The cationic hydrophilic group is preferably a quaternary ammonium group, more preferably the following quaternary ammonium groups.

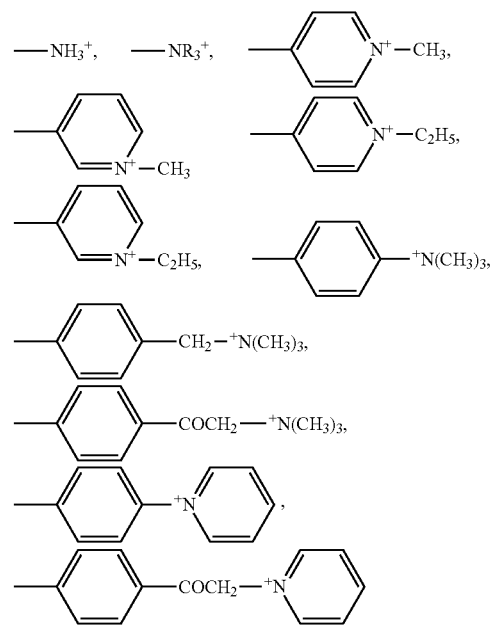

Examples of the quaternary ammonium ion include tetramethyl ammonium ion, tetraethyl ammonium ion, tetrapropyl ammonium ion, tetrabutyl ammonium ion, tetrapentyl ammonium ion, benzyltrimethyl ammonium ion, benzyltriethyl ammonium ion, and tetrahexyl ammonium ion. Among them, tetraethyl ammonium ion, tetrabutyl ammonium ion, and benzyltrimethyl ammonium ion are preferable, and tetrabutyl ammonium ion is particularly preferable.

Examples of the anionic functional group include anionic polar groups such as a carboxylic acid group, a sulfonic acid group, a phosphate group, an amide group, and a sulfonamide group. Among them, carboxylic acid, and p-aminobenzoic acid are preferable.

The anionic functional groups can be bound to surfaces of pigment particles in accordance with methods described in JP-B No. 4697757, JP-A No. 2003-513137, International Publication No. WO97/48769, and JP-A Nos. 10-110129, 11-246807, 11-57458, 11-189739, 11-323232, and 2000-265094.

Use of the water-dispersible colorant having the anionic functional group and the quaternary ammonium ion enables to maintain a stable dispersion state of the water-dispersible colorant, because it exhibits affinity with either a water-rich ink, or an organic solvent-rich ink from which moisture has been evaporated.

A method for producing a cationic self-dispersible pigment to which the hydrophilic group is bound is not particularly limited and may be appropriately selected depending on the intended purpose. Examples thereof include a method for binding N-ethyl pyridyl group represented by the following Structural Formula to carbon black by treating carbon black with 3-amino-N-ethylpyridinium bromide.

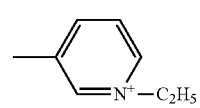

The hydrophilic group may be bound to a surface of carbon black via another atom group.

Examples of another atom group include a C1-C12 alkyl group, a le substituted or unsubstituted phenyl group, or a substituted or unsubstituted naphthyl group. Specific examples of the case where the hydrophilic group is bound to a surface of carbon black via another atom group include —$C_2H_4COOM$ (where M denotes an alkali metal or a quaternary ammonium), —$PhSO_3M$ (where Ph denotes a phenyl group, and M denotes an alkali metal or a quaternary ammonium), and —$O_5H_{10}NH_3+$.

<<Another Embodiment of First Embodiment>>

As another embodiment of the first embodiment, preferable is a modified pigment which has been modified with a geminal bisphosphonic acid group, or a geminal bisphosphonate group.

Examples of the modified pigment include modified pigments which have been modified with any of groups represented by the following Structural Formulae (i), (ii), (iii), or (iv):

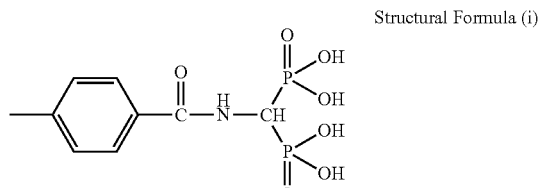

Structural Formula (i)

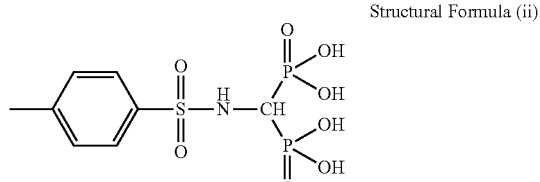

Structural Formula (ii)

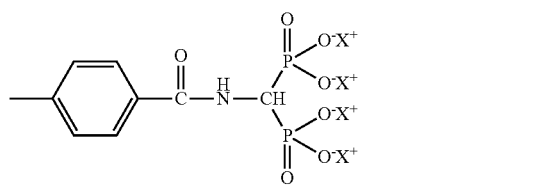

Structural Formula (iii)

In the Structural Formula (iii) $X^+$ denotes $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

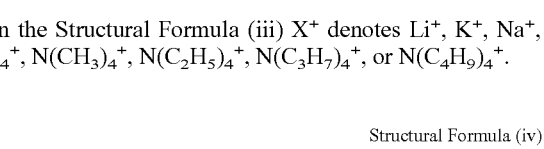

Structural Formula (iv)

In the Structural Formula (iv), $X^+$ denotes $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

The surface modification now will be specifically described.

A dispersion containing the modified pigment is prepared by one of the below-described general methods. The method is preferably a method in which the pigment is allowed to react with compounds represented by the following formulae (IV) and (V), and a phosphonic acid group therein is substituted with alkali metal and organic ammonium to thereby further enhance dispersibility of the pigment to water.

[Compound of Structural Formula (IV)]

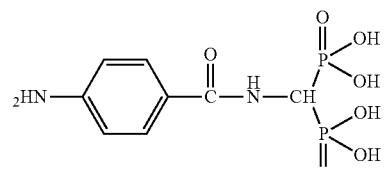

[Compound of Structural Formula (V)]

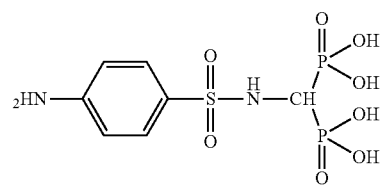

<Surface Modification Treatment of Pigment>

—Method A—

Under the room temperature environment, 20 g of carbon black, 20 mmol of the compound of the Structural Formula (IV) or the compound of the Structural Formula (V), and 200 mL of ion-exchanged highly pure water are mixed by Silverson Mixer (at 6,000 rpm). When the resulting slurry has a pH value higher than 4, 20 mmol of nitric acid is added to the slurry. Thirty minutes later, odium nitrite (20 mmol) dissolved in a small amount of ion-exchanged highly pure water is gradually added to the slurry. The resultant is heated to 60° C. with stirring, to thereby allow to react for 1 hour. As a result, a modified pigment in which the compound of the Structural Formula (IV) or the compound of the Structural Formula (V) has been added to carbon black is generated. Subsequently, pH value of the resultant is adjusted to 10 with a NaOH aqueous solution, to thereby obtain a modified pigment dispersion in 30 minutes. Ultrafiltration with a dialysis membrane is performed using the dispersion containing the pigment bound to at least one geminal bisphosphonic acid groups or geminal bisphosphonate groups, and ion-exchanged highly pure water. The resultant is further subjected to ultrasonic dispersion to thereby obtain a modified pigment dispersion in which a solid content thereof has been concentrated.

—Method B—

ProcessAll 4HV Mixer (4 L) is charged with 500 g of dry carbon black, 1 L of ion-exchanged highly pure water, and 1 mol of the compound of the Structural Formula (IV) or the compound of the Structural Formula (V). Subsequently, the resulting mixture is mixed strongly at 300 rpm for 10 minutes, with heating to 60° C. Thereto, a 20% by mass of sodium nitrite aqueous solution [1 mole equivalent based on the compound of the Structural Formula (IV) or the compound of the Structural Formula (V)] is added for 15 minutes. The resulting mixture is mixed and stirred for 3 hours with heating to 60° C. The reactant is taken out while diluting with 750 mL of ion-exchanged highly pure water. Ultrafiltration with a dialysis membrane is performed using the resulting modified pigment dispersion and ion-exchanged highly pure water. The resultant is further subjected to ultrasonic dispersion to thereby obtain a modified pigment dispersion in which a solid content thereof has been concentrated. In the case where a large amount of coarse particles is contained therein, the coarse particles are preferably removed, for example, by a centrifugal separator.

A sodium ion content of each of the modified pigment dispersions is measured by an ion meter. A total amount of phosphorous is measured by an elementary analysis. Furthermore, the volume average particle diameter ($D_{50}$) of the modified pigment in the dispersion is measured by means of MICROTRAC (registered trademark) particle size distribution measuring device.

The volume average particle diameter ($D_{50}$) of the modified pigment dispersion in the recording ink is preferably 0.01 µm to 0.16 µm.

Moreover, a recording ink containing a surface-treated pigment dispersion bound to at least one geminal bisphosphonic acid groups or sodium geminal bisphosphonates has excellent redispersibility even after moisture in the ink is evaporated. Therefore, use of such ink enables excellent printing with a simple cleaning operation without causing clogging, even when printing operation is stopped for a long period of time, and moisture in the ink in the proximity to an inkjet head nozzle is evaporated. Further, the ink has high stability during the storage thereof, suppresses an increase of the viscosity as moisture is evaporated, and has excellent properties in terms of ejection reliability and prevention of the ink deposition in an ink head maintaining device. Therefore, the ink is very excellent as a recording ink.

—Water-Dispersible Colorant of Second Embodiment—In the second embodiment, the colorant is a pigment dispersion containing a pigment (e.g., an inorganic pigment, an organic pigment, and a composite pigment), a pigment dispersant, and a polymer dispersion stabilizing agent; and the polymer dispersion stabilizing agent is at least one selected from (α-olefin/maleic anhydride copolymer, styrene/(meth)acrylic copolymer, water-soluble polyurethane resin, and water-soluble polyester resin.

The polymer dispersion stabilizing agent is effective for maintaining a stable dispersion state of a pigment dispersion in which pigment particles are finely dispersed in water. The α-olefin/maleic anhydride copolymer, the styrene/(meth)acrylic copolymer, the water-soluble polyurethane resin, and the water-soluble polyester resin are solid at normal temperature, and are hardly soluble in cold water. However, these copolymers and resins exhibit an effect as a dispersion stabilizing agent when they are used by being dissolved in an alkaline solution or alkaline aqueous solution having an acid value equivalent to or higher than (preferably 1.0 time to 1.5 times the acid value) that of the acid values of the copolymers and resins.

The copolymer or the resin can be easily dissolved into alkaline solution or alkaline aqueous solution by heating and stirring. However, in the case where an olefin chain in the α-olefin/maleic anhydride copolymer is long, the urolefin/maleic anhydride copolymer is relatively difficult to be dissolved into the alkaline solution or alkaline aqueous solution, and insoluble products may remain. Having said that, the α-olefin/maleic anhydride copolymer dissolved in the alkaline solution or alkaline aqueous solution does not lose the effect as the dispersion stabilizing agent as long as the insoluble products are removed using, for example, an appropriate filter.

Examples of base contained in the alkali solution or alkaline aqueous solution include hydroxides of alkali metal such as sodium hydroxide, potassium hydroxide, and lithium hydroxide; basic materials such as ammonia, triethyl amine, and morpholine; alcohol amines such as triethanolamine, diethanolamine, N-methyldiethanolamine, 2-amino-2-ethyl-1,3-propanediol, and choline.

The α-olefin/maleic anhydride copolymer is not particularly limited, and may be appropriately synthesized or be commercially available products. Examples of the commercially available products include T-YP110, T-YP111, T-YP112, and TAT 113 (all products are of SEIKO PMC CORPORATION).

The styrene/(meth)acrylic copolymer is not particularly limited, and may be appropriately synthesized or be commercially available products. Examples of the commercially available products include to JC-05 (all products are of SEIKO PMC CORPORATION); and ARUFON UC-3900, ARUFON UC-3910, and ARUFON UC-3920 (all products are of TOAGOSEI CO., LTD.).

The water-soluble polyurethane resin is not particularly limited, and may be appropriately synthesized or be commercially available products. Examples of the commercially available products include TAKELAC W-5025, TAKELAC W-6010, and TAKELAC W-5661 (products of MITSUI TAKEDA CHEMICALS, INC.).

The water-soluble polyester resin is not particularly limited, and may be appropriately synthesized or be commercially available products. The commercially available products are not particularly limited and may be appropriately selected depending on the intended purpose. Examples of the commercially available products include: NICHIGO POLYESTER W-0030, NICHIGO POLYESTER W-0005S30WO, and NICHIGO POLYESTER WR-961 (products of Nippon Synthetic Chemical Industry Co., Ltd.); and PESRESIN A-210, and PESRESIN A-520 (products of TAKAMATSU OIL & FAT CO., LTD.).

The acid value of the polymer dispersion stabilizing agent is not particularly limited and may be appropriately selected depending on the intended purpose, but is preferably 40 mgKOH/g to 400 mgKOH/g, more preferably 60 mgKOH/g to 350 mgKOH/g. When the acid value thereof is lower than 40 mgKOH/g, the polymer dispersion stabilizing agent may have poor solubility to an alkaline solution. When the acid value thereof is higher than 400 mgKOH/g, the pigment is increased in viscosity, so that the resulting ink tends to be deteriorated in ejection ability, or the pigment dispersion may be easily decreased in dispersion stability.

The mass average molecular weight of the polymer dispersion stabilizing agent is preferably 20,000 or smaller, more preferably in the range of 5,000 to 20,000. When the mass average molecular weight thereof is smaller than 5,000, the dispersion stability of the pigment dispersion elements may decrease. When the mass average molecular weight thereof is larger than 20,000, the polymer dispersion stabilizing agent may have a poor solubility to an alkaline solution, or the viscosity of the pigment dispersion elements may increase.

An amount of the polymer dispersion stabilizing agent is not particularly limited and may be appropriately selected depending on the intended purpose, but is preferably 1 part by mass to 100 parts by mass, more preferably 5 parts by mass to 50 parts by mass on a solid basis, relative to 100 parts by mass of the pigment. When the amount thereof is smaller than 1 part by mass, the polymer dispersion stabilizing agent may not be able to exhibit an effect of stabilizing a dispersion state. When the amount thereof is larger than 100 parts by mass, the viscosity of the resulting ink increases to thereby easily deteriorate ejection ability of the ink from a nozzle, or the use thereof is not economical.

In the second embodiment, the colorant preferably contains a pigment dispersant. As for the pigment dispersant, either of an anionic surfactant or a nonionic surfactant having the HLB value of 10 to 20 is preferable.

Examples of the anionic surfactant include a polyoxyethylene alkyl ether acetates, (e.g., Na-, or Ca-)alkyl benzene sulfonates, (e.g., $NH_4$-, Na-, or Ca-)alkyldiphenyl ether disulfonates, sodium dialkyl succinate sulfonates, naphthalene sulfonate/formalin condensate Na salts, (e.g., $NH_4$- or Na-) polyoxyethylene polycyclic phenyl ether sulfates, laurates, polyoxyethylene alkyl ether sulfate salts, and oleates. Among them, Na-dioctyl sulfosuccinate, and $NH_4$-polyoxyethylene styrene phenyl ether sulfonate are particularly preferable.

Examples of the nonionic surfactant having the HLB value of 10 to 20 include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkylphenyl ether, polyoxyethylene alkyl amine, polyoxyethylene alkyl amide, and acetylene glycol. Among them, polyoxyethylene lauryl ether, polyoxyethylene-β-naphthyl ether, polyoxyethylene sorbitan monooleate, and polyoxyethylene styrenephenyl ether are particularly preferable.

An amount of the pigment dispersant is not particularly limited and may be appropriately selected depending on the intended purpose, but is preferably 1 part by mass to 100 parts by mass, more preferably 10 parts by mass to 50 parts by mass relative to 100 parts by mass of the pigment. When the amount thereof is small, the pigment cannot be sufficiently finely dispersed. When the amount thereof is excessively large, an excessive component that is not adsorbed on the pigment influences on the physical properties of the resulting ink, which may cause blurring of images, low water resistance, and low abrasion resistance.

The pigment dispersion uniformly and finely dispersed in water by the action of pigment dispersant can be prepared by dissolving the pigment dispersant in an aqueous medium to thereby a solution, adding the pigment to the solution to sufficiently wet the pigment, followed by dispersing by high speed stirring by means of a homogenizer, a disperser using balls (e.g. a bead mill and a ball mill), a kneading disperser using shearing force (e.g. a roll mill), or an ultrasonic disperser. However, coarse particles are often contained in the dispersion after the kneading and dispersion step mentioned above, which causes clogging of an inkjet nozzle or a supply channel. Therefore, it is necessary to remove coarse particles having diameters of 1 μm or larger by means of a filter or a centrifuge.

The average particle diameter ($D_{50}$) of the pigment dispersion in the ink is not particularly limited and may be appropriately selected depending on the intended purpose, but is preferably 150 nm or smaller, more preferably 100 nm or smaller. When the average particle diameter ($D_{50}$) thereof is larger than 150 nm, ejection stability of the resulting ink is rapidly lowered, which may cause clogging of nozzles or bend a track of the jetted ink.

—Water-dispersible Colorant of Third Embodiment—

As for the colorant of the third embodiment, in addition to the aforementioned pigment, a polymer emulsion in which a pigment is contained in each of polymer particles is preferably used. The polymer emulsion in which a pigment is contained in each of polymer particles means a polymer emulsion in which a pigment is encapsulated in each of polymer particles, or in which a pigment is adsorbed on each surface of polymer particles. In the polymer emulsion, all of the pigment does not need to be encapsulated or adsorbed, and a part of the pigment may be dispersed in the emulsion provided that does not adversely affect effects of the present invention. Examples of a polymer for forming the polymer emulsion (polymer in polymer particles) include a vinyl polymer, a polyester polymer, and a polyurethane polymer. Among them, the vinyl polymer and the polyester polymer are preferable, and polymers described in JP-A Nos. 2000-53897 and 2001-139849 are more preferable.

In the third embodiment, a composite pigment in which commonly known organic or inorganic pigment particles are each coated with carbon black may be suitably used. The composite pigment can be obtained by a method in which an organic pigment is allowed to be precipitated in the presence of inorganic pigment particles, and a mechanochemical method in which an inorganic pigment and an organic pigment are mechanically mixed and ground. In this case, a layer of an organosilane compound formed from polysiloxane or alkyl silane may be provided between the inorganic pigment and the organic pigment to thereby improve adhesion property between layers of these pigments, if necessary.

Examples of the organic pigment include black pigments such as aniline black, and color pigments such as anthraquinone, phthalocyanine blue, phthalocyanine green, diazo, monoazo, pyranetron, perylene, heterocyclic yellow, quinacridone and (thio) indigoid. Among them, carbon black, phthalocyanine pigments, quinacridone pigments, monoazo yellow pigments, disazo yellow pigments and heterocyclic yellow pigments are preferable from the viewpoint of color developability.

Examples of the phthalocyanine blue include copper phthalocyanine blue or derivatives thereof (C. I. Pigment Blue 15:3, 15:4) and aluminum phthalocyanine.

Examples of the quinacridone include C.I. Pigment Orange 48, C. I. Pigment Orange 49, C. I. Pigment Red 122, C. I. Pigment Red 192, C. I. Pigment Red 202, C. I. Pigment Red 206, C. I. Pigment Red 207, C. I. Pigment Red 209, C. I. Pigment Violet 19 and C. I. Pigment Violet 42.

Examples of the monoazo yellow include C. I. Pigment Yellow 74, C. I. Pigment Yellow 109, C. I. Pigment Yellow 128 and C. I. Pigment Yellow 151.

Examples of the disazo yellow include C. I. Pigment Yellow 14, C. I. Pigment Yellow 16, and C. I. Pigment Yellow 17.

Examples of the heterocyclic yellow include C. I. Pigment Yellow 117 and C. I. Pigment Yellow 138.

Other pigments are described in The Color Index, the third edition (published by The Society of Dyers and Colourists, 1982).

Examples of the inorganic pigment include titanium dioxide, silica, alumina, iron oxide, iron hydroxide and tin oxide. In terms of the shape of those pigment particles, a smaller aspect ratio is preferred, and the particles are most preferably spherical. When a color coloring material is allowed to be adsorbed onto a surface thereof, color of the inorganic pigment is preferably transparent or white. Meanwhile, when a black coloring material is allowed to be adsorbed onto a surface thereof, a black inorganic pigment may be used.

The primary particle diameter of each of the inorganic pigment particles is not particularly limited and may be appropriately selected depending on the intended purpose, but is preferably 100 nm or smaller, more preferably 5 nm to 50 nm.

A mass ratio of the inorganic pigment particles to the organic pigment or carbon black serving as a coloring material is not particularly limited and may be appropriately selected depending on the intended purpose, but is preferably 3:1 to 1:3, more preferably 3:2 to 1:2. When an amount of the coloring material is small, color developability and tinting power may be lowered. When an amount of the coloring material is large, transparency or color tone of the resulting ink may be deteriorated.

A silica-carbon black composite material, a silica/phthalocyanine PB 15:3 composite material, a silica/diazo yellow composite material, and a silica/quinacridone PR122 composite material (all products are of TODA KOGYO CORPORATION) can be suitably used as the coloring material particles in which inorganic pigment particles are each coated with an organic pigment or carbon black, because these materials have small average primary particle diameters.

In the case where inorganic pigment particles having a primary particle diameter of 20 nm are coated with an equiamount of an organic pigment, the resulting coated particles have a primary diameter of approximately 25 nm. Therefore, if the pigment is dispersed into their primary particles using an appropriate dispersant, an extremely finely dispersed pigment ink having a dispersed particle diameter of 25 nm can be obtained. Note that, the organic pigment present on a surface of the composite pigment contributes to the dispersion state thereof. Additionally, the characteristics of the inorganic pigment present in the center of the composite pigment affect the dispersion state through the to about 2.5 nm-thick layer of the organic pigment. Therefore, it is also important to select a pigment dispersant that can stabilize both the organic pigment and inorganic pigment in the composite pigment.

Note that, the recording ink may contain a dye in combination with the pigment for the purpose of adjusting color tone, but the dye preferably used so as not to degrade weather resistance of the ink.

An amount of the water-dispersible colorant contained in the recording ink is not particularly limited and may be appropriately selected depending on the intended purpose, but is preferably 1% by mass to 10% by mass, more preferably 2% by mass to 9% by mass on a solid basis. When the amount thereof is smaller than 1% by mass, the recording ink may be deteriorated in color developability and lowered in image density. When the amount thereof is larger than 10% by mass, the recording ink is increased in viscosity, which may deteriorate ejection ability and is not economically desirable.

A total of a solid content of the water-dispersible colorant and a solid content of the water-dispersible resin is 8% by mass to 35% by mass, preferably 10% by mass to 25% by mass. When the total of the solid contents is less than 8% by mass, the resulting image may be deteriorated in glossiness and fixability in the case where an image onto which a large amount of ink is deposited is formed on commercial printing paper. When the total of the solid contents is more than 35% by mass, ejection stability of the resulting ink may be deteriorated.

A mass ratio (A/B) of the solid content of the water-dispersible resin (A) to the solid content of the water-dispersible colorant (B) is 2 to 8, preferably 2.5 to 5.0. When the mass ratio is less than 2, the resulting image may be deteriorated in glossiness in the case where an image onto which a large amount of ink is deposited is formed on commercial printing paper. When the mass ratio is more than 8, ejection stability of the resulting ink may be deteriorated.

<<<Surfactant>>>

The surfactant is preferably those having low surface tension, high penetrability and high leveling ability, provided that it does not impair dispersion stability depending on a type of the water-dispersible colorant, and a combination of organic solvents. Examples of the surfactant include an anionic surfactant, a nonionic surfactant, a silicone surfactant, and a fluorosurfactant. These may be used alone or in combination. Among them, a silicone surfactant, a fluorosurfactant, an acetylene glycol surfactant or an acetylene alcohol surfactant are particularly preferable.

As for the fluorosurfactant, a fluorosurfactant in which 2 to 16 carbon atoms are substituted with fluorine atoms is preferable, and a fluorosurfactant in which 4 to 16 carbon atoms are substituted with fluorine atoms is ore preferable. When the number of the carbon atoms substituted with fluorine atoms is less than 2, an effect of fluorine cannot be attained. When the number thereof is more than 16, the resulting ink may have a problem in storageability.

Examples of the nonionic fluorosurfactant include a perfluoroalkyl phosphate compound, a perfluoroalkyl ethylene oxide adduct, and a polyoxyalkylene ether polymer compound having a perfluoroalkyl ether group in a side chain thereof. Among them, the polyoxyalkylene ether polymer compound having a perfluoroalkyl ether group in a side chain thereof is preferable from the viewpoint of its low foamability. Additionally, the fluorosurfactant is preferably a fluorosurfactant represented by the following General Formula (1) or (2).

$$CF_3CF_2(CF_2CF_2)_m—CH_2CH_2O(CH_2CH_2O)_nH \qquad \text{[General Formula (1)]}$$

In the General Formula (I), m is preferably an integer of 0 to 10, and n is preferably an integer of 0 to 40 for the purpose of imparting water-solubility.

$$C_nF_{2n+1}—CH_2CH(OH)CH_2—O—(CH_2CH_2O)_a—Y' \qquad \text{[General Formula (2)]}$$

In the General Formula (2), n is an integer of 2 to 6, a is an integer of 15 to 50, and Y' is $—C_bH_{2b+1}$ (where b is an integer of 11 to 19) or $—CH_2CH(OH)CH_2—C_dF_{2d+1}$ (where d is an integer of 2 to 6).

Preferable examples of the compound represented by the General Formula (2) include the compounds represented by the following formulae so (a) to (v), because they have high performance for reducing surface tension and have high penetrability.

$$C_4F_9—CH_2CH(OH)CH_2O—(CH_2CH_2O)_{21}—C_{12}H_{25} \qquad (a)$$

$$C_4F_9—CH_2CH(OH)CH_2O—(CH_2CH_2O)_{25}—C_{12}H_{25} \qquad (b)$$

$$C_4F_9—CH_2CH(OH)CH_2O—(CH_2CH_2O)_{30}—C_{12}H_{25} \qquad (c)$$

$$C_4F_9—CH_2CH(OH)CH_2O—(CH_2CH_2O)_{20}—C_{14}H_{29} \qquad (d)$$

$$C_4F_9—CH_2CH(OH)CH_2O—(CH_2CH_2O)_{30}—C_{14}H_{29} \qquad (e)$$

$$C_4F_9—CH_2CH(OH)CH_2O—(CH_2CH_2O)_{20}—C_{16}H_{33} \qquad (f)$$

$$C_4F_9—CH_2CH(OH)CH_2O—(CH_2CH_2O)_{23}—C_{16}H_{33} \qquad (g)$$

$$C_4F_9—CH_2CH(OH)CH_2O—(CH_2CH_2O)_{25}—C_{16}H_{33} \qquad (h)$$

$$C_4F_9—CH_2CH(OH)CH_2O—(CH_2CH_2O)_{30}—C_{16}H_{33} \qquad (i)$$

$$C_4F_9—CH_2CH(OH)CH_2O—(CH_2CH_2O)_{40}—C_{16}H_{33} \qquad (j)$$

$$C_4F_9—CH_2CH(OH)CH_2O—(CH_2CH_2O)_{20}—C_{18}H_{37} \qquad (k)$$

$$C_4F_9—CH_2CH(OH)CH_2O—(CH_2CH_2O)_{30}—C_{18}H_{37} \qquad (l)$$

$$C_4F_9—CH_2CH(OH)CH_2O—(CH_2CH_2O)_{40}—C_{18}H_{37} \qquad (m)$$

$$C_4F_9—CH_2CH(OH)CH_2O—(CH_2CH_2O)_{23}—CH_2CH(OH)CH_2—C_4F_9 \qquad (n)$$

$$C_4F_9—CH_2CH(OH)CH_2O—(CH_2CH_2O)_{35}—CH_2CH(OH)CH_2—C_4F_9 \qquad (o)$$

$$C_4F_9—CH_2CH(OH)CH_2O—(CH_2CH_2O)_{45}—CH_2CH(OH)CH_2—C_4F_9 \qquad (p)$$

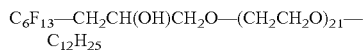 (q)

 (r)

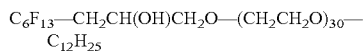 (s)

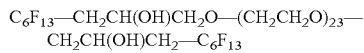 (t)

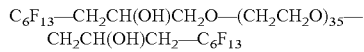 (u)

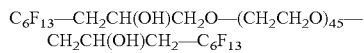 (v)

Among them, the compounds represented by the formulae (a) to (c) and (n) to (v) are particularly preferable because they are good compatibility with the organic solvent.

The fluorosurfactant may be commercially available products. Examples of the commercially available products include ZONYL FS-300 (product of E.I. du Pont de Nemours & Company); FT-110, FT-250, FT-251, FT-400S, FT-150, FT-400SW (all products are of NEOS COMPANY LIMITED); POLYFOX PF-151N (product of Omnova Solutions, Inc.) and UNIDYNE DSN-403N (product of DAIKIN INDUSTRIES, LTD).

Among them, FS-300 (product of E.I. du Pont de Nemours & Company), FT-110, FT-250, FT-251, FT-400S, FT-150, and FT-400SW (all products are of NEOS COMPANY LIMITED), POLYFOX PF-151N (product of Omnova Solutions, Inc.) and UNIDYNE DSN-403N (product of DAIKIN INDUSTRIES, LTD) are particularly preferable from the viewpoints of desirable printing quality and wettability.

The silicone surfactant is not particularly limited and may be appropriately selected depending on the intended purpose. Examples thereof include side chain-modified polydimethylsiloxane, both terminal-modified polydimethylsiloxane, one terminal-modified polydimethylsiloxane, and side chain and both terminals-modified polydimethylsiloxane.

Among them, a polyether-modified silicone surfactant having, as a modified group, a polyoxyethylene group, or a polyoxyethylene polyoxypropylene group is particularly preferable because it exhibits excellent properties as an aqueous surfactant.

The silicone surfactant is not particularly limited, and may be appropriately synthesized or be commercially available products. The commercially available products can be easily available from, for example, BYK Japan K.K., Shin-Etsu Chemical Co., Ltd., Dow Corning Toray Co., Ltd., Nihon-Emulsion Co., Ltd., and Kyoeisha Chemical Co., Ltd.

The polyether-modified silicone surfactant is not particularly limited and may be appropriately selected depending on the intended purpose. Examples thereof include a compound in which a polyalkylene oxide structure represented by the following General Formula (13) is introduced to a side chain from Si of dimethyl polysiloxane.

[General Formula (13)]

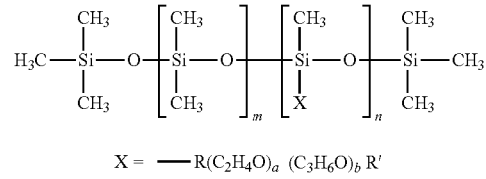

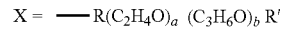

In the General Formula (13), m, n, a, and b each denote an integer, and R and R' each denote an alkyl group or an alkylene group.

The polyether-modified silicone surfactant is not particularly limited, and may be appropriately synthesized or be commercially available products. Examples of the commercially available products to include KF-618, KF-642, and KF-643 (all products are of Shin-Etsu Chemical Co., Ltd.), EMALEX-SS-5602 and SS-1906EX (all products are of Nihon-Emulsion Co., Ltd.), FZ-2105, FZ-2118, FZ-2154, FZ-2161, FZ-2162, FZ-2163, and FZ-2164 (all products are of Dow Corning Toray Co., Ltd.), BYK-33 and BYK-387 (all products are of BYK Japan K.K.) and TSF4440, TSF4452, and TSF4453 (all products are of Momentive Performance Materials Inc.).

The acetylene glycol surfactant or acetylene alcohol surfactant is preferably a compound represented by the following Structural Formula (14), General Formula (15), or General Formula (16).

[Structural Formula (14)]

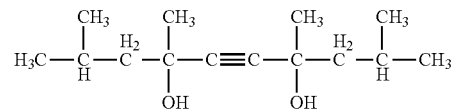

[General Formula (15)]

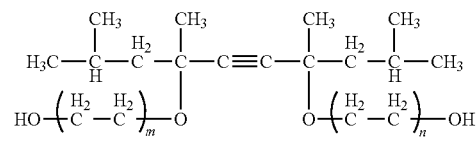

In the General Formula (15), m and n each denote an integer.

[General Formula (16)]

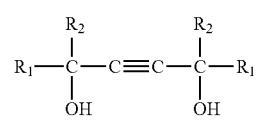

In the General Formula (16), $R_1$ and $R_2$ each denote an alkyl group.

The acetylene glycol surfactant or acetylene alcohol surfactant is not particularly limited, and may be appropriately synthesized or be commercially available products. Examples of the commercially available products include DYNOL 604, and DYNOL 607 (all products are of Air Products and Chemicals Inc.); SURFYNOL 104, SURFYNOL 420, SURFYNOL 440, and SURFYNOL SE (all products are of Nissin Chemical Industry Co., Ltd.); OLFINE E1004, OLFINE E1010, OLFINE EXP.4001, OLFINE EXP.4200, OLFINE EXP.4051F, and OLFINE EXP.4123 (all products are of Nissin Chemical Industry Co., Ltd.).

An amount of the surfactant is not particularly limited and may be appropriately selected depending on the intended purpose, but is preferably 0.001% by mass to 5% by mass, more preferably 0.05% by mass to 1% by mass, relative to a total amount of the recording ink. When the amount is less than 0.001% by mass, an effect of the surfactant may be decreased. When the amount is more than 5% by mass, an effect of the surfactant would not be increased even when more surfactant is added.

<<<Water>>>

Examples of the water nclude pure water such as ion-exchanged water, ultrafiltrated water, Milli-Q water, and distilled water, and ultrapure water.

An amount of the water contained in the recording ink is not particularly limited and may be appropriately selected depending on the intended purpose.

<Penetrating Agent>

The recording ink of the present invention preferably contains, as a penetrating agent, at least one of a C8-C11 non-wettable polyol compound and a glycol ether compound in order to achieve both of penetrability and water-solubility. Herein, the non-wettable means having a solubility of 0.2% by mass to 5.0% by mass in water at 25° C. Among them, 1,3-diol compound represented by the General Formula (17) is preferably, and 2-ethyl-1,3-hexanedol [solubility: 4.2% (at 25° C.)], and 2,2,4-trimethyl-1,3-pentanediol [solubility: 2.0% (at 25° C.)] are particularly preferable.

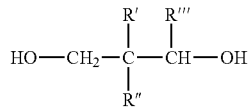

[General Formula (17)]

In the General Formula (17), R' denotes a methyl group or an ethyl group, R" denotes a hydrogen atom or a methyl group, and R'" denotes an ethyl group or a propyl group.

Examples of other non-wettable polyol compounds include: aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexane-1,2-diol.

Other penetrating agents used in combination with above are not particularly limited and may be appropriately selected depending on the intended purpose, as long as they dissolve in the recording ink to thereby adjust the recording ink to have desirable properties. Examples thereof include alkyl and aryl ethers of polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

An amount of the penetrating agent contained in the recording ink is not particularly limited and may be appropriately selected depending on the intended purpose, but is preferably 0.1% by mass to 4.0% by mass. When the amount thereof is smaller than 0.1% by mass, penetrability cannot be obtained, which may cause formation of a blur image. When the amount thereof is larger than 4.0% by mass, dispersion stability of a water-dispersible colorant is impaired to cause nozzle clogging, or penetrability of the resulting ink to a recording medium is higher than necessary, which may cause a decrease in image density of the resulting image, or strike through.

<<<Other Components>>>

The other components are not particularly limited and may be appropriately selected depending on the intended purpose. Examples thereof include a foam inhibitor (a defoaming agent), a pH regulator, an antiseptic-antifungal agent, a chelating agent, an anti-rust agent, an antioxidant, an ultraviolet absorber, an oxygen absorber, and a photostabilizer.

—Foam Inhibitor (Defoaming Agent)—

The foam inhibitor is used by adding in a small amount thereof to the recording ink to thereby inhibit foaming. Herein, "foaming" means that air is encapsulated with thin films of liquid. The foaming is related to properties of the recording ink such as surface tension and viscosity. Namely, in the case of a liquid having a high surface tension (e.g., water), a force for minimizing the surface area of the liquid as little as possible works, and therefore such liquid is difficult to foam. In contrast, the recording ink having a high viscosity and a high penetrability has a low surface tension. Therefore, such recording ink easily foams, and generated foam tend to be remained because of the viscosity of the ink, to thereby be difficult to defoam.

The foam inhibitor typically destroys foam by partially reducing surface tension of foam film, or by scattering the foam inhibitor insoluble to a foaming liquid on a surface of the foaming liquid. In the case where a fluorosurfactant, which has very strong effect of reducing the surface tension, is used as a surfactant in the recording ink, the foam inhibitor of the former mechanism cannot partially reduce the surface tension of the foam film. Therefore, it is generally not used. Accordingly, the latter foam inhibitor which is insoluble to the foaming liquid is used. In this case, stability of the recording ink reduces because of the foam inhibitor insoluble to the foaming liquid.

Contrary to these, a foam inhibitor represented by the following General Formula (18) has high compatibility with the fluorosurfactant, although it does not have a lower effect of reducing surface tension than the fluorosurfactant. Therefore, the foam inhibitor is effectively incorporated into foam film, and a surface of the foam film becomes partially unbalanced because of a difference n surface tension between the fluorosurfactant and the foam inhibitor, which destroys foam.

As for the foal inhibitor, a compound represented by the following formula (18) is suitably used.

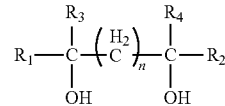

[General Formula (18)]

In the General Formula (18), $R_1$ and $R_2$ each independently denotes a C3-C6 alkyl group, $R_3$ and $R_4$ each independently denotes a C1-C2 alkyl group, and n denotes an integer of 1 to 6.

Examples of the compound represented by the General Formula (18) include 2,4,7,9-tetramethyldecane-4,7-diol, and 2,5,8,11-tetramethyldodecane-5,8-diol. Among them, 2,5,8,11-tetramethyldodecane-5,8-diol is particularly preferable because it has a high foam inhibiting effect, and a high compatibility with an ink.

An amount of the foam inhibitor contained in the recording ink is not particularly limited and may be appropriately selected depending on the intended purpose, but is preferably 0.01% by mass to 10% by mass, more preferably 0.1% by mass to 5% by mass. When the amount of the foam inhibitor is smaller than 0.01% by mass, a defoaming effect may not be attained. When the amount thereof is greater than 10% by mass, a foam inhibiting effect reaches the peak, and physical properties of the ink such as viscosity and particle diameters may be adversely affected.

—pH Regulator—

The pH regulator is not particularly limited and may be appropriately selected depending on the intended purpose, as long as it does not adversely affect a recording ink to be prepared, and can adjust pH of the ink to 7 to 11. Examples of the pH regulator include alcohol amines, hydroxides of alkali metal elements, ammonium hydroxides, phosphonium hydroxides, and carbonates of alkali metals. When the pH is lower than 7 or higher than 11, problems such as degeneration, leakage and ejection defects of an ink may occur because an inkjet head and an ink supply unit are excessively dissolved.

Examples of the alcohol amines include diethanolamine, triethanolamine, and 2-amino-2-ethyl-1,3-propanediol.

Examples of the hydroxides of alkali metal elements include lithium hydroxide, sodium hydroxide, and potassium hydroxide.

Examples of the ammonium hydroxides include ammonium hydroxide, quaternary ammonium hydroxide, and quaternary phosphonium hydroxide.

Examples of the carbonates of alkali metals include lithium carbonate, sodium carbonate, and potassium carbonate.

—Antiseptic-Antifungal Agent—

Examples of the antiseptic-antifungal agent include sodium dehydroacetate, sodium sorbate, sodium 2-pyridinethiol-1-oxide, sodium benzoate, and sodium pentachlorophenol.

—Chelating Agent—

Examples of the chelating agent include sodium ethylenediamine tetraacetate, sodium nitrilotriacetate, sodium hydroxyethylethylenediamine triacetate, sodium diethylenetriamine pentaacetate, and sodium uramil diacetate.

—Anti-Rust Agent—

Examples of the anti-rust agent include acidic sulfite, sodium thiosulfate, thiodiglycolic acid ammonium, diisopropyl ammonium nitrate, pentaerythritol tetranitrate, and dicyclohexyl ammonium nitrate.

—Antioxidant—

Examples of the antioxidant include a phenolic antioxidant (including hindered phenolic antioxidant), an amine antioxidant, a sulfuric antioxidant, and a phosphoric antioxidant.

Examples of the phenolic antioxidant (including hindered phenolic antioxidant) include butylated hydroxyanisole, 2,6-di-tert-butyl-4-ethyl phenol, and stearyl-β-(3,5-di-tert-butyl-4-hydroxyphenyl)propionate.

Examples of the amine antioxidant include phenyl-β-naphthyl amine, α-naphthyl amine, N,N'-di-sec-butyl-p-phenylene diamine, phenothiazine, and N,N'-diphenyl-p-phenylene diamine.

Examples of the sulfuric antioxidant include dilauryl-3,3'-thiodipropionate, distearylthiodipropionate, and lauryl-stearylthiodipropionate.

Examples of the phosphoric antioxidant include triphenyl so phosphate, octadecyl phosphate, and triisodecyl phosphate.

—Ultraviolet Absorber—

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of the benzophenone ultraviolet absorber include 2-hydroxy-4-n-octoxybenzophenone, 2-hydroxy-4-n-dodecyloxybenzophenone, and 2,4-dihydroxybenzophenone.

Examples of the benzotriazole ultraviolet absorber include 2-(2'-hydroxy-5'-tert-octylphenyl)benzotriazole, 2-(2'-hydroxy-5'-methylphenyl)benzotriazole, and 2-(2'-hydroxy-4'-octoxyphenyl)benzotriazole.

Examples of the salicylate ultraviolet absorber include phenyl salicylate, p-tert-butylphenyl salicylate, and p-octylphenyl salicylate.

Examples of the cyanoacrylate ultraviolet absorber include ethyl-2-cyano-3,3'-diphenyl acrylate, methyl-2-cyano-3-methyl-3-(p-methoxyphenyl)acrylate, and butyl-2-cyano-3-ethyl-3-(p-methoxyphenyl)acrylate.

Examples of the nickel complex salt ultraviolet absorber include nickelbis(octylphenyl)sulfide, nickel(II) 2,2'-thiobis(4-tert-octylferrate)-n-butyl amine, and nickel(II) 2,2'-thiobis(4-tert-octylferrate)-2-ethylhexyl amine.

The recording ink of the present invention is prepared by dispersing or dissolving into water, a water-dispersible colorant, an organic solvent, a water-dispersible resin, a surfactant, preferably a penetrating agent, and, if necessary, other components to thereby obtain a mixture; and optionally stirring and mixing the mixture. The dispersing or dissolving can be performed, for example, by a sand mill, a homogenizer, a ball mill, a paint shaker, or an ultrasonic disperser, and the stirring and mixing can be performed by an agitator using a usual agitating blade, a magnetic stirrer, or a high-speed disperser.

A viscosity of the recording ink at 25° C. is not particularly limited and may be appropriately selected depending on the intended purpose, but is preferably 5 mPa·s to 25 mPa·s. The viscosity of 5 mPa·s or higher can improve printing density and character quality of images formed with the resulting ink. The viscosity of 25 mPa·s or lower can secure ejection ability of the resulting ink.

The viscosity can be measured, for example, by means of a viscometer (RE-550L, product of Toki Sangyo Co., Ltd.) at 25° C.

A static surface tension of the recording ink is not particularly limited and may be appropriately selected depending on the intended purpose, but is preferably 30 mN/m or lower, more preferably 28 mN/m or lower at 25° C. The surface tension of 30 mN/m or lower increases penetrability to thereby significantly decrease beading. Therefore, penetration and drying are satisfactory performed in the case of printing on plain paper.

A dynamic surface tension of the recording ink at 25° C. with the surface lifetime of 15 ins as measured by the maximum bubble pressure method is not particularly limited and may be appropriately selected depending on the intended purpose, but is preferably 35 mN/m or lower, more preferably 33 mN/m or lower. The dynamic surface tension of 35 mN/m or lower allows wettability and penetrability of commercial printing paper to be good, which increases a reducing effect of beading and color breading.

The dynamic surface tension with the surface lifetime of 15 ms as measured by the maximum bubble pressure method can be measured by means of SITA DynoTester (product of SITA) at 25° C.

<Ink Cartridge>

The ink cartridge contains a container and the recording ink housed in the container, and, if necessary, may further contain appropriately selected other members.

The container is not particularly limited, and a shape, structure, size, and material thereof are appropriately selected depending on the intended purpose. For example, the container is suitably those having at least an ink bag formed of an aluminum laminate film, or a resin film.

Figure 2:
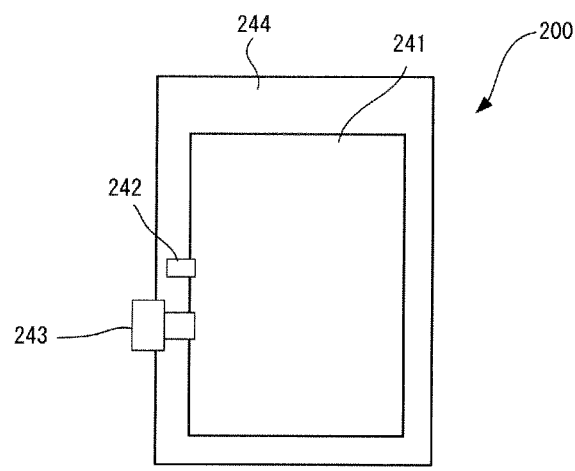
FIG. 2 is a schematic diagram illustrating the ink cartridge illustrated in FIG. 1 and a case thereof.

The ink cartridge now will be described with reference to FIGS. 1 and 2. FIG. 1 is a diagram illustrating one example of the ink cartridge, and FIG. 2 is a diagram illustrating the ink cartridge illustrated in FIG. 1 and a case (exterior housing) thereof.

As for ink cartridge 200, as illustrated in FIG. 1, an ink bag 241 is filled with an ink by injecting the ink from an ink inlet 242. After exhausting air, the ink inlet 242 is sealed by fusing. At the time of use, a needle equipped in a main body of a device is inserted into an ink outlet 243 formed of a rubber member to thereby supply the ink to the device.

The ink bag 241 is formed of a wrapping member such as an air non-permeable aluminum laminate film. As illustrated in FIG. 2, the ink bag 241 is typically housed in a plastic cartridge case 244, which is then detachably mounted in various inkjet recording devices.

<Other Steps and Other Units>

Examples of the other steps include a drying step and a controlling step.

Examples of the other units include a drying unit and a controlling unit.

—Drying Step and Drying Unit—

The drying step is a step of heating and drying a recording medium on which an image is recorded with the recording ink, and is performed by a drying unit.

The drying is not particularly limited and may be appropriately selected depending on the intended purpose. For example, the drying can be performed by means of an infrared ray drying device, a microwave drying device, a roll heater, a drum heater, or warm air. Note that, there may be a fixing step which is a step of heating the recording medium to 100° C. to 150° C. by means of a heating unit to thermally fix an image, in order to level a surface on which the image is formed, or fixing the image.

—Controlling Step and Controlling Unit—

The controlling step is a step of controlling operation of each of the steps, and is performed by a controlling unit.

The controlling unit is not particularly limited and may be appropriately selected depending on the intended purpose, as long as it can control operation of each of the units. Examples thereof include a device such as a sequencer and a computer.

One embodiment for performing an inkjet recording method of the present invention by an inkjet recording device of the present invention will be described hereinafter with reference to drawings.

Figure 3:
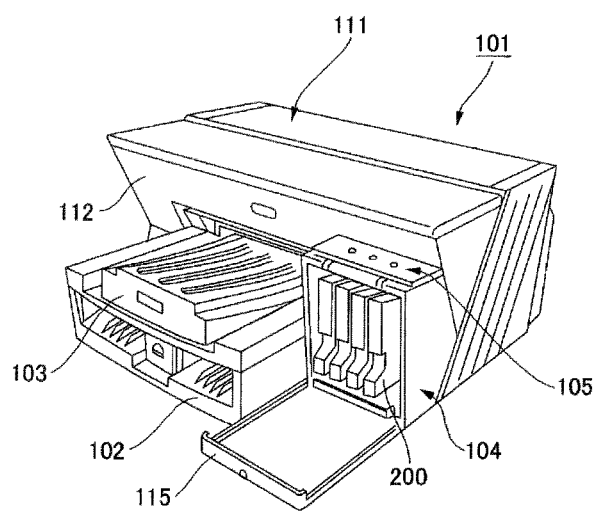
FIG. 3 is a perspective diagram illustrating one example of an inkjet recording device.

The inkjet recording device illustrated in FIG. 3 contains a device main body 101, a paper feeding tray 102 provided in the device main body 101 and configured to feed recording sheets, a paper discharging tray 103 provided in the device main body 101 and configured to store the recording sheets on which an image has been recorded (formed), and an ink cartridge loading section 104. The paper feeding tray 102 can be used for feeding various recording media.

On an upper surface of the ink cartridge loading section 104, a control section 105 such as operation keys and a display is provided. The ink cartridge loading section 104 has a front cover 115 that can be opened and closed for attaching or detaching the ink cartridge 200.

Figure 4:
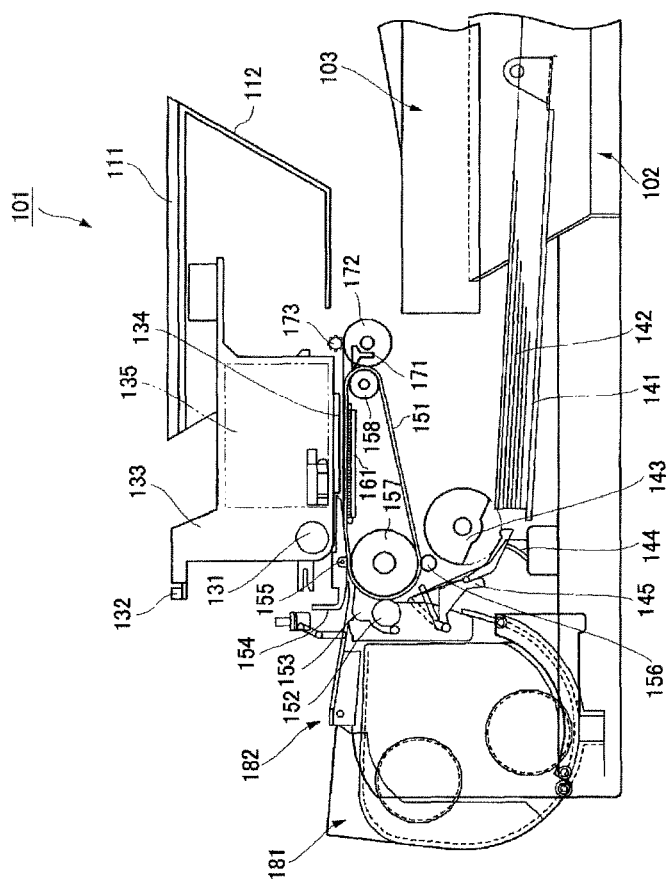
FIG. 4 is a diagram illustrating one example of an inkjet recording device.
Figure 5:
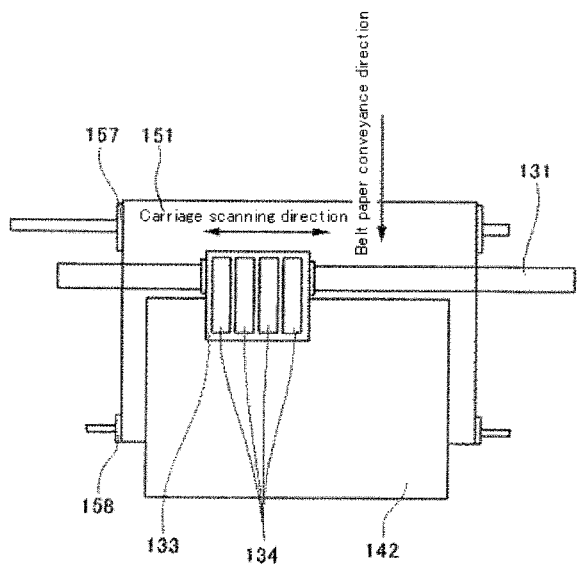
FIG. 5 is a schematic enlarged diagram illustrating one example of an inkjet head of an inkjet recording device.

In the device main body 101, as illustrated in FIGS. 4 and 5, a carriage 133 is slidably held in a main-scanning direction by a guide rod 131, which is a guide member horizontally bridged between left and right side plates (not shown), and a stay 132; and is moved for scanning in an arrow direction in FIG. 5 by a main scanning motor (not shown).

A recording head 134 composed of four inkjet recording heads configured to eject ink droplets of yellow (Y), cyan (C), magenta (M) and black (Bk) is installed in the carriage 133 such that a plurality of ink ejection outlets are aligned in the direction intersecting the main-scanning direction and that the ink droplet ejection direction faces downward.

For each of the inkjet recording heads composing the recording head 134, it is possible to use, for example, a head provided with any of the following energy-generating units for ejecting ink: a piezoelectric actuator such as a piezoelectric element, a thermal actuator that uses a thermoelectric transducer such as a heat element and utilizes phase change caused by film boiling of a liquid, a shape memory alloy actuator that utilizes a metal phase change caused by a temperature change, and an electrostatic actuator that utilizes electrostatic force.

Also, the carriage 133 is provided with sub-tanks 135 for each color configured to supply each color ink to the recording head 134. Each sub-tank 135 is supplied and replenished with the recording ink from the ink cartridge 200 loaded into the ink cartridge loading section 104, via a ink supply tube (not shown).

Meanwhile, as a paper feeding section for feeding sheets of paper 142 loaded on a paper loading section (pressurizing plate) 141 of the paper feed tray 102, there are provided a half-moon roller (paper feeding roller 143) which feeds the sheets of paper 142 one by one from the paper loading section 141, and a separation pad 144 which faces the paper feeding roller 143 and is formed of a material with a large friction coefficient. This separation pad 144 is biased toward the paper feeding roller 143 side.

As a conveyance section for conveying the paper 142, which has been fed from this paper feeding section, under the recording head 134, there are provided a conveyance belt 151 for conveying the paper 142 by means of electrostatic adsorption; a counter roller 152 for conveying the paper 142, which is sent from the paper feeding section via a guide 145, while the paper is sandwiched between the counter roller and the conveyance belt 151; a conveyance guide 153 for making the paper 142, which is sent upward in the substantially vertical direction, change its direction by approximately 90° and thusly run along the conveyance belt 151; and an end pressurizing roller 155 biased toward the conveyance belt 151 side by a pressing member 154. Also, there is provided a charging roller 156 as a charging unit for charging a surface of the conveyance belt 151.

The conveyance belt 151 is an endless belt; and is capable of rotating around in a belt conveyance direction by stretching between a conveyance roller 157 and a tension roller 158. The conveyance belt 151 has, for example, a surface layer serving as a paper adsorbing surface, which is formed of a resinous material such as an ethylene-tetrafluoroethylene copolymer (ETFE) having a thickness of approximately 40 µm for which resistance control has not been conducted; and a back layer (intermediate resistance layer, ground layer) which is formed of the same material as the surface layer, and for which resistance control has been conducted using carbon. On the back of the conveyance belt 151, a guide member 161 is placed correspondingly to a region where printing is carried out by the recording head 134. Additionally, as a paper discharge section for discharging the paper 142 on which images have been recorded by the recording head 134, there are provided a separation claw 171 for separating the paper 142 from the conveyance belt 151, a paper discharge roller 172, and a paper discharge roller 173, with the paper discharge tray 103 being placed below the paper discharge roller 172.

A double-sided paper feeding unit 181 is detachably mounted on a rear surface portion of the device main body 101. The double-sided paper feeding unit 181 takes in the paper 142 returned by rotation of the conveyance belt 151 in the opposite direction and reverses it, then refeeds it between the counter roller 152 and the conveyance belt 151. Additionally, a manual paper feeding section 182 is provided on an upper surface of the double-sided paper feeding unit 181.

In the inkjet recording device, the sheets of paper 142 are fed one by one from the paper feeding section, and the paper 142 fed upward in the substantially vertical direction is guided by the guide 145 and conveyed with being sandwiched between the conveyance belt 151 and the counter roller 152. Further, an end of the paper is guided by the conveyance guide 153 and pressed onto the conveyance belt 151 by the end pressurizing roller 155, so that the conveyance direction of the paper is changed by approximately 90°.

On this occasion, the conveyance belt 151 is charged by the charging roller 156, and the paper 142 is electrostatically adsorbed onto the conveyance belt 151 and thusly conveyed. Here, by driving the recording head 134 according to an image signal while moving the carriage 133, ink droplets are ejected onto the paper 142 having stopped so as to carry out recording for one line. Thereafter, the paper 142 is conveyed by a predetermined distance, and then recording for the next line is carried out. On receipt of a recording completion signal or a signal indicating that a rear end of the paper 142 has reached a recording region, recording operation is finished, and the paper 142 is discharged onto the paper discharge tray 103.

Once an amount of the recording ink remaining in the sub-tanks 135 has been detected as too small, a required amount of the recording ink is supplied from the ink cartridge 200 into the sub-tanks 135.

As for the inkjet recording device, when the recording ink in the ink cartridge 200 has been used up, it is possible to replace only the ink bag inside the ink cartridge by dismantling the housing of the ink cartridge 200. Also, even when the ink cartridge 200 is vertically mounted and employs a front-loading structure, it is possible to supply the recording ink stably. Therefore, even when the device main body 101 is installed with little space over it, for example when it is stored in a rack or when an object is placed over the device main body 101, it is possible to replace the ink cartridge 200 with ease.

Note that, the example where a serial (shuttle) type inkjet recording device in which the carriage scans is described above, but the present invention can be also applied for a line type inkjet recording device equipped with a line-type head.

The inkjet recording device and inkjet recording method of the present invention can be applied in various recording by the inkjet recording system, and can be particularly suitably applied for an inkjet recording printer, a facsimile, a photocopier, a multifunction printer (printer-fax-copier).

EXAMPLES

Examples of the present invention will be described hereinafter, but these examples shall not be construed as limiting the scope of the present invention in any way.

Preparation Example 1

—Preparation of Surface-modified Black Pigment Dispersion Liquid 1—

Under room temperature environment, 100 g of BLACK PEARLS (registered trademark) 1000 (carbon black having the BET surface area of 343 $m^2/g$ and DBPA of 105 mL/100 g, product of Cabot Corporation), 100 mmol of the compound represented by the following Structural Formula (VI), and 1 L of ion-exchanged highly pure water were mixed by means of Silverson Mixer (at 6,000 rpm). In the case where the pH of the resultant slurry was higher than 4, 100 mmol of nitric acid was added. Thirty minutes later, sodium nitrite (100 mmol) dissolved in a small amount of ion-exchanged highly pure water was slowly added to the slurry. The resultant was heated to 60° C. with stirring, to thereby allow to react for 1 hour. As a result, a surface-modified pigment in which the compound represented by the following Structural Formula (VI) had been added to the carbon black was generated.

Subsequently, the pH of the resultant was adjusted to 10 with a NaOH aqueous solution, to thereby obtain a surface-modified pigment dispersion in 30 minutes time. Ultrafiltration with a dialysis membrane was performed using ion-exchanged highly pure water and a dispersion liquid containing a pigment bound to at least one geminal bisphosphonic acid group or sodium geminal bisphosphonate. The resultant was further subjected to ultrasonic dispersion to thereby obtain a surface-modified pigment dispersion liquid in which a solid content of a pigment had been concentrated to 20% by mass.

The degree of the surface treatment of the resultant surface-modified pigment was found to be 0.75 mmol/g, and the volume average particle diameter ($D_{50}$)) as measured by the particle size distribution measuring device (NANOTRACK UPA-EX150, product of Nikkiso Co., Ltd.) was found to be 120 nm. Further, a sodium ion content was found to be 27,868 ppm as measured by means of TOA-DKK ion meter IM-32P (product of TOA DKK CORPORATION), and a phosphorous (P) content was found to be 2.31% by mass as measured by elementary analysis.

[Compound of Structural Formula (VI)]

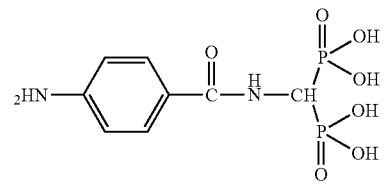

Preparation Example 2

—Preparation of Surface-modified Black Pigment Dispersion Liquid 2—

ProcessAll 4HV Mixer (4 L) was charged with 500 g of BLACK PEARLS (registered trademark) 880 (carbon black having the BET surface area of 220 $m^2/g$ and DBPA of 105 mL/100 g, product of Cabot Corporation), 1 L of ion-exchanged highly pure water, and 1 mol of the compound represented by the Structural Formula (VI).

Subsequently, the resulting mixture was mixed strongly at 300 rpm for 10 minutes, with heating to 60° C. To this, 20% by mass of a sodium nitrite aqueous solution (1 mole equivalent based on the compound represented by the Structural Formula (VI)) was added over 15 minutes. The resulting mixture was mixed and stirred for 3 hours with heating to 60° C. The reactant was taken out while diluting with 750 mL of ion-exchanged highly pure water. Ultrafiltration with a dialysis membrane was performed using ion-exchanged highly pure water and the resultant modified pigment dispersion. The resultant was further subjected to ultrasonic dispersion to thereby obtain a surface-modified pigment dispersion liquid in which a solid content of a pigment had been concentrated to 20% by mass.

The degree of the surface treatment of the resultant surface-modified pigment was found to be 0.5 mmol/g, and the volume average particle diameter ($D_{50}$) as measured by the particle size distribution measuring device (NANOTRACK UPA-EX150, product of Nikkiso Co., Ltd.) was found to be 104 nm. Further, a sodium ion content was found to be 19,940 ppm as measured by means of TOA-DKK ion meter IM-32P (product of TOA DKK CORPORATION), and a phosphorous (P) content was found to be 2.20% by mass as measured by elementary analysis.

Preparation Example 3

—Preparation of Surface-modified Magenta Pigment Dispersion Liquid—

Under room temperature environment, 690 g of SMART Magenta 3122BA (surface-treated C. I. Pigment Red 122 dispersion, solid content of pigment: 14.5% by mass, product of Sensient Technologies Corporation), 50 mmol of the compound represented by the Structural Formula (IV), and 500 mL of ion-exchanged highly pure water were mixed by means of Silverson Mixer (at 6,000 rpm). Thirty minutes later, sodium nitrite (100 mmol) dissolved in a small amount of ion-exchanged highly pure water was slowly added to the resultant mixture. The resultant was heated to 60° C. with stirring, to thereby allow to react for 1 hour. As a result, a surface-modified pigment in which the compound represented by the Structural Formula (IV) had been added to the C. I. Pigment Red 122 was generated.

Subsequently, the pH of the resultant was adjusted to 10 with tetramethyl ammonium hydroxide, to thereby obtain a surface-modified pigment dispersion in 30 minutes time. Ultrafiltration with a dialysis membrane was performed using ion-exchanged highly pure water and a dispersion liquid containing a pigment bound to at least one geminal bisphosphonic acid group or tetramethyl ammonium geminal bisphosphonate. The resultant was further subjected to ultrasonic dispersion to thereby obtain a surface-modified pigment dispersion liquid in which a solid content of a pigment had been concentrated to 20% by mass.

The degree of the surface treatment of the resultant surface-modified pigment was found to be 0.50 mmol/g, and the volume average particle diameter ($D_{50}$ as measured by the particle size distribution measuring device (NANOTRACK UPA-EX150, product of Nikkiso Co., Ltd.) was found to be 106 nm. Further, a phosphorous (P) content was found to be 0.25% by mass as measured by elementary analysis.

Preparation Example 4

—Preparation of Surface-treated Cyan Pigment Dispersion Liquid—

Under room temperature environment, 690 g of SMART Cyan 3154BA (surface-treated C. I. Pigment Blue 15:4 dispersion, solid content of pigment: 14.5% by mass, product of Sensient Technologies Corporation), 50 mmol of the compound represented by the Structural Formula (IV), and 500 mL of ion-exchanged highly pure water were mixed by means of Silverson Mixer (at 6,000 rpm). Thirty minutes later, sodium nitrite (100 mmol) dissolved in a small amount of ion-exchanged highly pure water was slowly added to the resultant mixture. The resultant was heated to 60° C. with stirring, to thereby allow to react for 1 hour. As a result, a surface-modified pigment in which the compound represented by the Structural Formula (IV) had been added to the C. I. Pigment Blue 15:4 was generated.

Subsequently, the pH of the resultant was adjusted to 10 with tetramethyl ammonium hydroxide, to thereby obtain a surface-modified pigment dispersion in 30 minutes time. Ultrafiltration with a dialysis membrane was performed using ion-exchanged highly pure water and a dispersion liquid containing a pigment bound to at least one geminal bisphosphonic acid group or tetramethyl ammonium geminal bisphosphonate. The resultant was further subjected to ultrasonic dispersion to thereby obtain a surface-modified pigment dispersion liquid in which a solid content of a pigment had been concentrated to 20% by mass.

The degree of the surface treatment of the resultant surface-modified pigment was found to be 0.50 mmol/g, and the volume average particle diameter ($D_{50}$) as measured by the particle size distribution measuring device (NANOTRACK UPA-EX150, product of Nikkiso Co., Ltd.) was found to be 113 nm. Further, a phosphorous (P) content was found to be 0.27% by mass as measured by elementary analysis.

Preparation Example 5

—Preparation of Surface-modified Yellow Pigment Dispersion Liquid—

Under room temperature environment, 690 g of SMART Yellow 3074BA (surface-treated C. I. Pigment Yellow 74 dispersion, solid content of pigment: 14.5% by mass, product of Sensient Technologies Corporation), 50 mmol of the compound represented by the Structural Formula (IV), and 500 mL of ion-exchanged highly pure water were mixed by means of Silverson Mixer (at 6,000 rpm). Thirty minutes later, sodium nitrite (100 mmol) dissolved in a small amount of ion-exchanged highly pure water was slowly added to the resultant mixture. The resultant was heated to 60° C. with stirring, to thereby allow to react for 1 hour. As a result, a surface-modified pigment in which the compound represented by the Structural Formula (IV) had been added to the C. I. Pigment Yellow 74 was generated.

Subsequently, the pH of the resultant was adjusted to 10 with tetramethyl ammonium hydroxide, to thereby obtain a surface-modified so pigment dispersion in 30 minutes time. Ultrafiltration with a dialysis membrane was performed using ion-exchanged highly pure water and a dispersion liquid containing a pigment bound to at least one geminal bisphosphonic acid group or tetramethyl ammonium geminal bisphosphonate. The resultant was further subjected to ultrasonic dispersion to thereby obtain a surface-modified pigment dispersion liquid in which a solid content of a pigment had been concentrated to 20% by mass.

The degree of the surface treatment of the resultant surface-modified pigment was found to be 0.50 mmol/g, and the volume average particle diameter ($D_{50}$) as measured by the particle size distribution measuring device (NANOTRACK UPA-EX150, product of Nikkiso Co., Ltd.) was found to be 142 nm. Further, a phosphorous (P) content was found to be 0.26% by mass as measured by elementary analysis.

Preparation Example 6

<Preparation of Magenta Pigment-containing Polymer Particles Dispersion Liquid>

—Preparation of Polymer Solution A—

A 1 L-flask equipped with a mechanical stirrer, a thermometer, a nitrogen-inlet tube, a reflux tube and a dropping funnel, which had been sufficiently purged with nitrogen gas, was charged with 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol, and the resulting mixture was mixed and heated to 65° C. Next, a mixed solution of styrene (100.8 g), acrylic acid (25.2 g), lauryl methacrylate (108.0 g), polyethylene glycol methacrylate (36.0 g), hydroxylethyl methacrylate (60.0 g), styrene macromer (36.0 g), mercaptoethanol (3.6 g), azobis methylvaleronitrile (2.4 g), and methyl ethyl ketone (18 g)

was added dropwise into the flask for 2.5 hours. Thereafter, a mixed solution of azobis methylvaleronitrile (0.8 g) and methyl ethyl ketone (18 g) was added dropwise into the flask for 0.5 hours. After aging the resultant at 65° C. for 1 hour, 0.8 g of azobis methylvaleronitrile was added thereto, and the resulting mixture was further aged for 1 hour. Upon completion of the reaction, methyl ethyl ketone (364 g) was added to the flask, to thereby obtain 800 g of a polymer solution A having a concentration of 50% by mass.

—Preparation of Pigment-containing Polymer Particles Dispersion Liquid—

After sufficiently stirring a mixture of the polymer solution A (28 g), C. I. Pigment Red 122 (42 g) serving as a pigment, a 1 mol/L potassium hydroxide aqueous solution (13.6 g), methyl ethyl ketone (20 g), and ion-exchanged water (13.6 g), the resulting mixture was kneaded by a roll mill. To the resultant paste, 200 g of pure water was added, the resulting mixture was sufficiently stirred, and methyl ethyl ketone and water were distilled off using an evaporator, followed by subjected to pressure filtration with a polyvinylidene fluoride membrane filter having an average pore diameter of 5.0 μm to remove coarse particles, to thereby obtain a magenta pigment-containing polymer particles dispersion liquid having a solid content of pigment of 15% by mass, and a solid content of 20% by mass.

The volume average particle diameter ($D_{50}$) of polymer particles in the resultant magenta pigment-containing polymer particles dispersion liquid was found to be 127 nm as measured by a particle size distribution measuring device (NANOTRACK UPA-EX150, product of Nikkiso Co., Ltd.).

Preparation Example 7

—Preparation of Cyan Pigment-containing Polymer Particles Dispersion—Liquid—

A cyan pigment-containing polymer particles dispersion liquid having a solid content of pigment of 15% by mass, and a solid content of 20% by mass was prepared in the same manner as in Preparation Example 6, except that the pigment was changed from C. I. Pigment Red 122 to a phthalocyanine pigment (C. I. Pigment Blue 15:3).

The volume average particle diameter ($D_{50}$) of polymer particles in the resultant cyan pigment-containing polymer particles dispersion liquid was found to be 93 nm as measured by a particle size distribution in, measuring device (NANOTRACK UPA-EX150, product of Nikkiso Co., Ltd.).

Preparation Example 8

—Preparation of Yellow Pigment-containing Polymer Particles Dispersion Liquid—

A yellow pigment-containing polymer particles dispersion liquid having a solid content of pigment of 15% by mass, and a solid content of 20% by mass was prepared in the same manner as in Preparation Example 6, except that the pigment was changed from C. I. Pigment Red 122 to a monoazo yellow pigment (C. I. Pigment Yellow 74).

The volume average particle diameter ($D_{50}$) of polymer particles in the resultant yellow pigment-containing polymer particles dispersion liquid was found to be 76 nm as measured by a particle size distribution measuring device (NANOTRACK UPA-EX150, product of Nikkiso Co., Ltd.).

Preparation Example 9

—Preparation of Carbon Black Pigment-containing Polymer Particles Dispersion Liquid—

A carbon black pigment-containing polymer particles dispersion liquid having a solid content of pigment of 15% by mass, and a solid content of 20% by mass was prepared in the same manner as in Preparation Example 6, except that the pigment was changed from C. I. Pigment Red 122 to carbon black (FW100, product of Degussa AG).

The volume average particle diameter ($D_{50}$) of polymer particles in the resultant carbon black pigment-containing polymer particles dispersion liquid was found to be 104 nm as measured by a particle size distribution measuring device (NANOTRACK UPA-EX150, product of Nikkiso Co., Ltd.).

Preparation Example 10

—Preparation of Yellow Pigment Surfactant Dispersion Liquid—

Monoazo yellow pigment (C. I. Pigment Yellow 74, product of Dainichiseika Color & Chemicals Mfg. Co., Ltd.) . . . 30.0 parts by mass Polyoxyethylene styrene phenyl ether (nonionic surfactant, NOIGEN EA-177, product of Dai-ichi Kogyo Seiyaku Co., Ltd., HLB value: 15.7) . . . 10.0 parts by mass Ion-exchanged water . . . 60.0 parts by mass At first, the surfactant was dissolved in ion-exchanged water, and the monoazo yellow pigment was mixed thereto to sufficiently wet the pigment. The resulting mixture was dispersed at 2,000 rpm for 2 hours by a wet disperser (DYNO-MILL KDL A, product of Willie et Bakkofen (WAB) Co., Ltd.) filled with zirconia beads having diameters of 0.5 mm, to thereby obtain a primary pigment dispersion.

To the primary pigment dispersion, 4.26 parts by mass of a water-soluble polyurethane resin (TAKELAC W-5661, product of MITSUI TAKEDA CHEMICALS, INC., active ingredient: 35.2% by mass, acid value: 40 mgKOH/g, weight average molecular weight: 18,000) was added as a water-soluble polymer compound aqueous solution, followed by being sufficiently stirred to thereby obtain a yellow pigment surfactant dispersion liquid having a solid content of pigment of 29% by mass. The volume average particle diameter ($D_{50}$) of the pigment dispersion in the resultant yellow pigment surfactant dispersion liquid was found to be 62 nm as measured by a particle size distribution measuring device (NANOTRACK UPA-EX150, product of Nikkiso Co., Ltd.).

Preparation Example 11

—Preparation of Magenta Pigment Surfactant Dispersion Liquid—

Quinacridone pigment (C. I. Pigment Red 122, product of Dainichiseika Color & Chemicals Mfg. Co., Ltd.) . . . 30.0 parts by mass Polyoxyethylene-β-naphthyl ether (nonionic surfactant, RT-100 product of Takemoto Oil & Fat Co., Ltd., HLB value: 18.5) . . . 10.0 parts by mass Ion exchanged water . . . 60.0 parts by mass At first, the surfactant was dissolved in ion-exchanged water, and the quinacridon pigment was mixed thereto to sufficiently wet the pigment. The resulting mixture was dispersed at 2,000 rpm for 2 hours by a wet disperser (DYNO-MILL KDL A, product of Willie et Bakkofen (WAB) Co., Ltd.) filled with zircon a beads having diameters of 0.5 mm, to thereby obtain a primary pigment dispersion.

To the primary pigment dispersion, 7.14 parts by mass of a water-soluble styrene/(meth)acrylate copolymer (JC-05, product of SEIKO PMC CORPORATION, active ingredient: 21% by mass, acid value: 170 mgKOH/g, weight average molecular weight 16,000) was added, followed by being sufficiently stirred to thereby obtain a magenta pigment surfactant dispersion liquid having a solid content of pigment of 28% by mass.

The volume average particle diameter ($D_{50}$) of the pigment dispersion in the resultant magenta pigment surfactant dispersion liquid was found to be 83 nm as measured by a particle size distribution measuring device (NANOTRACK UPA-EX150, product of Nikkiso Co., Ltd.).

Preparation Example 12

—Preparation of Cyan Pigment Surfactant Dispersion Liquid—

Phthalocyanine pigment (C. I. Pigment Blue 15:3, product of Dainichiseika Color & Chemicals Mfg. Co., Ltd.) . . . 30.0 parts by mass Polyoxyethylene styrene phenyl ether (nonionic surfactant, NOIGEN EA-177, product of Dai-ichi Kogyo Seiyaku Co., Ltd., HLB value: 15.7) . . . 10.0 parts by mass Ion-exchanged water . . . 60.0 parts by mass At first, the surfactant was dissolved in ion-exchanged water, and the phthalocyanine pigment was mixed thereto to sufficiently wet the pigment. The resulting mixture was dispersed at 2,000 rpm for 2 hours by a wet disperser (DYNO-MILL KDL A, product of Willie et Bakkofen (WAB) Co., Ltd.) filled with zirconia beads having diameters of 0.5 mm, to is thereby obtain a primary pigment dispersion.

To the primary pigment dispersion, 5.02 parts by mass of a water-soluble polyester resin (NICHIGO POLYESTER W-0030, product of Nippon Synthetic Chemical Industry Co., Ltd., active ingredient: 29.9% by mass, acid value: 100 mgKOH/g, weight average molecular weight: 7,000) was added, followed by being sufficiently stirred to thereby obtain a cyan pigment surfactant dispersion liquid having a solid content of pigment of 29% by mass.

The volume average particle diameter ($D_{50}$) of the pigment dispersion in the resultant cyan pigment surfactant dispersion liquid was found to be 78 nm as measured by a particle size distribution measuring device (NANOTRACK UPA-EX150, product of Nikkiso Co., Ltd.).

Production Examples 1 to 46

—Preparation of Recording Ink—

Each of recording inks of Production Examples 1 to 46 was prepared as follows. Specifically, an organic solvent, a penetrating agent, a surfactant, a foam inhibitor (defoaming agent), an antifungal agent, and to water were mixed as shown in Tables 1-1 to 10-2, and the resulting mixture was stirred for 1 hour to thereby homogeneously mix. To this mixture, a water-soluble resin was added, and the resulting mixture was stirred for 1 hour. To the resulting mixture, a water dispersible colorant (pigment dispersion liquid) and a pH regulator were added, and the resulting mixture was stirred for 1 hour. The resulting ink was subjected to pressure filtration with a polyvinylidene fluoride membrane filter having the average pore diameter of 1.2 μm to thereby remove coarse particles or dusts. Note that, amounts of components described in Tables 1-1 to 10-2 are not amounts in terms of a solid content but charged amounts. As for water-dispersible colorants (resin-coated pigments) of Preparation Examples 6 to 9, a solid content of water-dispersible resin contains an amount of resins to be coated.

TABLE 1-1

| | | Production Example | | | | |
|---|---|---|---|---|---|---|
| Component (% by mass) | | 1 | 2 | 3 | 4 | 5 |
| Water-Dispersible Colorant | Surface-modified Black Pigment Dispersion Liquid 1 (Prep. Ex. 1) | 17.50 | — | — | — | — |
| | Surface-modified Black Pigment Dispersion Liquid 2 (Prep. Ex. 2) | — | — | — | — | — |
| | Surface-modified Magenta Pigment Dispersion Liquid (Prep. Ex. 3) | — | 17.50 | — | — | — |
| | Surface-modified Cyan Pigment Dispersion Liquid (Prep. Ex. 4) | — | — | 12.50 | — | — |
| | Surface-modified Yellow Pigment Dispersion Liquid (Prep. Ex. 5) | — | — | — | 12.50 | — |
| | Magenta Pigment-Containing Polymer Particles Dispersion Liquid (Prep. Ex. 6) | — | — | — | — | 23.33 |
| | Cyan Pigment-Containing Polymer Particles Dispersion Liquid (Prep. Ex. 7) | — | — | — | — | — |
| | Yellow Pigment-Containing Polymer Particles Dispersion Liquid (Prep. Ex. 8) | — | — | — | — | — |
| | Carbon Black Pigment-Containing Polymer Particles Dispersion Liquid (Prep. Ex. 9) | — | — | — | — | — |
| | Yellow Pigment Surfactant Dispersion Liquid (Prep. Ex. 10) | — | — | — | — | — |
| | Magenta Pigment Surfactant Dispersion Liquid (Prep. Ex. 11) | — | — | — | — | — |
| | Cyan Pigment Surfactant Dispersion Liquid (Prep. Ex. 12) | — | — | — | — | — |
| Water-Dispersible Resin | Acrylic-Silicone Resin Emulsion | 22.56 | 22.56 | 18.80 | 18.80 | 22.56 |
| | Fluororesin Emulsion | — | — | — | — | — |
| | Polyurethane Emulsion | — | — | — | — | — |
| Organic Solvent | Amide Compound of Structural Formula (I-1) | 10.00 | 10.00 | 10.00 | 10.00 | 10.00 |
| | Amide Compound of Structural Formula (I-3) | — | — | — | — | — |
| | Compound of Structural Formula (II-1) | — | — | — | — | — |
| | Compound of Structural Formula (III-1) | 10.00 | 10.00 | 20.00 | 20.00 | 10.00 |
| | Compound of Structural Formula (IV-5) | — | — | — | — | — |
| | Amide Compound of Structural Formula (1) | 10.00 | 10.00 | 10.00 | 10.00 | 10.00 |
| | 3-Methyl-1,5-Pentanediol | — | — | — | — | — |
| | Propylene Glycol | — | — | — | — | — |

TABLE 1-1-continued

|  | Component (% by mass) | Production Example 1 | 2 | 3 | 4 | 5 |
|---|---|---|---|---|---|---|
|  | Glycerin | 10.00 | 10.00 | 10.00 | 10.00 | 10.00 |
|  | 1,3-Butanediol | — | — | — | — | — |
| Penetrating | 2-Ethyl-1,3-Hexanediol | 2.00 | — | — | 2.00 | 2.00 |
| Agent | 2,2,4-Trimethyl-1,3-Pentanediol | — | 2.00 | 2.00 | — | — |

TABLE 1-2

|  | Component (% by mass) | Production Example 1 | 2 | 3 | 4 | 5 |
|---|---|---|---|---|---|---|
| Surfactant | KF-643 | — | — | — | — | 0.20 |
|  | ZONYL FS-300 | — | — | — | — | — |
|  | Fluorosurfactant (Formula (q) of General Formula (2)) | 0.15 | 0.15 | 0.16 | 0.16 | — |
|  | SURFYNOL 104E | — | — | — | — | 1.00 |
|  | SOFTANOL EP-7025 | — | — | — | — | — |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | 0.50 | — | 0.50 | — | 0.50 |
|  | 2,5,8,11-Tetramethyldodecane-5,8-Diol | — | 0.50 | — | 0.50 | — |
| pH Regurator | 2-Amino-2-Ethyl-1,3-Propanediol | 0.20 | 0.10 | 0.10 | 0.10 | 0.20 |
| Pure Water |  | Bal. | Bal. | Bal. | Bal. | Bal |
| Total (% by mass) |  | 100 | 100 | 100 | 100 | 100 |
| Total Solid Content of Water-Dispersible Colorant and Water-Dispersible Resin (% by mass) |  | 12.5 | 12.5 | 10.0 | 10.0 | 13.7 |
| Solid Content of Water-Dispersible Resin/Solid Content of Water-Dispersible Colorant |  | 2.6 | 2.6 | 3.0 | 3.0 | 2.9 |

TABLE 2-1

|  | Component (% by mass) | Production Example 6 | 7 | 8 | 9 | 10 |
|---|---|---|---|---|---|---|
| Water-Dispersible Colorant | Surface-modified Black Pigment Dispersion Liquid 1 (Prep. Ex. 1) | — | — | — | — | — |
|  | Surface-modified Black Pigment Dispersion Liquid 2 (Prep. Ex. 2) | — | — | — | 17.50 | — |
|  | Surface-modified Magenta Pigment Dispersion Liquid (Prep. Ex. 3) | — | — | — | — | — |
|  | Surface-modified Cyan Pigment Dispersion Liquid (Prep. Ex. 4) | — | — | — | — | — |
|  | Surface-modified Yellow Pigment Dispersion Liquid (Prep. Ex. 5) | — | — | — | — | — |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | 16.67 | — | — | — | — |
|  | Yellow Pigment-Containing Polymer Particles Dispersion Liquid (Prep. Ex. 8) | — | 16.78 | — | — | — |
|  | Carbon Black Pigment-Containing Polymer Particles Dispersion Liquid (Prep. Ex. 9) | — | — | 23.33 | — | — |
|  | Yellow Pigment Surfactant Dispersion Liquid (Prep. Ex. 10) | — | — | — | — | 8.62 |
|  | Magenta Pigment Surfactant Dispersion Liquid (Prep. Ex. 11) | — | — | — | — | — |
|  | Cyan Pigment Surfactant Dispersion Liquid (Prep. Ex. 12) | — | — | — | — | — |
| Water-Dispersible Resin | Acrylic-Silicone Resin Emulsion | 18.80 | 18.80 | 22.56 | — | — |
|  | Fluororesin Emulsion | — | — | — | — | 20.00 |
|  | Polyurethane Emulsion | — | — | — | 20.05 | — |
| Organic Solvent | Amide Compound of Structural Formula (I-1) | 10.00 | 10.00 | 10.00 | — | 10.00 |
|  | Amide Compound of Structural Formula (I-3) | — | — | — | 10.00 | — |
|  | Compound of Structural Formula (II-1) | — | — | — | 10.00 | — |
|  | Compound of Structural Formula (III-1) | 20.00 | 20.00 | 10.00 | — | 20.00 |
|  | Compound of Structural Formula (IV-5) | — | — | — | 5.00 | — |
|  | Amide Compound of Structural Formula (1) | 10.00 | 10.00 | 10.00 | — | 10.00 |

TABLE 2-1-continued

| | | Production Example | | | | |
|---|---|---|---|---|---|---|
| | Component (% by mass) | 6 | 7 | 8 | 9 | 10 |
| | 3-Methyl-1,5-Pentanediol | — | — | — | — | 5.00 |
| | Propylene Glycol | — | — | — | — | — |
| | Glycerin | 10.00 | 10.00 | 10.00 | 10.00 | 10.00 |
| | 1,3-Butanediol | — | — | — | 5.00 | — |
| Penetrating | 2-Ethyl-1,3-Hexanediol | — | 2.00 | 2.00 | — | 2.00 |
| Agent | 2,2,4-Trimethyl-1,3-Pentanediol | 2.00 | — | — | 2.00 | — |

TABLE 2-2

| | | Production Example | | | | |
|---|---|---|---|---|---|---|
| | Component (% by mass) | 6 | 7 | 8 | 9 | 10 |
| Surfactant | KF-643 | 0.20 | 0.20 | 0.15 | — | — |
| | ZONYL FS-300 | — | — | — | 2.50 | — |
| | Fluorosurfactant (Formula (q) of General Formula (2)) | — | — | — | — | 0.15 |
| | SURFYNOL 104E | 1.00 | 1.00 | 1.00 | — | — |
| | SOFTANOL EP-7025 | — | — | — | — | — |
| Antifungal Agent | PROXEL GXL | 0.06 | 0.05 | 0.05 | 0.05 | 0.05 |
| Foam Inhibitor (Defoaming Agent) | 2,4,7,9-Tetramethyldecane-4,7-Diol | 0.50 | — | 0.40 | — | 0.50 |
| | 2,5,8,11-Tetramethydodecane-5,8-Diol | — | 0.50 | — | 0.50 | — |
| pH Regurator | 2-Amino-2-Ethyl-1,3-Propanediol | 0.10 | 0.10 | 0.20 | 0.20 | 0.10 |
| Pure Water | | Bal. | Bal | Bal. | Bal | Bal. |
| Total (% by mass) | | 100 | 100 | 100 | 100 | 100 |
| Total Solid Content of Water-Dispersible Colorant and Water Dispersible Resin (% by mass) | | 10.8 | 10.9 | 13.7 | 12.5 | 12.5 |
| Solid Content of Water-Dispersible Resin/Solid Content of Water-Dispersible Colorant | | 2.5 | 2.5 | 2.9 | 2.6 | 4.0 |

TABLE 3-1

| | | Production Example | | | | |
|---|---|---|---|---|---|---|
| | Component (% by mass) | 11 | 12 | 13 | 14 | 15 |
| Water-Dispersible Colorant | Surface-modified Black Pigment Dispersion Liquid 1 (Prep. Ex. 1) | — | — | 17.50 | — | — |
| | Surface-modified Black Pigment Dispersion Liquid 2 (Prep. Ex. 2) | — | — | — | — | — |
| | Surface-modified Magenta Pigment Dispersion Liquid (Prep. Ex. 3) | — | — | — | 17.50 | — |
| | Surface-modified Cyan Pigment Dispersion Liquid (Prep. Ex. 4) | — | — | — | — | 12.50 |
| | Surface-modified Yellow Pigment Dispersion Liquid (Prep. Ex. 5) | — | — | — | — | — |
| | Magenta Pigment-Containing Polymer Particle Dispersion (Prep. Ex. 6) | — | — | — | — | — |
| | Cyan Pigment-Containing Polymer Particles Dispersion Liquid (Prep. Ex. 7) | — | — | — | — | — |
| | Yellow Pigment-Containing Polymer Particles Dispersion Liquid (Prep. Ex. 8) | — | — | — | — | — |
| | Carbon Black Pigment-Containing Polymer Particles Dispersion Liquid (Prep. Ex. 9) | — | — | — | — | — |
| | Yellow Pigment Surfactant Dispersion Liquid (Prep. Ex. 10) | — | — | — | — | — |
| | Magenta Pigment Surfactant Dispersion Liquid (Prep. Ex. 11) | 12.50 | — | — | — | — |
| | Cyan Pigment Surfactant Dispersion Liquid (Prep. Ex. 12) | — | 8.62 | — | — | — |
| Water-Dispersible Resin | Acrylic-Silicone Resin Emulsion | — | — | 22.56 | 22.56 | 25.00 |
| | Fluororesin Emulsion | 18.20 | 20.00 | — | — | — |
| | Polyurethane Emulsion | — | — | — | — | — |
| Organic Solvent | Amide Compound of Structural Formula (I-1) | 10.00 | 10.00 | — | — | — |
| | Amide Compound of Structural Formula (I-3) | — | — | — | — | — |
| | Compound of Structural Formula (II-1) | — | — | — | — | — |
| | Compound of Structural Formula (III-1) | 10.00 | 20.00 | — | — | — |

TABLE 3-1-continued

|  | Component (% by mass) | Production Example 11 | 12 | 13 | 14 | 15 |
|---|---|---|---|---|---|---|
|  | Compound of Structural Formula (IV-5) | — | — | — | — | — |
|  | Amide Compound of Structural Formula (1) | 10.00 | 10.00 | — | — | — |
|  | 3-Methyl-1,5-Pentanediol | 5.00 | 5.00 | 5.00 | 5.00 | 10.00 |
|  | Propylene Glycol | — | — | — | — | — |
|  | Glycerin | 10.00 | 10.00 | 15.00 | 15.00 | 15.00 |
|  | 1,3-Butanediol | — | — | 15.00 | 15.00 | 15.00 |
| Penetrating Agent | 2-Ethyl-1,3-Hexanediol | 2.00 | 2.00 | 2.00 | 2.00 | 2.00 |
|  | 2,2,4-Trimethyl-1,3-Pentanediol | — | — | — | — | — |

TABLE 3-2

|  | Component (% by mass) | Production Example 11 | 12 | 13 | 14 | 15 |
|---|---|---|---|---|---|---|
| Surfactant | KF-643 | — | — | — | — | — |
|  | ZONYL FS-300 | — | — | — | — | — |
|  | Fluorosurfactant (Formula (q) of General Formula (2)) | 0.15 | 0.15 | — | — | — |
|  | SURFYNOL 104E | — | — | — | — | — |
|  | SOFTANOL EP-7026 | — | — | 2.00 | 2.00 | 2.00 |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | 0.50 | 0.50 | 0.40 | 0.40 | 0.40 |
|  | 2,5,8,11-Tetramethyldodecane-5,8-Diol | — | — | — | — | — |
| pH Regurator | 2-Amino-2-Ethyl-1,3-Propanediol | 0.20 | 0.10 | 0.20 | 0.20 | 0.20 |
| Pure Water |  | Bal. | Bal. | Bal. | Bal. | Bal. |
| Total (% by mass) |  | 100 | 100 | 100 | 100 | 100 |
| Total Solid Content of Water-Dispersible Colorant and Water-Dispersible Resin (% by mass) |  | 12.6 | 12.5 | 12.5 | 12.5 | 12.5 |
| Solid Content of Water-Dispersible Resin/Solid Content of Water-Dispersible Colorant |  | 2.6 | 4.1 | 2.6 | 2.6 | 4.0 |

TABLE 4-1

|  | Component (% by mass) | Production Example 16 | 17 | 18 | 19 | 20 |
|---|---|---|---|---|---|---|
| Water-Dispersible Colorant | Surface-modified Black Pigment Dispersion Liquid 1 (Prep. Ex. 1) | — | 37.50 | — | — | — |
|  | Surface-modified Black Pigment Dispersion Liquid 2 (Prep. Ex. 2) | — | — | — | — | — |
|  | Surface-modified Magenta Pigment Dispersion Liquid (Prep. Ex. 3) | — | — | 37.50 | — | — |
|  | Surface-modified Cyan Pigment Dispersion Liquid (Prep. Ex. 4) | — | — | — | 22.50 | — |
|  | Surface-modified Yellow Pigment Dispersion Liquid (Prep. Ex. 5) | 12.50 | — | — | — | 22.50 |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | — | — | — | — | — |
|  | Yellow Pigment-Containing Polymer Particles Dispersion Liquid (Prep. Ex. 8) | — | — | — | — | — |
|  | Carbon Black Pigment-Containing Polymer Particles Dispersion Liquid (Prep. Ex. 9) | — | — | — | — | — |
|  | Yellow Pigment Surfactant Dispersion Liquid (Prep. Ex. 10) | — | — | — | — | — |
|  | Magenta Pigment Surfactant Dispersion Liquid (Prep. Ex. 11) | — | — | — | — | — |
|  | Cyan Pigment Surfactant Dispersion Liquid (Prep. Ex. 12) | — | — | — | — | — |
| Water-Dispersible Resin | Acrylic-Silicone Resin Emulsion | 25.00 | 6.27 | 6.27 | 6.27 | 6.27 |
|  | Fluororesin Emulsion | — | — | — | — | — |
|  | Polyurethane Emulsion | — | — | — | — | — |
| Organic Solvent | Amide Compound of Structural Formula (I-1) | — | 10.00 | 10.00 | 10.00 | 10.00 |
|  | Amide Compound of Structural Formula (I-3) | — | — | — | — | — |

TABLE 4-1-continued

|  | Component (% by mass) | Production Example 16 | 17 | 18 | 19 | 20 |
|---|---|---|---|---|---|---|
|  | Compound of Structural Formula (II-1) | — | — | — | — | — |
|  | Compound of Structural Formula (III-1) | — | 12.50 | 12.50 | 17.50 | 17.50 |
|  | Compound of Structural Formula (IV-5) | — | — | — | — | — |
|  | Amide Compound of Structural Formula (1) | — | 10.00 | 10.00 | 10.00 | 10.00 |
|  | 3-Methyl-1,5-Pentanediol | 10.00 | — | — | — | — |
|  | Propylene Glycol | — | — | — | — | — |
|  | Glycerin | 15.00 | 8.00 | 8.00 | 10.00 | 10.00 |
|  | 1,3-Butanediol | 15.00 | — | — | — | — |
| Penetrating | 2-Ethyl-1,3-Hexanediol | 2.00 | — | — | — | — |
| Agent | 2,2,4-Trimethyl-1,3-Pentanediol | — | 2.00 | 2.00 | 2.00 | 2.00 |

TABLE 4-2

|  | Component (% by mass) | Production Example 16 | 17 | 18 | 19 | 20 |
|---|---|---|---|---|---|---|
| Surfactant | KF-643 | — | — | — | — | — |
|  | ZONYL FS-300 | — | — | — | — | — |
|  | Fluorosurfactant (Formula (q) of General Formula (2)) | — | 0.20 | 0.30 | 0.30 | 0.30 |
|  | SURFYNOL 104E | — | — | — | — | — |
|  | SOFTANOL EP-7025 | 2.00 | — | — | — | — |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | 0.40 | 0.40 | 0.40 | 0.40 | 0.40 |
|  | 2,5,8,11-Tetramethyldodecane-5,8-Diol | — | — | — | — | — |
| pH Regurator | 2-Amino-2-Ethyl-1,3-Propanediol | 0.20 | 0.20 | 0.20 | 0.20 | 0.20 |
| Pure Water |  | Bal | Bal. | Bal | Bal. | Bal. |
| Total (% by mass) |  | 100 | 100 | 100 | 100 | 100 |
| Total Solid Content of Water-Dispersible Colorant and Water-Dispersible Resin (% by mass) |  | 12.5 | 10.0 | 10.0 | 7.0 | 7.0 |
| Solid Content of Water-Dispersible Resin/Solid Content of Water-Dispersible Colorant |  | 4.0 | 0.3 | 0.3 | 0.6 | 0.6 |

TABLE 5-1

|  | Component (% by mass) | Production Example 21 | 22 | 23 | 24 |
|---|---|---|---|---|---|
| Water-Dispersible Colorant | Surface-modified Black Pigment Dispersion Liquid 1 (Prep. Ex. 1) | 17.50 | — | — | — |
|  | Surface-modified Black Pigment Dispersion Liquid 2 (Prep. Ex. 2) | — | — | — | — |
|  | Surface-modified Magenta Pigment Dispersion Liquid (Prep. Ex. 3) | — | 17.50 | — | — |
|  | Surface-modified Cyan Pigment Dispersion Liquid (Prep. Ex. 4) | — | — | 12.50 | — |
|  | Surface-modified Yellow Pigment Dispersion Liquid (Prep. Ex. 5) | — | — | — | 12.50 |
|  | Magenta Pigment-Containing Polymer Particles Dispersion Liquid (Prep. Ex. 6) | — | — | — | — |
|  | Cyan Pigment-Containing Polymer Particles Dispersion Liquid (Prep. Ex. 7) | — | — | — | — |
|  | Yellow Pigment-Containing Polymer Particles Dispersion Liquid (Prep. Ex. 8) | — | — | — | — |
|  | Carbon Black Pigment-Containing Polymer Particles Dispersion Liquid (Prep. Ex. 9) | — | — | — | — |
|  | Yellow Pigment Surfactant Dispersion Liquid (Prep. Ex. 10) | — | — | — | — |
|  | Magenta Pigment Surfactant Dispersion Liquid (Prep. Ex. 11) | — | — | — | — |
|  | Cyan Pigment Surfactant Dispersion Liquid (Prep. Ex. 12) | — | — | — | — |
| Water-Dispersible Resin | Acrylic-Silicone Resin Emulsion | 22.56 | 22.56 | 18.80 | 18.80 |
|  | Fluororesin Emulsion | — | — | — | — |
|  | Polyurethane Emulsion | — | — | — | — |

TABLE 5-1-continued

|  | Component (% by mass) | Production Example 21 | 22 | 23 | 24 |
|---|---|---|---|---|---|
| Organic Solvent | Amide Compound of Structural Formula (I-1) | 10.00 | 10.00 | 10.00 | 10.00 |
|  | Amide Compound of Structural Formula (I-3) | — | — | — | — |
|  | Compound of Structural Formula (II-1) | — | — | — | — |
|  | Compound of Structural Formula (III-1) | 10.00 | 10.00 | 20.00 | 20.00 |
|  | Compound of Structural Formula (IV-5) | — | — | — | — |
|  | Amide Compound of Structural Formula (1) | 10.00 | 10.00 | 10.00 | 10.00 |
|  | 3-Methyl-1,5-Pentanediol | — | — | — | — |
|  | Propylene Glycol | 10.00 | 10.00 | 10.00 | 10.00 |
|  | Glycerin | — | — | — | — |
|  | 1,3-Butanediol | — | — | — | — |
| Penetrating Agent | 2-Ethyl-1,3-Hexanediol | 2.00 | — | — | 2.00 |
|  | 2,2,4-Trimethyl-1,3-Pentanediol | — | 2.00 | 2.00 | — |

TABLE 5-2

|  | Component (% by mass) | Production Example 21 | 22 | 23 | 24 |
|---|---|---|---|---|---|
| Surfactant | KF-643 | — | — | — | — |
|  | ZONYL FS-300 | — | — | — | — |
|  | Fluorosurfactant (Formula (q) of General Formula (2)) | 0.15 | 0.15 | 0.16 | 0.16 |
|  | SURFYNOL 104E | — | — | — | — |
|  | SOFTANOL EP-7025 | — | — | — | — |
| Antifungal Agent | PROXEL GXL | 0.05 | 0.05 | 0.05 | 0.05 |
| Foam Inhibitor (Defoaming Agent) | 2,4,7,9-Tetramethyldecane-4,7-Diol | 0.50 | — | 0.50 | — |
|  | 2,5,8,11-Tetramethyldodecane-5,8-Diol | — | 0.50 | — | 0.50 |
| pH Regulator | 2-Amino-2-Ethyl-1,3-Propanediol | 0.20 | 0.10 | 0.10 | 0.10 |
| Pure Water |  | Bal. | Bal. | Bal. | Bal. |
| Total (% by mass) |  | 100 | 100 | 100 | 100 |
| Total Solid Content of Water-Dispersible Colorant and Water-Dispersible Resin (% by mass) |  | 12.5 | 12.5 | 10.0 | 10.0 |
| Solid Content of Water-Dispersible Resin/Solid Content of Water Dispersible Colorant |  | 2.8 | 2.6 | 3.0 | 3.0 |

TABLE 6-1

|  | Component (% by mass) | Production Example 25 | 26 | 27 | 28 | 29 |
|---|---|---|---|---|---|---|
| Water-Dispersible Colorant | Surface-modified Black Pigment Dispersion Liquid 1 (Prep. Ex. 1) | 17.50 | — | — | — | 17.50 |
|  | Surface-modified Black Pigment Dispersion Liquid 2 (Prep. Ex. 2) | — | — | — | — | — |
|  | Surface-modified Magenta Pigment Dispersion Liquid (Prep. Ex. 3) | — | 17.50 | — | — | — |
|  | Surface-modified Cyan Pigment Dispersion Liquid (Prep. Ex. 4) | — | — | 12.50 | — | — |
|  | Surface-modified Yellow Pigment Dispersion Liquid (Prep. Ex. 5) | — | — | — | 12.50 | — |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | — | — | — | — | — |
|  | Yellow Pigment-Containing Polymer Particles Dispersion Liquid (Prep. Ex. 8) | — | — | — | — | — |
|  | Carbon Black Pigment-Containing Polymer Particles Dispersion Liquid (Prep. Ex. 9) | — | — | — | — | — |
|  | Yellow Pigment Surfactant Dispersion Liquid (Prep. Ex. 10) | — | — | — | — | — |
|  | Magenta Pigment Surfactant Dispersion Liquid (Prep. Ex. 11) | — | — | — | — | — |
|  | Cyan Pigment Surfactant Dispersion Liquid (Prep. Ex. 12) | — | — | — | — | — |

TABLE 6-1-continued

|  | Component (% by mass) | Production Example 25 | 26 | 27 | 28 | 29 |
|---|---|---|---|---|---|---|
| Water-Dispersible Resin | Acrylic-Silicone Resin Emulsion | 22.56 | 22.56 | 18.80 | 18.80 | 22.56 |
|  | Fluororesin Emulsion | — | — | — | — | — |
|  | Polyurethane Emulsion | — | — | — | — | — |
| Organic Solvent | Amide Compound of Structural Formula (I-1) | — | — | — | — | 10.00 |
|  | Amide Compound of Structural Formula (I-3) | — | — | — | — | — |
|  | Compound of Structural Formula (II-1) | — | — | — | — | — |
|  | Compound of Structural Formula (III-1) | 10.00 | 10.00 | 20.00 | 20.00 | — |
|  | Compound of Structural Formula (IV-5) | — | — | — | — | — |
|  | Amide Compound of Structural Formula (1) | 10.00 | 10.00 | 10.00 | 10.00 | 10.00 |
|  | 3-Methyl-1,5-Pentanediol | — | — | — | — | — |
|  | Propylene Glycol | — | — | — | — | — |
|  | Glycerin | 20.00 | 20.00 | 20.00 | 20.00 | 20.00 |
|  | 1,3-Butanediol | — | — | — | — | — |
| Penetrating Agent | 2-Ethyl-1,3-Hexanediol | 2.00 | — | — | 2.00 | 2.00 |
|  | 2,2,4-Trimethyl-1,3-Pentanediol | — | 2.00 | 2.00 | — | — |

TABLE 6-2

|  | Component (% by mass) | Production Example 25 | 26 | 27 | 28 | 29 |
|---|---|---|---|---|---|---|
| Surfactant | KF-643 | — | — | — | — | — |
|  | ZONYL FS-300 | — | — | — | — | — |
|  | Fluorosurfactant (Formula (q) of General Formula (2)) | 0.15 | 0.15 | 0.16 | 0.16 | 0.15 |
|  | SURFYNOL 104E | — | — | — | — | — |
|  | SOFTANOL EP-7025 | — | — | — | — | — |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | 0.50 | — | 0.50 | — | 0.50 |
|  | 2,5,8,11-Tetramethyldodecane-5,8-Diol | — | 0.50 | — | 0.50 | — |
| pH Regurator | 2-Amino-2-Ethyl-1,3-Propanediol | 0.20 | 0.10 | 0.10 | 0.10 | 0.20 |
| Pure Water |  | Bal. | Bal. | Bal. | Bal. | Bal |
| Total (% by mass) |  | 100 | 100 | 100 | 100 | 100 |
| Total Solid Content of Water-Dispersible Colorant and Water-Dispersible Resin (% by mass) |  | 12.5 | 12.5 | 10.0 | 10.0 | 12.5 |
| Solid Content of Water-Dispersible Resin/Solid Content of Water-Dispersible Colorant |  | 2.6 | 2.6 | 3.0 | 3.0 | 2.6 |

TABLE 7-1

|  | Component (% by mass) | Production Example 30 | 31 | 32 | 33 | 34 |
|---|---|---|---|---|---|---|
| Water-Dispersible Colorant | Surface-modified Black Pigment Dispersion Liquid 1 (Prep. Ex. 1) | — | — | — | 17.50 | — |
|  | Surface-modified Black Pigment Dispersion Liquid 2 (Prep. Ex. 2) | — | — | — | — | — |
|  | Surface-modified Magenta Pigment Dispersion Liquid (Prep. Ex. 3) | 17.50 | — | — | — | 17.50 |
|  | Surface-modified Cyan Pigment Dispersion Liquid (Prep. Ex. 4) | — | 12.50 | — | — | — |
|  | Surface-modified Yellow Pigment Dispersion Liquid (Prep. Ex. 5) | — | — | 12.50 | — | — |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | — | — | — | — | — |
|  | Yellow Pigment-Containing Polymer Particles Dispersion Liquid (Prep. Ex. 8) | — | — | — | — | — |
|  | Carbon Black Pigment-Containing Polymer Particles Dispersion Liquid (Prep. Ex. 9) | — | — | — | — | — |
|  | Yellow Pigment Surfactant Dispersion Liquid (Prep. Ex. 10) | — | — | — | — | — |
|  | Magenta Pigment Surfactant Dispersion Liquid (Prep. Ex. 11) | — | — | — | — | — |

TABLE 7-1-continued

|  | Component (% by mass) | Production Example | | | | |
|---|---|---|---|---|---|---|
|  |  | 30 | 31 | 32 | 33 | 34 |
|  | Cyan Pigment Surfactant Dispersion Liquid (Prep. Ex. 12) | — | — | — | — | — |
| Water-Dispersible Resin | Acrylic-Silicone Resin Emulsion | 22.56 | 18.80 | 18.80 | — | — |
|  | Fluororesin Emulsion | — | — | — | — | — |
|  | Polyurethane Emulsion | — | — | — | — | — |
| Organic Solvent | Amide Compound of Structural Formula (I-1) | 10.00 | 10.00 | 10.00 | 10.00 | 10.00 |
|  | Amide Compound of Structural Formula (I-3) | — | — | — | — | — |
|  | Compound of Structural Formula (II-1) | — | — | — | — | — |
|  | Compound of Structural Formula (III-1) | — | — | — | 10.00 | 10.00 |
|  | Compound of Structural Formula (IV-5) | — | — | — | — | — |
|  | Amide Compound of Structural Formula (1) | 10.00 | 10.00 | 10.00 | 10.00 | 10.00 |
|  | 3-Methyl-1,5-Pentanediol | — | — | — | — | — |
|  | Propylene Glycol | — | — | — | — | — |
|  | Glycerin | 20.00 | 20.00 | 20.00 | 10.00 | 10.00 |
|  | 1,3-Butanediol | — | — | — | — | — |
| Penetrating Agent | 2-Ethyl-1,3-Hexanediol | — | — | 2.00 | 2.00 | — |
|  | 2,2,4-Trimethyl-1,3-Pentanediol | 2.00 | 2.00 | — | — | 2.00 |

TABLE 7-2

|  | Component (% by mass) | Production Example | | | | |
|---|---|---|---|---|---|---|
|  |  | 30 | 31 | 32 | 33 | 34 |
| Surfactant | KF-643 | — | — | — | — | — |
|  | ZONYL FS-300 | — | — | — | — | — |
|  | Fluorosurfactant (Formula (q) of General Formula (2)) | 0.15 | 0.16 | 0.16 | 0.15 | 0.15 |
|  | SURFYNOL 104E | — | — | — | — | — |
|  | SOFTANOL EP-7025 | — | — | — | — | — |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | — | 0.50 | — | 0.50 | — |
|  | 2,5,8,11-Tetramethyldodecane-5,8-Diol | 0.50 | — | 0.50 | — | 0.50 |
| pH Regurator | 2-Amino-2-Ethyl-1,3-Propanediol | 0.10 | 0.10 | 0.10 | 0.20 | 0.10 |
| Pure Water |  | Bal | Bal | Bal | Bal | Bal. |
| Total (% by mass) |  | 100 | 100 | 100 | 100 | 100 |
| Total Solid Content of Water-Dispersible Colorant and Water-Dispersible Resin (% by mass) |  | 12.5 | 10.0 | 10.0 | 3.5 | 3.5 |
| Solid Content of Water-Dispersible Resin/Solid Content of Water-Dispersible Colorant |  | 2.6 | 3.0 | 3.0 | 0.0 | 0.0 |

TABLE 8-1

|  | Component (% by mass) | Production Example | | | | |
|---|---|---|---|---|---|---|
|  |  | 35 | 36 | 37 | 38 | 39 |
| Water-Dispersible Colorant | Surface-modified Black Pigment Dispersion Liquid 1 (Prep. Ex 1) | — | — | 17.50 | — | — |
|  | Surface-modified Black Pigment Dispersion Liquid 2 (Prep. Ex. 2) | — | — | — | — | — |
|  | Surface-modified Magenta Pigment Dispersion Liquid (Prep. Ex. 3) | — | — | — | 17.50 | — |
|  | Surface-modified Cyan Pigment Dispersion Liquid (Prep. Ex. 4) | 12.50 | — | — | — | 12.50 |
|  | Surface-modified Yellow Pigment Dispersion Liquid (Prep. Ex. 5) | — | 12.50 | — | — | — |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | — | — | — | — | — |
|  | Yellow Pigment-Containing Polymer Particles Dispersion Liquid (Prep. Ex. 8) | — | — | — | — | — |
|  | Carbon Black Pigment-Containing Polymer Particles Dispersion Liquid (Prep. Ex. 9) | — | — | — | — | — |
|  | Yellow Pigment Surfactant Dispersion Liquid (Prep. Ex. 10) | — | — | — | — | — |

TABLE 8-1-continued

|  | Component (% by mass) | Production Example 35 | 36 | 37 | 38 | 39 |
|---|---|---|---|---|---|---|
|  | Magenta Pigment Surfactant Dispersion Liquid (Prep. Ex. 11) | — | — | — | — | — |
|  | Cyan Pigment Surfactant Dispersion Liquid (Prep. Ex. 12) | — | — | — | — | — |
| Water-Dispersible Resin | Acrylic-Silicone Resin Emulsion | — | — | 22.56 | 22.56 | 18.80 |
|  | Fluororesin Emulsion | — | — | — | — | — |
|  | Polyurethane Emulsion | — | — | — | — | — |
| Organic Solvent | Amide Compound of Structural Formula (I-1) | 10.00 | 10.00 | 10.00 | 10.00 | 10.00 |
|  | Amide Compound of Structural Formula (I-3) | — | — | — | — | — |
|  | Compound of Structural Formula (II-1) | — | — | — | — | — |
|  | Compound of Structural Formula (III-1) | 20.00 | 20.00 | 10.00 | 10.00 | 20.00 |
|  | Compound of Structural Formula (IV-5) | — | — | — | — | — |
|  | Amide Compound of Structural Formula (1) | 10.00 | 10.00 | 10.00 | 10.00 | 10.00 |
|  | 3-Methyl-1,5-Pentanediol | — | — | — | — | — |
|  | Propylene Glycol | — | — | — | — | — |
|  | Glycerin | 10.00 | 10.00 | 10.00 | 10.00 | 10.00 |
|  | 1,3-Butanediol | — | — | — | — | — |
| Penetrating Agent | 2-Ethyl-1,3-Hexanediol | — | 2.00 | 2.00 | — | — |
|  | 2,2,4-Trimethyl-1,3-Pentanediol | 2.00 | — | — | 2.00 | 2.00 |

TABLE 8-2

|  | Component (% by mass) | Production Example 35 | 36 | 37 | 38 | 39 |
|---|---|---|---|---|---|---|
| Surfactant | KF-643 | — | — | — | — | — |
|  | ZONYL FS-300 | — | — | — | — | — |
|  | Fluorosurfactant (Formula (q) of General Formula (2)) | 0.16 | 0.16 | — | — | — |
|  | SURFYNOL 104E | — | — | — | — | — |
|  | SOFTANOL EP-7025 | — | — | — | — | — |
| Antifungal Agent | PROXEL GXL | 0.05 | 0.05 | 0.05 | 0.05 | 0.05 |
| Foam Inhibitor (Defoaming Agent) | 2,4,7,9-Tetramethyldecane-4,7-Diol | 0.50 | — | — | — | — |
|  | 2,5,8,11-Tetramethyldodecane-5,8-Diol | — | 0.50 | — | — | — |
| pH Regurator | 2-Amino-2-Ethyl-1,3-Propanediol | 0.10 | 0.10 | 0.20 | 0.10 | 0.10 |
| Pure Water |  | Bal. | Bal. | Bal | Bal. | Bal. |
| Total (% by mass) |  | 100 | 100 | 100 | 100 | 100 |
| Total Sold Content of Water-Dispersible Colorant and Water-Dispersible Resin (% by mass) |  | 2.5 | 2.5 | 12.5 | 12.5 | 10.0 |
| Solid Content of Water-Dispersible Resin/Solid Content of Water-Dispersible Colorant |  | 0.0 | 0.0 | 2.6 | 2.6 | 3.0 |

TABLE 9-1

|  | Component (% by mass) | Production Example 40 | 41 | 42 | 43 | 44 |
|---|---|---|---|---|---|---|
| Water-Dispersible Colorant | Surface-modified Black Pigment Dispersion Liquid 1 (Prep. Ex. 1) | — | 17.50 | — | — | — |
|  | Surface-modified Black Pigment Dispersion Liquid 2 (Prep. Ex. 2) | — | — | — | — | — |
|  | Surface-modified Magenta Pigment Dispersion Liquid (Prep. Ex. 3) | — | — | 17.50 | — | — |
|  | Surface-modified Cyan Pigment Dispersion Liquid (Prep. Ex. 4) | — | — | — | 12.50 | — |
|  | Surface-modified Yellow Pigment Dispersion Liquid (Prep. Ex. 5) | 12.50 | — | — | — | 12.50 |
|  | Magenta Pigment-Containing Polymer Particles Dispersion Liquid (Prep. Ex. 6) | — | — | — | — | — |
|  | Cyan Pigment-Containing Polymer Particles Dispersion Liquid (Prep. Ex. 7) | — | — | — | — | — |
|  | Yellow Pigment-Containing Polymer Particles Dispersion Liquid (Prep. Ex. 8) | — | — | — | — | — |
|  | Carbon Black Pigment-Containing Polymer Particles Dispersion Liquid (Prep. Ex. 9) | — | — | — | — | — |

TABLE 9-1-continued

|  | Component (% by mass) | Production Example | | | | |
|---|---|---|---|---|---|---|
|  |  | 40 | 41 | 42 | 43 | 44 |
|  | Yellow Pigment Surfactant Dispersion Liquid (Prep. Ex. 10) | — | — | — | — | — |
|  | Magenta Pigment Surfactant Dispersion Liquid (Prep. Ex. 11) | — | — | — | — | — |
|  | Cyan Pigment Surfactant Dispersion Liquid (Prep. Ex. 12) | — | — | — | — | — |
| Water-Dispersible Resin | Acrylic-Silicone Resin Emulsion | 18.80 | 22.56 | 22.56 | 18.80 | 18.80 |
|  | Fluororesin Emulsion | — | — | — | — | — |
|  | Polyurethane Emulsion | — | — | — | — | — |
| Organic Solvent | Amide Compound of Structural Formula (I-1) | 10.00 | 10.00 | 10.00 | 10.00 | 10.00 |
|  | Amide Compound of Structural Formula (I-3) | — | — | — | — | — |
|  | Compound of Structural Formula (II-1) | — | — | — | — | — |
|  | Compound of Structural Formula (III-1) | 20.00 | 10.00 | 10.00 | 20.00 | 20.00 |
|  | Compound of Structural Formula (IV-5) | — | — | — | — | — |
|  | Amide Compound of Structural Formula (1) | 10.00 | 10.00 | 10.00 | 10.00 | 10.00 |
|  | 3-Methyl-1,5-Pentanediol | — | — | — | — | — |
|  | Propylene Glycol | — | — | — | — | — |
|  | Glycerin | 10.00 | 10.00 | 10.00 | 10.00 | 10.00 |
|  | 1,3-Butanediol | — | — | — | — | — |
| Penetrating Agent | 2-Ethyl-1,3-Hexanediol | 2.00 | — | — | — | — |
|  | 2,2,4-Trimethyl-1,3-Pentanediol | — | — | — | — | — |

TABLE 9-2

|  | Component (% by mass) | Production Example | | | | |
|---|---|---|---|---|---|---|
|  |  | 40 | 41 | 42 | 43 | 44 |
| Surfactant | KF-643 | — | — | — | — | — |
|  | ZONYL FS-300 | — | — | — | — | — |
|  | Fluorosurfactant (Formula (q) of General Formula (2)) | — | 0.15 | 0.15 | 0.16 | 0.16 |
|  | SURFYNOL 104E | — | — | — | — | — |
|  | SOFTANOL EP-7025 | — | — | — | — | — |
| Antifungal Agent | PROXEL GXL | 0.05 | — | 0.05 | 0.05 | 0.05 |
| Foam Inhibitor (Defoaming Agent) | 2,4,7,9-Tetramethyldecane-4,7-Diol | — | 0.50 | — | 0.50 | — |
|  | 2,5,8,11-Tetramethyldodecane-5,8-Diol | — | — | 0.50 | — | 0.50 |
| pH Regurator | 2-Amino-2-Ethyl-1,3-Propanediol | 0.10 | 0.20 | 0.10 | 0.10 | 0.10 |
| Pure Water |  | Bal. | Bal. | Bal. | Bal | Bal. |
| Total (% by mass) |  | 100 | 100 | 100 | 100 | 100 |
| Total Solid Content of Water-Dispersible Colorant and Water-Dispersible Resin (% by mass) |  | 10.0 | 12.5 | 12.5 | 10.0 | 10.0 |
| Solid Content of Water-Dispersible Resin/Solid Content of Water-Dispersible Colorant |  | 3.0 | 2.6 | 2.6 | 3.0 | 3.0 |

TABLE 10-1

|  | Component (% by mass) | Production Example | |
|---|---|---|---|
|  |  | 45 | 46 |
| Water-Dispersible Colorant | Surface-modified Black Pigment Dispersion Liquid 1 (Prep. Ex. 1) | — | 35.00 |
|  | Surface-modified Black Pigment Dispersion Liquid 2 (Prep. Ex. 2) | — | — |
|  | Surface-modified Magenta Pigment Dispersion Liquid (Prep. Ex. 3) | — | — |
|  | Surface-modified Cyan Pigment Dispersion Liquid (Prep. Ex. 4) | 10.00 | — |
|  | Surface-modified Yellow Pigment Dispersion Liquid (Prep. Ex. 5) | — | — |
|  | Magenta Pigment-Containing Polymer Particles Dispersion Liquid (Prep. Ex. 6) | — | — |
|  | Cyan Pigment-Containing Polymer Particles Dispersion Liquid (Prep. Ex. 7) | — | — |
|  | Yellow Pigment-Containing Polymer Particles Dispersion Liquid (Prep. Ex. 8) | — | — |
|  | Carbon Black Pigment-Containing Polymer Particles Dispersion Liquid (Prep. Ex. 9) | — | — |
|  | Yellow Pigment Surfactant Dispersion Liquid (Prep. Ex. 10) | — | — |
|  | Magenta Pigment Surfactant Dispersion Liquid (Prep. Ex. 11) | — | — |
|  | Cyan Pigment Surfactant Dispersion Liquid (Prep. Ex. 12) | — | — |

TABLE 10-1-continued

| Component (% by mass) | | Production Example 45 | 46 |
|---|---|---|---|
| Water-Dispersible Resin | Acrylic-Silicone Resin Emulsion | — | — |
| | Fluororesin Emulsion | 36.00 | 57.40 |
| | Polyurethane Emulsion | — | — |
| Organic Solvent | Amide Compound of Structural Formula (I-1) | 10.00 | 1.00 |
| | Amide Compound of Structural Formula (I-3) | — | — |
| | Compound of Structural Formula (II-1) | — | — |
| | Compound of Structural Formula (III-1) | 10.00 | 1.00 |
| | Compound of Structural Formula (IV-5) | — | — |
| | Amide Compound of Structural Formula (1) | 10.00 | 1.00 |
| | 3-Methyl-1,5-Pentanediol | — | — |
| | Propylene Glycol | — | — |
| | Glycerin | 10.00 | 1.00 |
| | 1,3-Butanediol | — | — |
| Penetrating Agent | 2-Ethyl-1,3-Hexanediol | 2.00 | 1.00 |
| | 2,2,4-Trimethyl-1,3-Pentanediol | — | — |

TABLE 10-2

| Component (% by mass) | | Production Example 45 | 46 |
|---|---|---|---|
| Surfactant | KF-643 | — | — |
| | ZONYL FS-300 | 1.25 | 1.25 |
| | Fluorosurfactant (Formula (q) of General Formula (2)) | — | — |
| | SURFYNOL 104E | — | — |
| | SOFTANOL EP-7025 | — | — |
| Antifungal Agent | PROXEL GXL | 0.05 | 0.05 |
| Foam Inhibitor | 2,4,7,9-Tetramethyldecane-4,7-Diol | 0.40 | 0.40 |
| (Defoaming Agent) | 2,5,8,11-Tetramethyldodecane-5,8-Diol | — | — |
| pH Regurator | 2-Amino-2-Ethyl-1,3-Propanediol | 0.20 | 0.20 |
| Pure Water | | Bal. | Bal. |
| Total (% by mass) | | 100 | 100 |
| Total Solid Content of Water Dispersible Colorant and Water Dispersible Resin (% by mass) | | 18.0 | 35.7 |
| Solid Content of Water-Dispersible Basin/Solid Content of Water-Dispersible Colorant | | 9.0 | 4.1 |

Compounds and abbreviations in Tables 1-1 to 10-2 mean the followings.

[Amide compound of Structural Formula (I-1)]

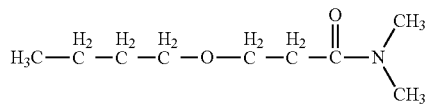

[Amide compound of Structural Formula (I-3)]

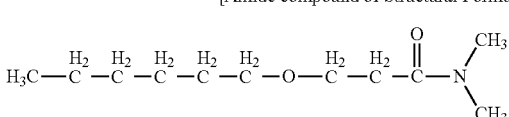

[Amide compound of Structural Formula (II-1)]

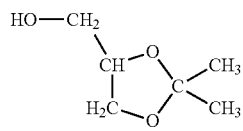

[Amide compound of Structural Formula (III-1)]

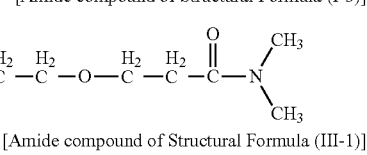

[Amide compound of Structural Formula (IV-5)]

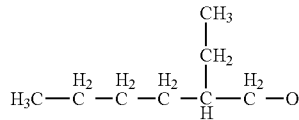

[Amide compound of Structural Formula (1)]

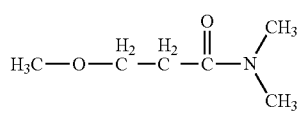

*Acrylic-silicone resin emulsion: POLYSOL ROY6312, product of Showa Highpolymer Co., Ltd., solid content: 40% by mass, average particle diameter: 171 nm, and minimum film forming temperature (MFT): 20° C.

*Fluororesin emulsion A: LUMIFLON FE4300, product of Asahi Glass Co., Ltd., solid content: 50% by mass, average particle diameter: 150 nm, and minimum film forming temperature (MFT): 30° C. or lower.

*Polyurethane emulsion: HYDRAN APX-101H, product of DIC Corporation, solid content: 45% by mass, average particle diameter: 160 nm, and minimum film forming temperature (MFT): 20° C.

*KF-643: a polyether-modified silicone compound, product of Shin-Etsu Chemical Co., Ltd., active ingredient: 100% by mass.

*ZONYL FS-300: polyoxyethylene perfluoroalkyl ether, product of E. Z du Pont de Nemours and Company, active ingredient: 40% by mass.

*Fluorosurfactant (Formula (q) of General Formula (2)):

$$C_6F_{13}-CH_2CH(OH)CH_2O-(CH_2CH_2O)_{21}-C_{12}H_{25}.$$

*SURFYNOL 104E: acetylene glycol compound (product of Nissin Chemical Industry Co., Ltd., active ingredient: 50% by mass, and containing ethylene glycol.

*SOFTANOL EP-7025: polyoxyalkylene alkyl ether, product of Nippon Shokubai Co., Ltd., active ingredient: 100% by mass.

*PROXEL GXL: an antifungal agent containing 1,2-benzisothiazolin-3-one as a main component, product of Avecia Biologies Limited, active ingredient: 20% by mass, and containing dipropylene glycol.

The recording inks of Production Examples 1 to 46 were evaluated for physical properties according to the below-described evaluation methods. Results are shown in Tables 11-1 and 11-2.

<Measurement of Ink Viscosity>

The viscosity of each of the inks was measured by means of a viscometer (RE-550L, product of Toki Sangyo Co., Ltd.) at 25° C.

<Measurement of Ink pH>

The pH of each of the inks was measured by means of a pH meter (HM-30R, product of TOA DKK CORPORATION) at 25° C.

<Measurement of Ink Dynamic Surface Tension>

The dynamic surface tension of each of the inks was measured by means of SITA_DynoTester (product of SITS) at 25° C. with the surface lifetime of 15 ms by the maximum bubble pressure method.

TABLE 11-1

| | Physical Property Value of Ink | | |
|---|---|---|---|
| | Viscosity (mPa·s) | pH | 15 ms Dynamic Surface Tension (mN/m) |
| Production Example 1 | 8.6 | 9.7 | 33.9 |
| Production Example 2 | 8.5 | 9.6 | 32.9 |
| Production Example 3 | 8.4 | 9.4 | 33.4 |
| Production Example 4 | 8.4 | 9.4 | 33.5 |
| Production Example 5 | 14.2 | 9.2 | 35.3 |
| Production Example 6 | 14.2 | 9.5 | 34.6 |
| Production Example 7 | 13.9 | 9.3 | 34.7 |
| Production Example 8 | 14.1 | 9.5 | 34.6 |
| Production Example 9 | 10.1 | 9.2 | 34.5 |
| Production Example 10 | 9.7 | 9.1 | 33.5 |
| Production Example 11 | 9.8 | 9.6 | 33.4 |
| Production Example 12 | 9.9 | 9.7 | 33.5 |
| Production Example 13 | 8.5 | 9.5 | 38.2 |
| Production Example 14 | 8.5 | 9.3 | 37.8 |
| Production Example 15 | 8.3 | 9.6 | 38.0 |
| Production Example 16 | 8.4 | 9.5 | 38.1 |
| Production Example 17 | 8.1 | 9.7 | 32.0 |
| Production Example 18 | 8.2 | 9.2 | 30.8 |
| Production Example 19 | 8.1 | 9.4 | 31.4 |
| Production Example 20 | 8.3 | 9.4 | 31.3 |
| Production Example 21 | 8.2 | 9.8 | 33.7 |
| Production Example 22 | 8.1 | 9.7 | 32.7 |
| Production Example 23 | 8.1 | 9.5 | 33.2 |
| Production Example 24 | 8.1 | 9.5 | 33.3 |
| Production Example 25 | 7.6 | 9.6 | 34.1 |
| Production Example 26 | 7.5 | 9.6 | 33.2 |
| Production Example 27 | 7.4 | 9.5 | 33.5 |

TABLE 11-1-continued

| | Physical Property Value of Ink | | |
|---|---|---|---|
| | Viscosity (mPa·s) | pH | 15 ms Dynamic Surface Tension (mN/m) |
| Production Example 28 | 7.4 | 9.4 | 33.4 |
| Production Example 29 | 7.8 | 9.7 | 33.9 |
| Production Example 30 | 7.7 | 9.7 | 32.9 |
| Production Example 31 | 7.6 | 9.5 | 33.3 |
| Production Example 32 | 7.6 | 9.4 | 33.1 |
| Production Example 33 | 5.8 | 9.5 | 33.9 |
| Production Example 34 | 5.7 | 9.5 | 33.1 |
| Production Example 35 | 5.4 | 9.4 | 33.3 |

TABLE 11-2

| | Physical Property Value of Ink | | |
|---|---|---|---|
| | Viscosity (mPa·s) | pH | 15 ms Dynamic Surface Tension (mN/m) |
| Production Example 36 | 5.4 | 9.3 | 33.2 |
| Production Example 37 | 7.8 | 9.7 | 42.1 |
| Production Example 38 | 7.6 | 9.7 | 41.7 |
| Production Example 39 | 7.5 | 9.5 | 41.5 |
| Production Example 40 | 7.5 | 9.4 | 41.6 |
| Production Example 41 | 8.4 | 9.7 | 33.7 |
| Production Example 42 | 8.3 | 9.6 | 32.9 |
| Production Example 43 | 8.3 | 9.4 | 33.1 |
| Production Example 44 | 8.2 | 9.4 | 33.3 |
| Production Example 45 | 18.4 | 9.6 | 34.8 |
| Production Example 46 | 14.3 | 9.4 | 34.1 |

Examples 1 to 15 and Comparative Examples 1 to 13

<Recording Medium>

The following recording media (1) to (9) were prepared.

(1) OK TOP COAT+: paper for offset printing, product of Oji Paper Co., Ltd., grade A2.

(2) OK KINFUJI+: paper for offset printing, product of Oji Paper Co., Ltd., grade A1.

(3) SA KINFUJI+: paper for offset printing, product of Oji Paper Co., Ltd., grade A0.

(4) AURORA COAT: paper for offset printing, product of Nippon Paper Industries Co., Ltd., grade A2.

(5) SUPER MI DAL: paper for offset printing, product of Nippon Paper Industries Co., Ltd., grade A2.

(6) RICOH BUSINESS COAT GLOSS100: paper for gel-jet printing, product of Ricoh Company, Ltd., grade A2.

(7) SPACE DX: paper for gravure printing, product of Nippon Paper Industries Co., Ltd.

(8) MIRROR. COAT PLATINUM: cast coat paper for offset printing, product of Oji Paper Co., Ltd.

(9) TYPE 6200: paper for plain paper copier (PPC), product of Ricoh Company, Ltd.

Herein, as for grades of the recording media of (1) to (5), a coated paper refers to woodfree paper or wood containing paper, serving as base paper, onto which a coating material is applied. The coated paper is roughly classified as shown in the following Table 12 based on the base paper and an application amount. Also, art paper is classified into A1 or A0 grade based on glossiness and smoothness, in addition to the application amount.

TABLE 12

| Name | Base paper | Application Amount | Major usage |
|---|---|---|---|
| Slightly coated paper | Woodfree paper/wood containing paper | about 5 g/m² | Flyer etc. |
| Lightweight coated (A3 coated) paper | Woodfree paper/wood containing paper | about 10 g/m² | Test and color page in magazine, and flyer etc. |
| Coated (A2 coated) paper | Woodfree paper/wood containing paper | about 15 g/m² | Poster, catalog, and calendar etc. |
| Art (A1 coated) paper | Woodfree paper | about 20 g/m² | Calendar and high-quality art printing etc. |

*Paper of which application amount is 40 g/m² on both surfaces, which is the same as that of A1 coated paper, but which has better glossiness and smoothness than the A1 coated paper is classified into a A0 coated (super art) paper.

The recording media of (1) to (9) were measured for a transferred amount of pure water as follows. Results are shown in Tables 13-1 and 13-2.

<Measurement of Transferred Amount of Pure Water by Dynamic Scanning Absorptometer>

Each of the recording media of (1) to (9) was measured for an absorption curve of pure water by means of a dynamic scanning absorptometer (Model KM500win, product of Kumagai Riki Kogyo Co., Ltd.). The absorption curve was obtained by plotting a sloped-straight line from a transferred amount (mL/m²) and the square root of a contacting duration (ms). The transferred amount with contact duration of 100 ms was determined by interpolation.

<Surface Modification Treatment (Corona Discharge Treatment or Plasma Treatment)>

The recording media were surface-modified with a corona discharge treatment or plasma treatment at a treatment dose shown in Tables $14^{-1}$ and 14-2 as follows.

(1) Corona Discharge Treatment

The recording medium was surface-modified by means of a corona surface modification evaluation device TEC-4AX (product of KASUGA ELECTRIC WORKS LTD).

(2) Plasma Treatment

The recording medium was surface-modified by means of a plasma shower irradiation device PS-601SW (product of Asakusa Machinery Co., LTD.).

For recording inks of Production Examples 1 to 46 described in Tables 1-1 to 10-2, under the controlled environment where the temperature was adjusted to 23° C.±0.5° C. and the humidity was adjusted to 50% RH±5% RH, an inkjet recording device (IPSIO GXE-5500, product of Ricoh Company, Ltd.) was set by varying a driving voltage of a piezo element to unify an amount of a recording ink to be ejected, so that the same amount of the ink would be deposited on each recording medium. Next, a printing mode of the inkjet recording device was set to "Gloss Paper—High Quality Print" and then images were formed using ink sets described in Tables 14-1 and 14-2.

TABLE 13-1

| | Recording medium | Manufacture | Usage | Grade | Paper quality Transferred amount of water (mL/m²) 100 ms |
|---|---|---|---|---|---|
| Ex. 1 | OK TOP COAT+ | Oji Paper Co., Ltd. | Offset Printing | A2 | 3 |
| Ex. 2 | OK TOP COAT+ | Oji Paper Co., Ltd. | Offset Printing | A2 | 3 |
| Ex. 3 | OK TOP COAT+ | Oji Paper Co., Ltd. | Offset Printing | A2 | 3 |
| Ex. 4 | OK KINFUJI+ | Oji Paper Co., Ltd. | Offset Printing | A1 | 1.9 |
| Ex. 5 | SA KINFUJI+ | Oji Paper Co., Ltd. | Offset Printing | A0 | 1.9 |
| Ex. 6 | AURORA COAT | Nippon Paper Industries Co., Ltd. | Offset Printing | A2 | 2.8 |
| Ex. 7 | SUPER MI DAL | Nippon Paper Industries Co., Ltd. | Offset Printing | A2 | 7 |
| Ex. 8 | RICOH BUSINESS COAT GLOSS 100 | Ricoh Company, Ltd. | Gel-jet Paper | A2 | 5.8 |
| Ex. 9 | SPACE DX | Nippon Paper Industries Co., Ltd. | Gravure Printing | — | 9.9 |
| Ex. 10 | OK TOP COAT+ | Oji Paper Co., Ltd. | Offset Printing | A2 | 3 |
| Ex. 11 | OK TOP COAT+ | Oji Paper Co., Ltd. | Offset Printing | A2 | 3 |
| Ex. 12 | OK TOP COAT+ | Oji Paper Co., Ltd. | Offset Printing | A2 | 3 |
| Ex. 13 | OK TOP COAT+ | Oji Paper Co., Ltd. | Offset Printing | A2 | 3 |
| Ex. 14 | OK TOP COAT+ | Oji Paper Co., Ltd. | Offset Printing | A2 | 3 |
| Ex. 15 | OK TOP COAT+ | Oji Paper Co., Ltd. | Offset Printing | A2 | 3 |

TABLE 13-2

|  | Recording medium | Manufacture | Usage | Grade | Paper quality Transferred amount of water (mL/m$^2$) 100 ms |
|---|---|---|---|---|---|
| Comp. Ex. 1 | OK TOP COAT+ | Oji Paper Co., Ltd. | Offset Printing | A2 | 3 |
| Comp. Ex. 2 | OK TOP COAT+ | Oji Paper Co., Ltd. | Offset Printing | A2 | 3 |
| Comp. Ex. 3 | OK TOP COAT+ | Oji Paper Co., Ltd. | Offset Printing | A2 | 3 |
| Comp. Ex. 4 | OK TOP COAT+ | Oji Paper Co., Ltd. | Offset Printing | A2 | 3 |
| Comp. Ex. 5 | MIRROR COAT PLATINUM | Oji Paper Co., Ltd. | Offset Printing | Cast Coat Paper | 0.2 |
| Comp. Ex. 6 | TYPE 6200 | Ricoh Company, Ltd. | PPC paper | — | 11.5 |
| Comp. Ex. 7 | TYPE 6200 | Ricoh Company, Ltd, | PPC paper | — | 11.5 |
| Comp. Ex. 8 | OK TOP COAT+ | Oji Paper Co., Ltd. | Offset Printing | A2 | 3 |
| Comp. Ex. 9 | OK TOP COAT+ | Oji Paper Co., Ltd. | Offset Printing | A2 | 3 |
| Comp. Ex. 10 | OK TOP COAT+ | Oji Paper Co., Ltd. | Offset Printing | A2 | 3 |
| Comp. Ex. 11 | OK TOP COAT+ | Oji Paper Co., Ltd. | Offset Printing | A2 | 3 |
| Comp. Ex. 12 | OK TOP COAT+ | Oji Paper Co., Ltd. | Offset Printing | A2 | 3 |
| Comp. Ex. 13 | OK TOP COAT+ | Oji Paper Co., Ltd. | Offset Printing | A2 | 3 |

*"Transferred amount of pure water" denotes a value measured on the recording medium which has never been surface-modified with the corona discharge treatment or the plasma treatment.

TABLE 14-1

|  | Surface Modification Treatment | | Image formation | |
|---|---|---|---|---|
|  | Treatment Method | Treatment Dose (W·min/m$^2$) | Ink set | Printing Mode |
| Ex. 1 | Corona Discharge Treatment | 200 | Production Examples 1 to 4 | Gloss paper-High Quality Print |
| Ex. 2 | Corona Discharge Treatment | 100 | Production Examples 5 to 8 | Gloss paper-High Quality Print |
| Ex. 3 | Plasma Treatment | 30 | Production Examples 9 to 12 | Gloss paper-High Quality Print |
| Ex. 4 | Plasma Treatment | 100 | Production Examples 1 to 4 | Gloss paper-High Quality Print |
| Ex. 5 | Plasma Treatment | 200 | Production Examples 1 to 4 | Gloss paper-High Quality Print |
| Ex. 6 | Corona Discharge Treatment | 500 | Production Examples 1 to 4 | Gloss paper-High Quality Print |
| Ex. 7 | Plasma Treatment | 100 | Production Examples 5 to 8 | Gloss paper-High Quality Print |
| Ex. 8 | Corona Discharge Treatment | 100 | Production Examples 5 to 8 | Gloss paper-High Quality Print |
| Ex. 9 | Corona Discharge Treatment | 100 | Production Examples 1 to 4 | Gloss paper-High Quality Print |
| Ex. 10 | Corona Discharge Treatment | 100 | Production Examples 1 to 4 | Gloss paper-High Quality Print |
| Ex. 11 | Corona Discharge Treatment | 500 | Production Examples 1 to 4 | Gloss paper-High Quality Print |
| Ex. 12 | Corona Discharge Treatment | 30 | Production Examples 1 to 4 | Gloss paper-High Quality Print |
| Ex. 13 | Corona Discharge Treatment | 600 | Production Examples 1 to 4 | Gloss paper-High Quality Print |
| Ex. 14 | Corona Discharge Treatment | 200 | Production Examples 21 to 24 | Gloss paper-High Quality Print |

TABLE 14-1-continued

| | Surface Modification Treatment | | Image formation | |
|---|---|---|---|---|
| | Treatment Method | Treatment Dose (W · min/m²) | Ink set | Printing Mode |
| Ex. 15 | Corona Discharge Treatment | 200 | Production Examples 41 to 44 | Gloss paper- High Quality Print |

TABLE 14-2

| | Surface Modification Treatment | | Image formation | |
|---|---|---|---|---|
| | Treatment Method | Treatment Dose (W · min/m²) | Ink set | Printing Mode |
| Comp. Ex. 1 | None | None | Production Examples 1 to 4 | Gloss paper- High Quality Print |
| Comp. Ex. 2 | None | None | Production Examples 5 to 8 | Gloss paper- High Quality Print |
| Comp. Ex. 3 | Plasma Treatment | 100 | Production Examples 13 to 16 | Gloss paper- High Quality Print |
| Comp. Ex. 4 | Plasma Treatment | 100 | Production Examples 17 to 20 | Gloss paper- High Quality Print |
| Comp. Ex. 5 | Corona Discharge Treatment | 100 | Production Examples 1 to 4 | Gloss paper- High Quality Print |
| Comp. Ex. 6 | Corona Discharge Treatment | 50 | Production Examples 13 to 16 | Gloss paper- High Quality Print |
| Comp. Ex. 7 | Corona Discharge Treatment | 50 | Production Examples 1 to 4 | Gloss paper- High Quality Print |
| Comp. Ex. 8 | Corona Discharge Treatment | 200 | Production Examples 25 to 28 | Gloss paper- High Quality Print |
| Camp. Ex. 9 | Corona Discharge Treatment | 200 | Production Examples 29 to 32 | Gloss paper- High Quality Print |
| Comp. Ex. 10 | Corona Discharge Treatment | 200 | Production Examples 33 to 36 | Gloss paper- High Quality Print |
| Comp. Ex. 11 | Corona Discharge Treatment | 200 | Production Examples 37 to 40 | Gloss paper- High Quality Print |
| Comp. Ex. 12 | Corona Discharge Treatment | 200 | Production Examples 5, 6, 45, and 8 | Gloss paper- High Quality Print |
| Comp. Ex. 13 | Corona Discharge Treatment | 200 | Production Examples 46, and 6 to 8 | Gloss paper- High Quality Print |

Examples 1 to 15 and Comparative Examples 1 to 13 were evaluated according to the below-described evaluation methods. Results are shown in Table 15.

<Image Density>

A chart including a 64-point symbol "black square" produced using Microsoft Word 2000 (product of Microsoft Corporation) was printed on each of the recording media.

The color in the "black square" portions on a printed surface was measured by X-Rite 939 (product of X-Rite Inc.), and the image density of each of the measured colors was evaluated based on the follow evaluation criteria. As for the printing mode, "Gloss paper —High Quality Print" mode was modified to "No Color Correction" using a driver that accompanied a printer. Note that, "black square" refers to a character (symbol) representing a square inside of which is painted out with black. However, the character cannot be used herein, so that it is expressed as "black square" with reluctance.

[Evaluation Criteria]

A: Black: 2.0 or higher
   Yellow: 1.25 or higher
   Magenta: 2.0 or higher, or
   Cyan: 2.0 or higher.
B: Black: 1.9 or higher but lower than 2.0
   Yellow: 1.2 or higher but lower than 1.25
   Magenta: 1.9 or higher but lower than 2.0, or
   Cyan: 1.9 or higher but lower than 2.0.
C: Black: 1.8 or higher but lower than 1.9
   Yellow: 1.15 or higher but lower than 1.2
   Magenta: 1.8 or higher but lower than 1.9, or
   Cyan: 1.8 or higher but lower than 1.9.
D: Black: lower than 1.88
   Yellow: lower than 1.15
   Magenta: lower than 1.8, or
   Cyan: lower than 1.8.

<Drying Property>

A chart including a 64-point symbol "black square" was printed on each of the recording media in the same manner as in the image density. Immediately thereafter, spur marks was visually observed and evaluated according to the following criteria. The spur marks was caused by an ink which had been brought into contact with a spur, deposited onto the spur, and transferred from the spur to a back ground portion of each of the recording media, and is an index of drying property. Note that, the spur marks were evaluated for a black ink, which has the lowest drying property.

[Evaluation Criteria]

C: Rank 1: Cleary observed.
B: Rank 2: Slightly observed.
A: Rank 3: Non-observed.

<Image Glossiness>

A chart including "black square", which is a 3 cm×15 cm single-color solid image, produced using Microsoft Word 2000 (product of Microsoft Corporation) was printed on each of the recording media.

The 60 degree-glossiness in the "black square" portions on a printed surface was measured by a glossmeter (4501, product of BYK Gardener). As for the printing mode, "Gloss paper—High Quality Print" mode was modified to "No Color Correction" using a driver that accompanied a printer. A difference between a glossiness of a non-recorded portion and that of a solid image portion was evaluated according the following criteria. Note that, the glossiness was evaluated for a black ink, which has the lowest image glossiness.

[Evaluation Criteria]
A: Difference of glossiness is less than ±5.
B: Difference of glossiness is less than ±10.
C: Difference of glossiness is less than ±15.
D: Difference of glossiness is ±15 or more.

<Beading>

Solid images of cyan, magenta, and green were printed on each of the recording media, following by hot-air drying. Unevenness in image density (beading) of the solid images was observed, and evaluated according to the following criteria. Note that, the beading was evaluated for a color of which beading is the worst among cyan, magenta, and green.

[Evaluation Criteria]
A: There was no unevenness in image density.
B: There was slight unevenness in image density.
C: There was considerable unevenness in image density.
D: There was significant unevenness in image density.

<Color Breading>

On each of the recording media, 0.5 mm-line images of magenta, cyan, and black were formed in a solid image of yellow, and visually observed for occurrence of blurring at a color boundary which occurs in the case where inks having different colors are adjacent to each other. Similarly, in the case where 0.5 mm-line images of magenta, yellow, and black were formed in a solid image of cyan, and in the case where 0.5 mm-line images of cyan, yellow, and black were formed in a solid image of magenta, occurrence of blurring at color boundary was visually observed. Note that, a combination of colors of which color breading is the worst was evaluated as the beading.

[Evaluation Criteria]
A: There was no problem.
B: There was slight problem in occurrence of color breading.
C: There was a problem in occurrence of color breading.

TABLE 15

| | Image density | Drying property | Image gloss | Beading | Color breading |
|---|---|---|---|---|---|
| Ex. 1 | A | A | B | A | A |
| Ex. 2 | B | A | A | A | A |
| Ex. 3 | A | A | B | A | A |
| Ex. 4 | A | A | B | A | B |
| Ex. 5 | A | A | B | A | B |
| Ex. 6 | A | A | B | A | A |
| Ex. 7 | B | A | A | A | A |
| Ex. 8 | B | A | A | A | A |
| Ex. 9 | A | A | A | A | A |
| Ex. 10 | A | A | A | A | A |
| Ex. 11 | A | A | B | A | A |
| Ex. 12 | A | A | A | B | B |
| Ex. 13 | A | A | B | A | A |
| Ex. 14 | A | A | B | A | A |
| Ex. 15 | A | A | B | A | A |
| Comp. Ex. 1 | A | B | B | C | C |

TABLE 15-continued

| | Image density | Drying property | Image gloss | Beading | Color breading |
|---|---|---|---|---|---|
| Comp. Ex. 2 | B | B | A | C | C |
| Comp. Ex. 3 | A | C | B | B | B |
| Comp. Ex. 4 | B | A | D | A | A |
| Comp. Ex. 5 | A | B | D | C | C |
| Comp. Ex. 6 | D | A | A | B | B |
| Comp. Ex. 7 | D | A | A | B | B |
| Comp. Ex. 8 | A | B | B | C | C |
| Comp. Ex. 9 | A | A | B | B | C |
| Comp. Ex. 10 | D | A | D | A | A |
| Comp. Ex. 11 | B | C | B | B | B |
| Comp. Ex. 12*1 | — | — | — | — | — |
| Comp. Ex. 13*2 | — | — | — | — | — |

*1: In Comparative Example 12, image quality could not be evaluated, because the ink of Production Example 45 had high viscosity, so that the ink was not stably ejected.
*2: In Comparative Example 13, image quality could not be evaluated, because the ink of Production Example 46 had no moisture retaining property, so that the ink was dried in the proximity to a head nozzle and was not ejected.

Embodiments of the present invention are as follows.

<1> An inkjet recording method, including:

applying a stimulus to a recording ink to allow the recording ink to jet to thereby record an image on a recording medium, wherein the recording medium includes a support and a surface layer formed on at least one surface of the support, and has a transferred amount of pure water on a surface thereof at a side of the surface layer of 1 mL/m$^2$ to 10 mL/m$^2$ with contact duration of 100 ms as measured by a dynamic scanning absorptometer, wherein the recording medium is surface-modified with a corona discharge treatment or a plasma treatment, wherein the recording ink contains a water-dispersible colorant, an organic solvent, a surfactant, a water-dispersible resin, and water, wherein the organic solvent contains one or more polyhydric alcohols having an equilibrium moisture content of 30% by mass or higher at a temperature of 23° C. and relative humidity of 80%, an amide compound represented by the following General Formula (I), and at least one of compounds represented by the ing General Formulae (II) to (IV), and wherein a total of a solid content of the water dispersible colorant and a solid content of the water dispersible resin is 8% by mass to 35% by mass, and a mass ratio (A/B) of the solid content of the water dispersible resin (A) to the solid content of the water dispersible colorant (B) is 2 to 8:

[General Formula (I)]

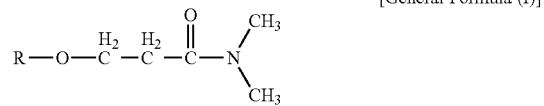

where, R denotes a C4-C6 alkyl group:

[General Formula (II)]

where $R_1$ denotes a hydrogen atom or a C1-C2 alkyl group, and $R_2$ denotes a C1-C4 alkyl group,

[General Formula (III)]

$$\text{(oxetane ring with } CH_2CH_2-O-R_3 \text{ substituent)}$$

where $R_3$ denotes a hydrogen atom, a C1-C8 alkyl group, a cyclic alkyl group, or an aromatic ring,

[General Formula (IV)]

$$R_4-O-\overset{O}{\underset{\|}{C}}-(CH_2)_8-\overset{O}{\underset{\|}{C}}-O-R_5$$

where $R_4$ and $R_5$ each denote a C1-C8 alkyl group.

<2> The inkjet recording method according to <1>, wherein the organic solvent contains an amide compound represented by the following Structural Formula (1):

[Structural Formula (1)]

$$H_3C-O-CH_2-CH_2-\overset{O}{\underset{\|}{C}}-N(CH_3)_2$$

<3> The inkjet recording method according to <1> or <2>, wherein the polyhydric alcohol is glycerin, 1,3-butanediol, or both thereof.

<4> The inkjet recording method according to any one of <1> to <3>, wherein the water-dispersible resin contains at least one selected from the group consisting of a urethane resin, an acrylic-silicone resin, and a fluororesin.

<5> The inkjet recording method according to any one of <1> to <4>, wherein the water-dispersible colorant is a pigment, and the pigment is an anionic self-dispersible pigment or pigment-containing polymer particles.

<6> The inkjet recording method according to any one of <1> to <5>, wherein the surfactant contains at least one selected from the group consisting of a silicone surfactant, a fluorosurfactant, an acetylene glycol surfactant, and an acetylene alcohol surfactant.

<7> The inkjet recording method according to any one of <1> to <6>, wherein the recording ink contains a penetrating agent, and the penetrating agent is 2-ethyl-1,3-hexanediol or 2,2,4-t ethyl-1,3-pentanediol.

<8> The inkjet recording method according to any one of <1> to <7>, wherein the recording ink has a dynamic surface tension of 35 mN/m or lower at 25° C. with surface lifetime of 15 ms as measured by a maximum bubble pressure method.

<9> The inkjet recording method according to any one of <1> to <8>, wherein treatment dose of the corona discharge treatment or the plasma treatment is 50 W·min/m² to 500 W·min/m².

<10> An inkjet recording device, including:

an ink jetting unit configured to apply a stimulus to a recording ink to allow the recording ink to jet to thereby record an image on a recording medium, wherein the recording medium includes a support and a surface layer formed on at least one surface of the support, and has a transferred amount of pure water on a surface thereof at a side of the surface layer of 1 mL/m² to 10 mL/m² with contact duration of 100 ms as measured by a dynamic scanning absorptometer, wherein the recording medium is surface-modified with a corona discharge treatment or a plasma treatment, wherein the recording ink contains a water-dispersible colorant, an organic solvent, a surfactant, a water-dispersible resin, and water, wherein the organic solvent contains one or more polyhydric alcohols having an equilibrium moisture content of 30% by mass or higher at a temperature of 23° C. and relative humidity of 80%, an amide compound represented by the following General Formula (I), and at least one of compounds represented by the following General Formulae (II) to (IV), and wherein a total of a solid content of the water dispersible colorant and a solid content of the water dispersible resin is 8% by mass to 35% by mass, and a mass ratio (A/B) of the solid content of the water dispersible resin (A) to the solid content of the water dispersible colorant (B) is 2 to 8:

[General Formula (I)]

$$R-O-CH_2-CH_2-\overset{O}{\underset{\|}{C}}-N(CH_3)_2$$

where, R denotes a C4-C6 alkyl group;

[General Formula (II)]

$$HO-CH_2-CH(-O-)-CH_2(-O-)C(R_1)(R_2)$$

where $R_1$ denotes a hydrogen atom or a C1-C2 alkyl group, and $R_2$ denotes a C1-C4 alkyl group,

[General Formula (III)]

$$\text{(oxetane ring with } CH_2CH_2-O-R_3 \text{ substituent)}$$

where $R_3$ denotes a hydrogen atom, a C1-C8 alkyl group, a cyclic alkyl group, or an aromatic ring,

[General Formula (IV)]

$$R_4-O-\overset{O}{\underset{\|}{C}}-(CH_2)_8-\overset{O}{\underset{\|}{C}}-O-R_5$$

where $R_4$ and $R_5$ each denote a C1-C8 alkyl group.

This application claims priority to Japanese application No. 2013-009814, filed on Jan. 23, 2013 and incorporated herein by reference.

What is claimed is:

1. An inkjet recording method, comprising:
applying a stimulus to a recording ink to allow the recording ink to jet to thereby record an image on a recording medium,
wherein the recording medium comprises a support and a surface layer formed on at least one surface of the support, and has a transferred amount of pure water on a surface thereof at a side of the surface layer of 1 mL/m$^2$ to 10 mL/m$^2$ with contact duration of 100 ms as measured by a dynamic scanning absorptometer,
wherein the recording medium is surface-modified with a corona discharge treatment or a plasma treatment,
wherein the recording ink comprises a water-dispersible colorant, an organic solvent, a surfactant, a water-dispersible resin, and water,
wherein the organic solvent comprises one or more polyhydric alcohols having an equilibrium moisture content of 30% by mass or higher at a temperature of 23° C. and relative humidity of 80%, an amide compound represented by the following General Formula (I), and at least one of compounds represented by the following General Formulae (II) to (IV), and
wherein a total of a solid content of the water dispersible colorant and a solid content of the water dispersible resin is 8% by mass to 35% by mass, and a mass ratio (A/B) of the solid content of the water dispersible resin (A) to the solid content of the water dispersible colorant (B) is 2 to 8:

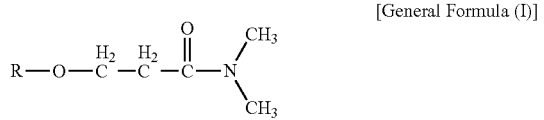

[General Formula (I)]

where, R denotes a C4-C6 alkyl group;

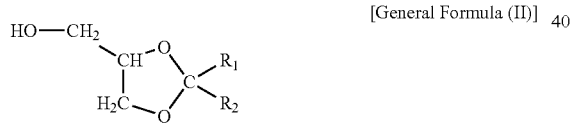

[General Formula (II)]

where R$_1$ denotes a hydrogen atom or a C1-C2 alkyl group, and R$_2$ denotes a C1-C4 alkyl group,

[General Formula (III)]

where R$_3$ denotes a hydrogen atom, a C1-C8 alkyl group, a cyclic alkyl group, or an aromatic ring,

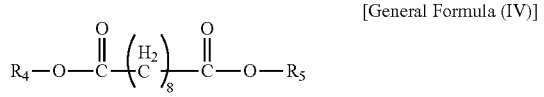

[General Formula (IV)]

where R$_4$ and R$_5$ each denote a C1-C8 alkyl group.

2. The inkjet recording method according to claim 1, wherein the organic solvent comprises an amide compound represented by the following Structural Formula (1):

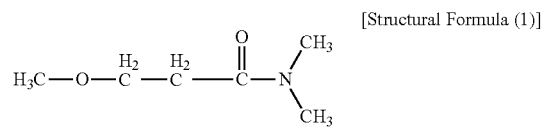

[Structural Formula (1)]

3. The inkjet recording method according to claim 1, wherein the polyhydric alcohol is glycerin, 1,3-butanediol, or both thereof.

4. The inkjet recording method according to claim 1, wherein the water-dispersible resin comprises at least one selected from the group consisting of a urethane resin, an acrylic-silicone resin, and a fluororesin.

5. The inkjet recording method according to claim 1, wherein the water-dispersible colorant is a pigment, and the pigment is an anionic self-dispersible pigment or pigment-containing polymer particles.

6. The inkjet recording method according to claim 1, wherein the surfactant comprises at least one selected from the group consisting of a silicone surfactant, a fluorosurfactant, an acetylene glycol surfactant, and an acetylene alcohol surfactant.

7. The inkjet recording method according to claim 1, wherein the recording ink comprises a penetrating agent, and the penetrating agent is 2-ethyl-1,3-hexanediol or 2,2,4-trimethyl-1,3-pentanediol.

8. The inkjet recording method according to claim 1, wherein the recording ink has a dynamic surface tension of 35 mN/m or lower at 25° C. surface lifetime of 15 ms as measured by a maximum bubble pressure method.

9. The inkjet recording method according to claim 1, wherein treatment dose of the corona discharge treatment or the plasma treatment on the recording medium is 50 W·min/m$^2$ to 500 W·min/m$^2$.

10. An inkjet recording device, comprising:
an ink jetting unit configured to apply a stimulus to a recording ink to allow the recording ink to jet to thereby record an image on a recording medium,
wherein the recording medium comprises a support and a surface layer formed on at least one surface of the support, and has a transferred amount of pure water on a surface thereof at a side of the surface layer of 1 mL/m$^2$ to 10 mL/m$^2$ with contact duration of 100 ms as measured by a dynamic scanning absorptometer,
wherein the recording medium is surface-modified with a corona discharge treatment or a plasma treatment,
wherein the recording ink comprises a water-dispersible colorant, an organic solvent, a surfactant, a water-dispersible resin, and water,
wherein the organic solvent comprises one or more polyhydric alcohols having an equilibrium moisture content of 30% by mass or higher at a temperature of 23° C. and relative humidity of 80%, an amide compound represented by the following General Formula (I), and at least one of compounds represented by the following General Formulae (II) to (IV), and
wherein a total of a solid content of the water dispersible colorant and a solid content of the water dispersible resin is 8% by mass to 35% by mass, and a mass ratio (A/B) of the solid content of the water dispersible resin (A) to the solid content of the water dispersible colorant (B) is 2 to 8:

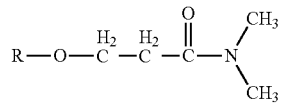
[General Formula (I)]
where, R denotes a C4-C6 alkyl group;
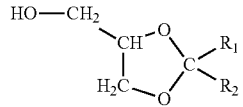
[General Formula (II)]
where $R_1$ denotes a hydrogen atom or a C1-C2 alkyl group, and $R_2$ denotes a C1-C4 alkyl group,
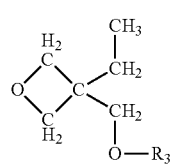
[General Formula (III)]
where $R_3$ denotes a hydrogen atom, a C1-C8 alkyl group, a cyclic alkyl group, or an aromatic ring,
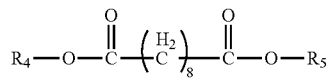
[General Formula (IV)]
where $R_4$ and $R_5$ each denote a C1-C8 alkyl group.
* * * * *